United States Patent
Tanaka et al.

(10) Patent No.: US 6,674,470 B1
(45) Date of Patent: Jan. 6, 2004

(54) MOS-TYPE SOLID STATE IMAGING DEVICE WITH HIGH SENSITIVITY

(75) Inventors: Nagataka Tanaka, Yokohama (JP); Eiji Oba, Kawasaki (JP); Keiji Mabuchi, Kitakami (JP); Michio Sasaki, Kamakura (JP); Ryohei Miyagawa, Sagamihara (JP); Hirofumi Yamashita, Tokyo (JP); Yoshinori Iida, Tokyo (JP); Hisanori Ihara, Yokohama (JP); Tetsuya Yamaguchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/933,975

(22) Filed: Sep. 19, 1997

(30) Foreign Application Priority Data

Sep. 19, 1996 (JP) .............................................. 8-248361
Mar. 14, 1997 (JP) .............................................. 9-061041
Jul. 14, 1997 (JP) .............................................. 9-203816

(51) Int. Cl.[7] .................................................. H04N 3/14
(52) U.S. Cl. ........................................ 348/302; 348/308
(58) Field of Search ................................ 348/308, 301, 348/302, 294; 250/208.1, 208.2; 257/288, 291, 292

(56) References Cited

U.S. PATENT DOCUMENTS

| | | | | |
|---|---|---|---|---|
| 5,172,249 A | * | 12/1992 | Hashimoto | 257/292 |
| 5,319,225 A | * | 6/1994 | Kim | 348/294 |
| 5,488,415 A | * | 1/1996 | Uno | 348/241 |
| 5,516,714 A | * | 5/1996 | Kim | 437/53 |
| 5,825,056 A | * | 10/1998 | Yonemoto | 257/290 |
| 5,847,381 A | * | 12/1998 | Isogai | 250/208.1 |
| 5,917,960 A | * | 6/1999 | Sugawa | 382/278 |
| 5,945,774 A | * | 8/1999 | Isogai et al. | 257/292 |
| 6,037,577 A | * | 3/2000 | Tanaka et al. | 348/302 |
| 6,046,466 A | * | 4/2000 | Ishida et al. | 257/258 |
| 6,072,206 A | * | 6/2000 | Yamashita et al. | 257/292 |
| 6,163,023 A | * | 12/2000 | Watanabe | 250/208.1 |
| 6,291,845 B1 | * | 9/2001 | Blanchard | 257/288 |
| 6,383,860 B2 | * | 5/2002 | Maeda et al. | 438/239 |

FOREIGN PATENT DOCUMENTS

| | | |
|---|---|---|
| JP | 59-132655 | 7/1984 |
| JP | 60-65571 | 4/1985 |
| JP | 01-147-861 | 6/1989 |
| JP | 01-243675 | 9/1989 |
| JP | 1-243675 | 9/1989 |
| JP | 01-292855 | 11/1989 |
| JP | 03-276675 | 12/1991 |
| JP | 4-298175 | 10/1992 |
| JP | 05-207376 | 8/1993 |
| JP | 06-334920 | 12/1994 |
| JP | 08-205034 | 8/1996 |
| JP | 09-36242 | 2/1997 |

* cited by examiner

Primary Examiner—Wendy R. Garber
Assistant Examiner—Jacqueline Wilson
(74) Attorney, Agent, or Firm—Oblon, Spivak, McClelland, Maier & Neustadt, P.C.

(57) ABSTRACT

A solid state imaging device comprises a plurality of unit cells formed in a surface region of a semiconductor substrate. Each of the unit cells comprises a photoelectric converter, an MOS-type read-out transistor for reading a signal from the photoelectric converter, an MOS-type amplifying transistor having a gate connected to a drain of the read-out transistor and for amplifying the signal read by the read-out transistor, a reset transistor having a source connected to the drain of the read-out transistor and for resetting a potential of a gate of the amplifying transistor, and an addressing element connected in series to the amplifying transistor and for selecting the unit cell. The read-out transistor is formed in a first device region in the semiconductor substrate. The reset transistor is formed in a second device region in the semiconductor substrate. The drain of the read-out transistor is connected to the source of the reset transistor through a wiring layer formed on the surface of the semiconductor substrate.

28 Claims, 31 Drawing Sheets

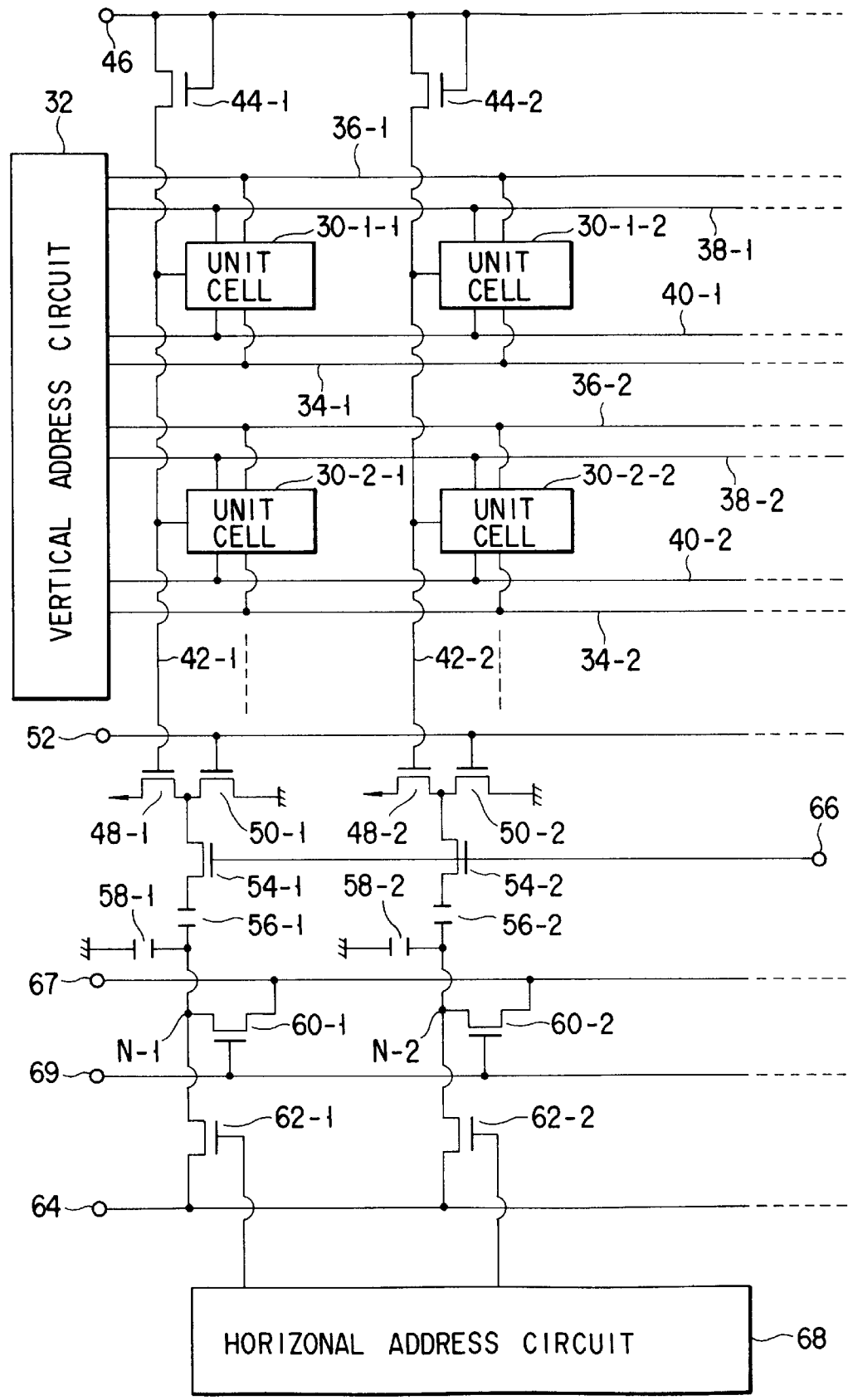
F I G. 3

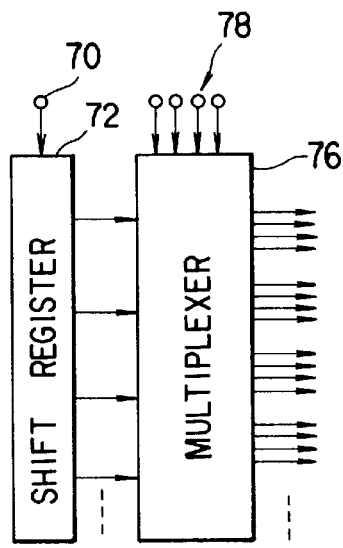
F I G. 4
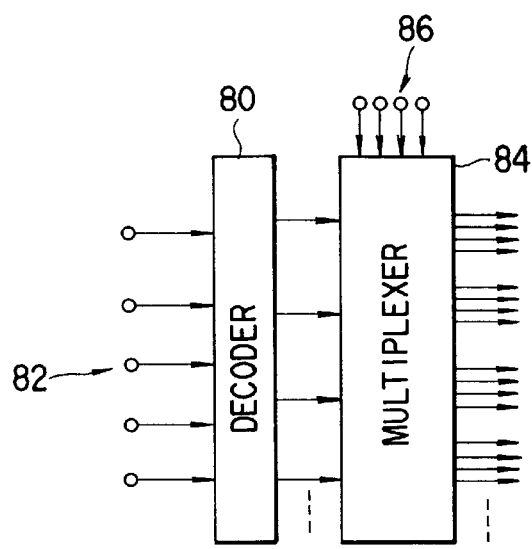
F I G. 5
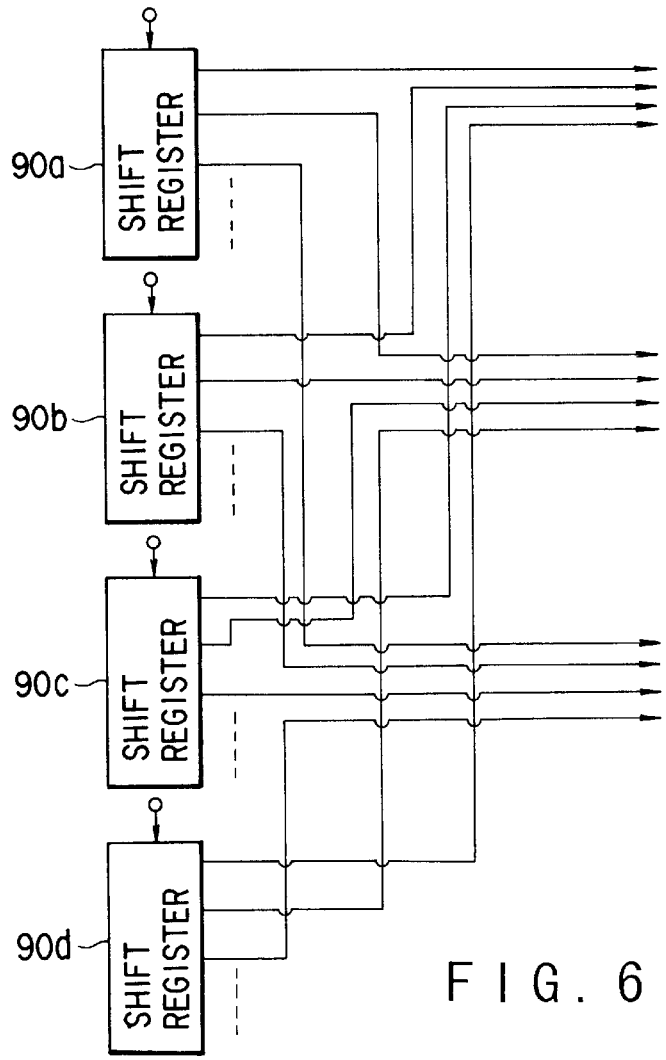
F I G. 6

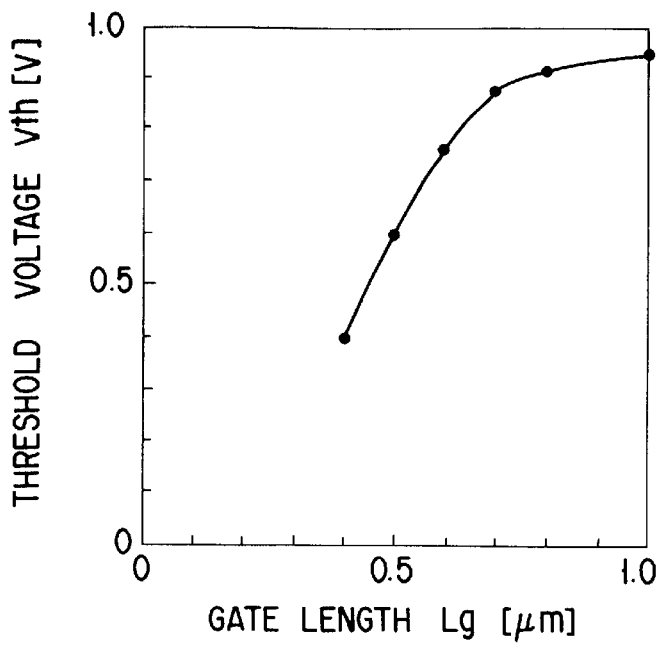
F I G. 22
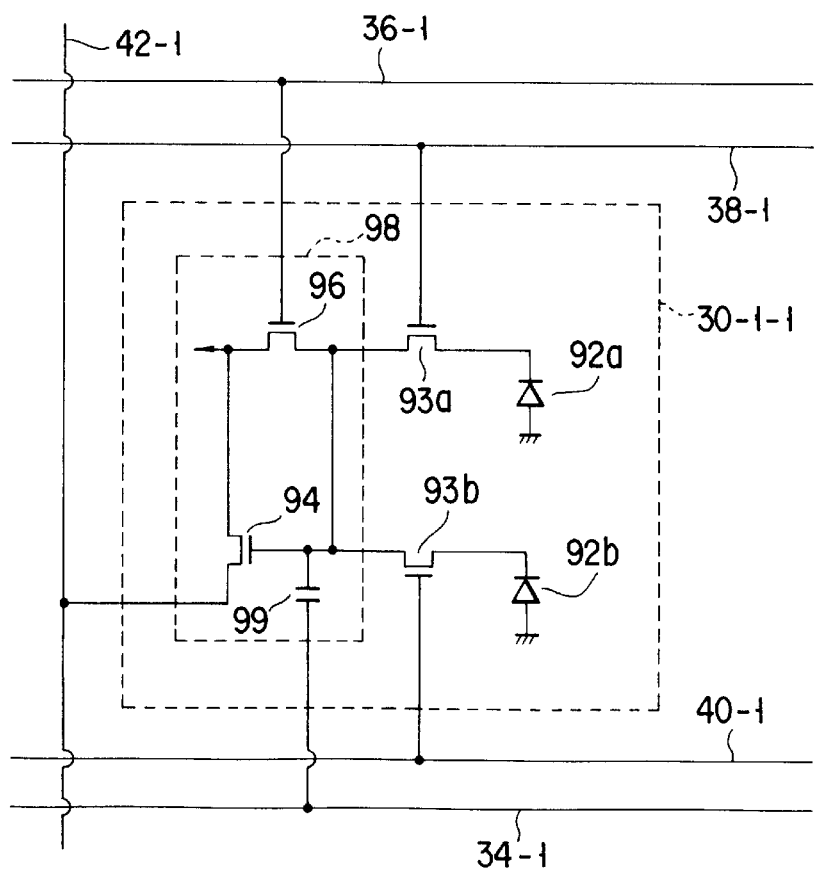
F I G. 23

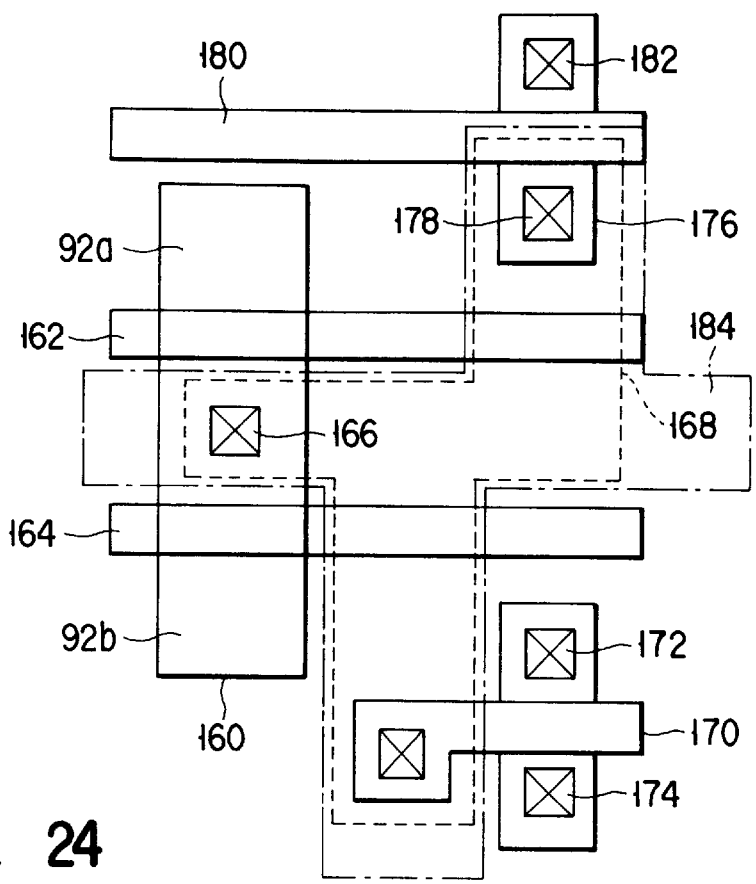
F I G. 24
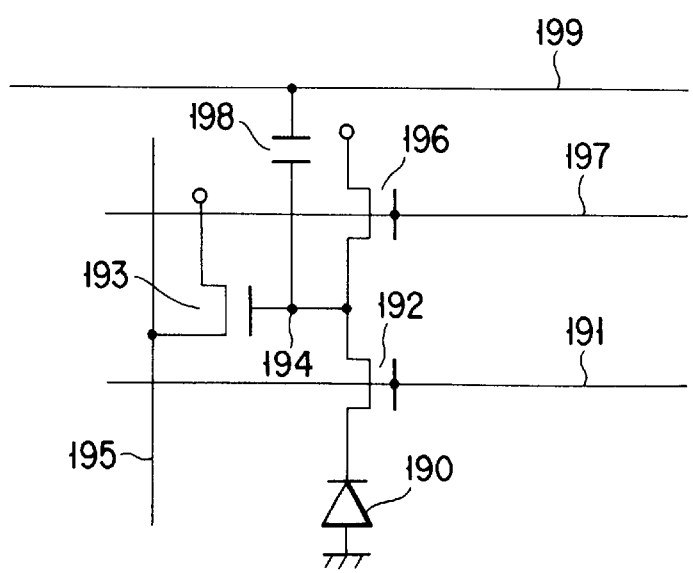
F I G. 25

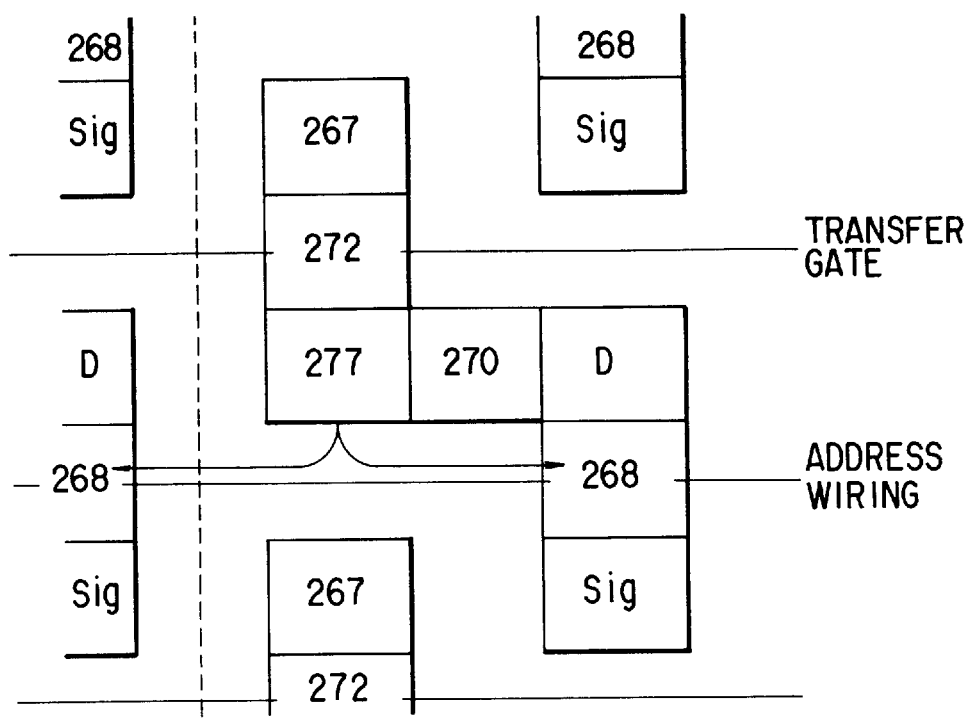
F I G. 30
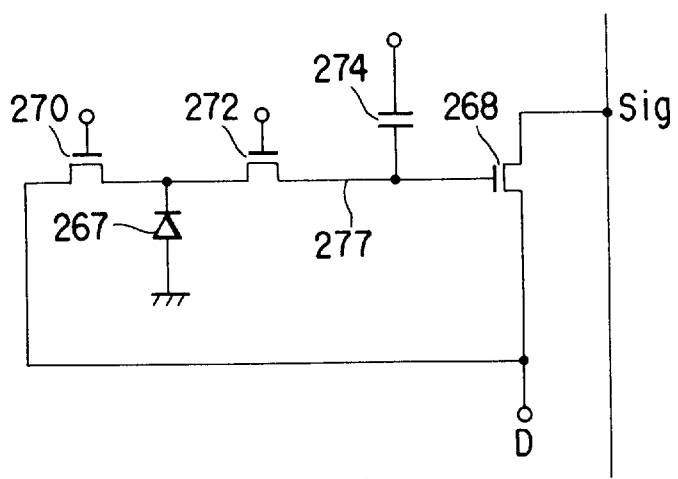
F I G. 31

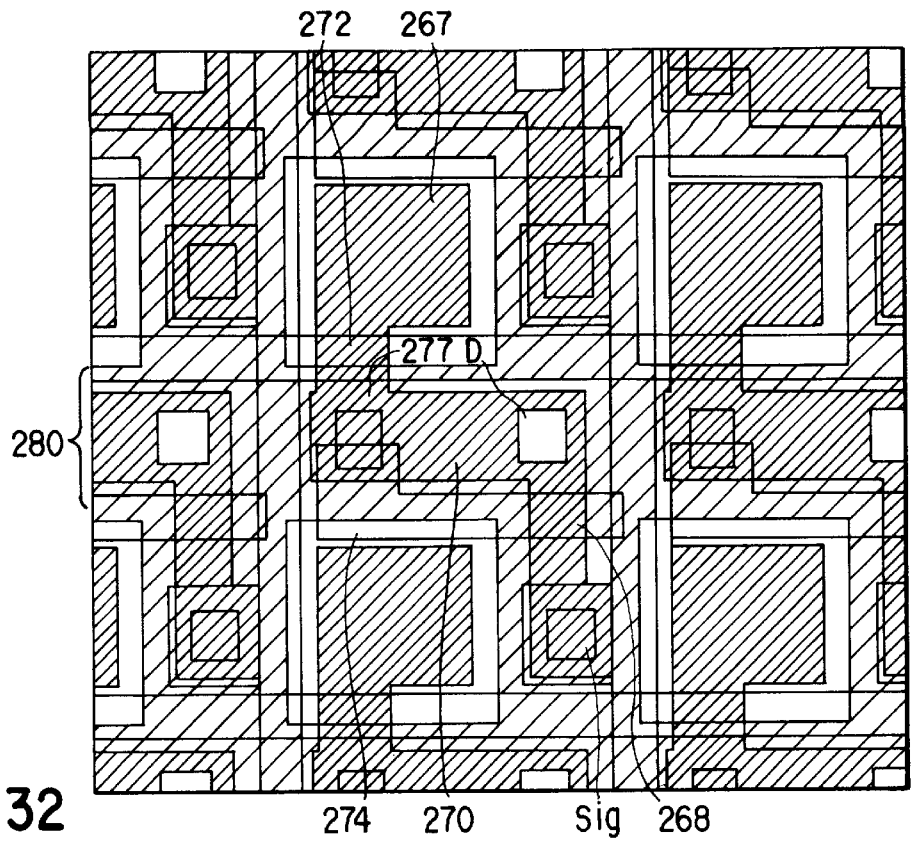
F I G. 32
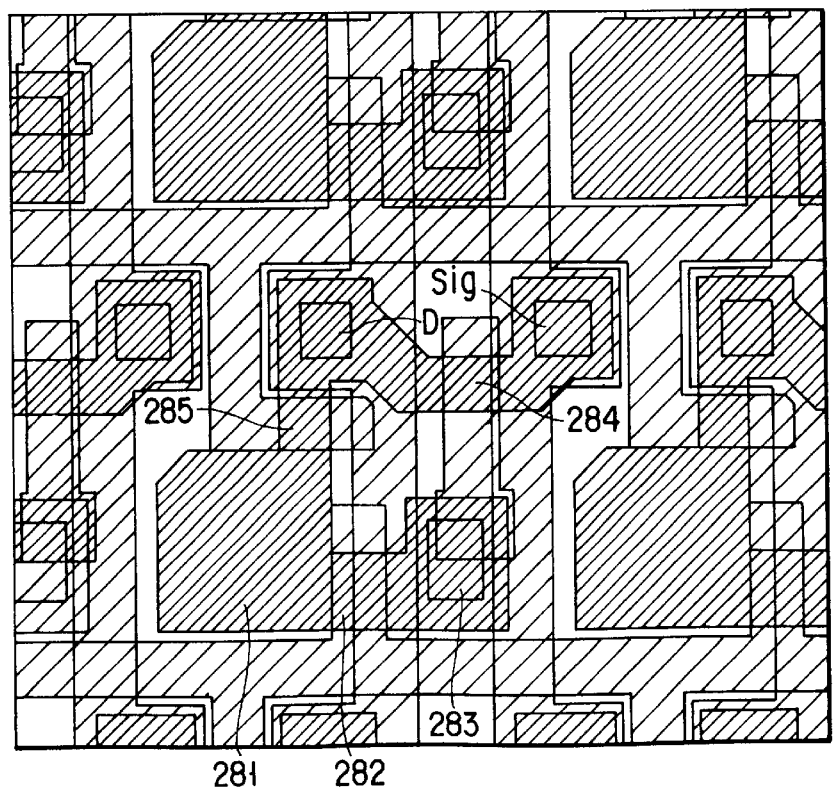
F I G. 33

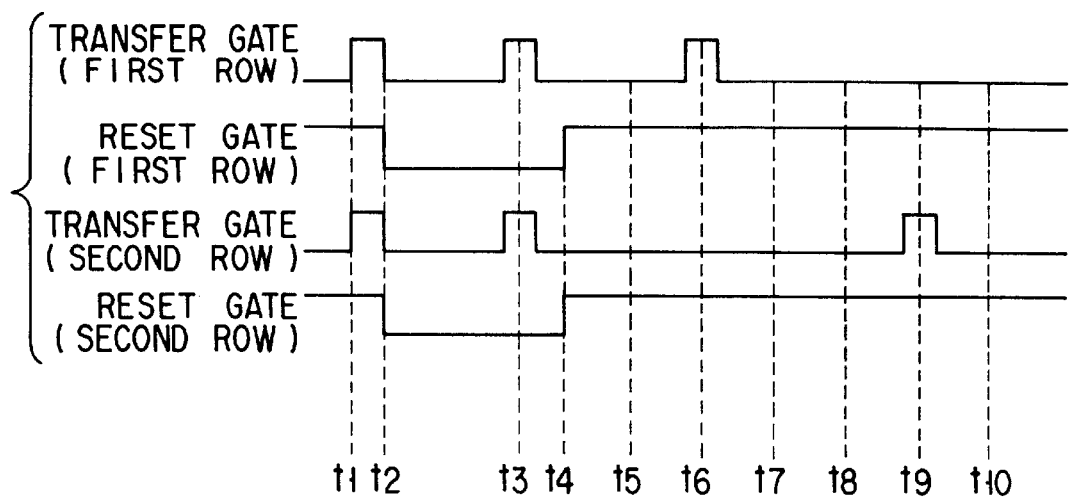
F I G. 34
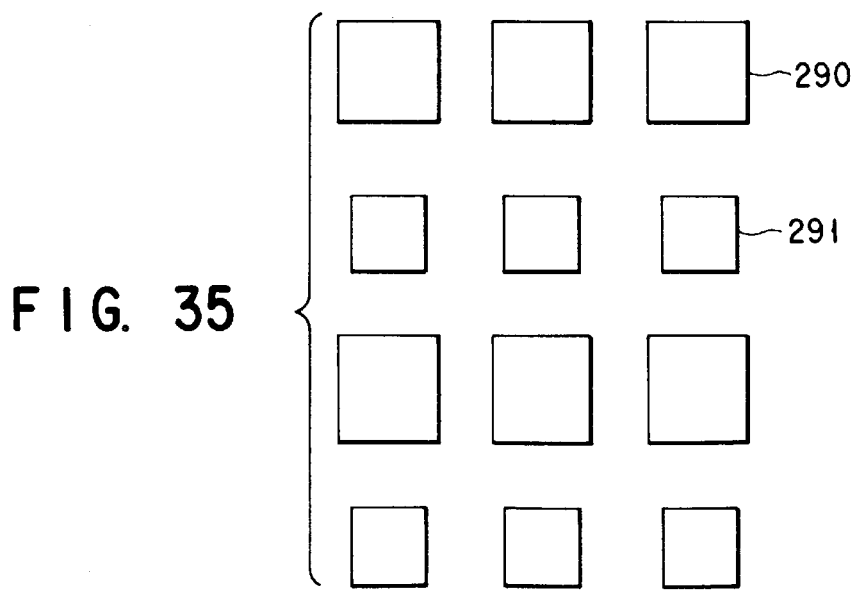
F I G. 35

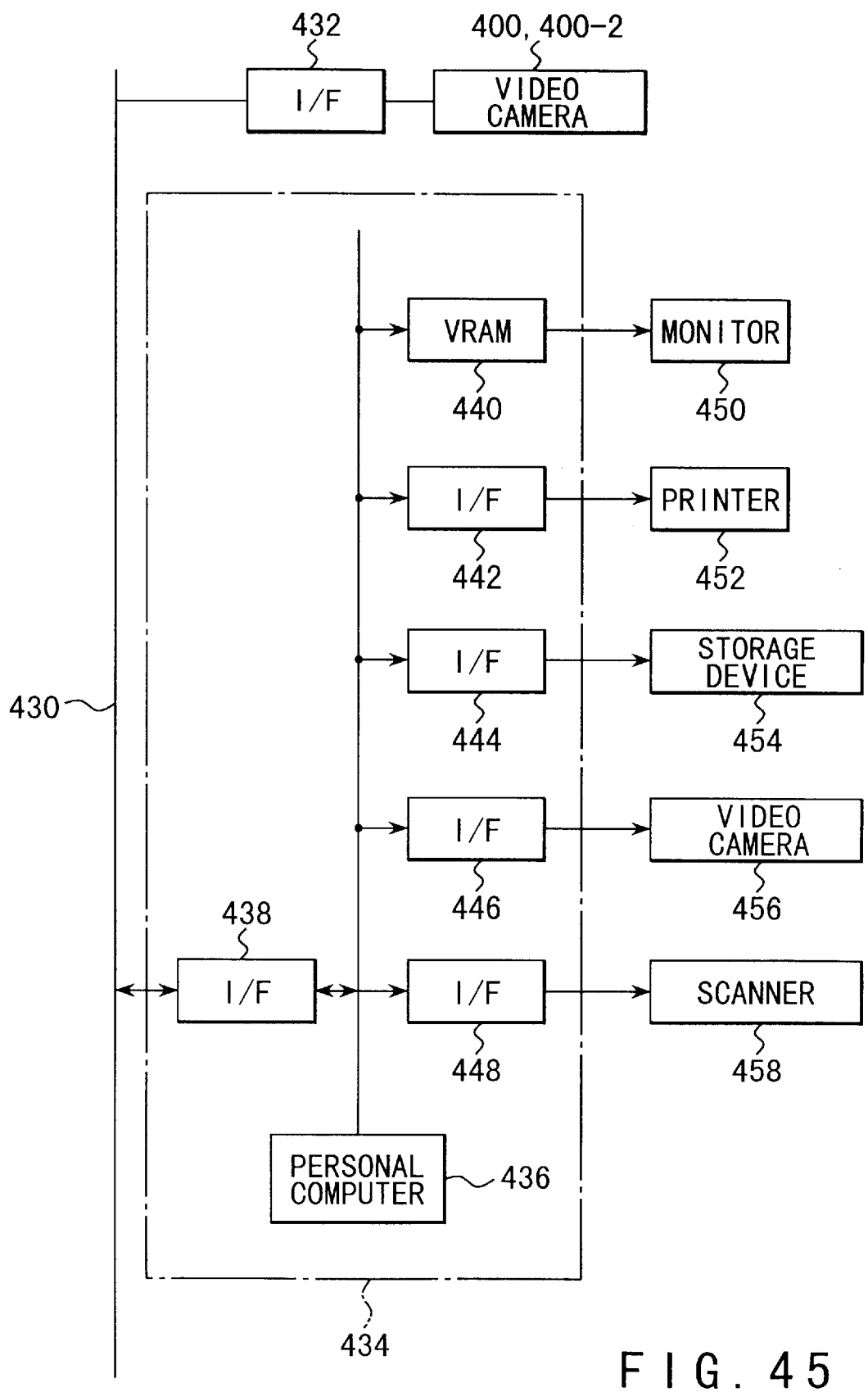
F I G. 4 5

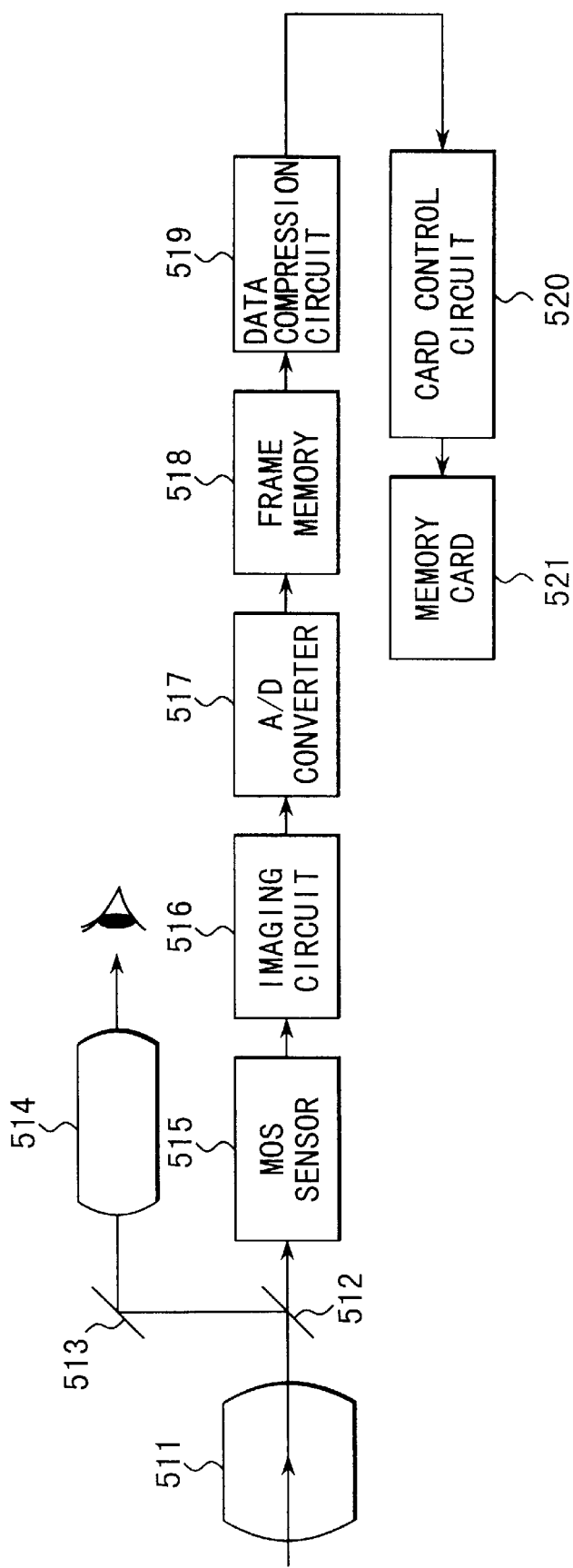
F I G. 46

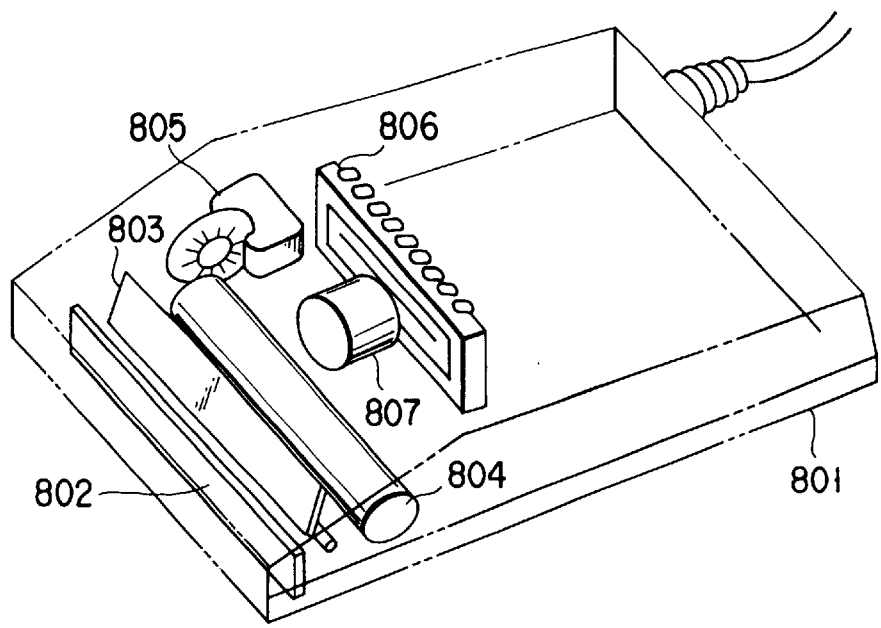
F I G. 49
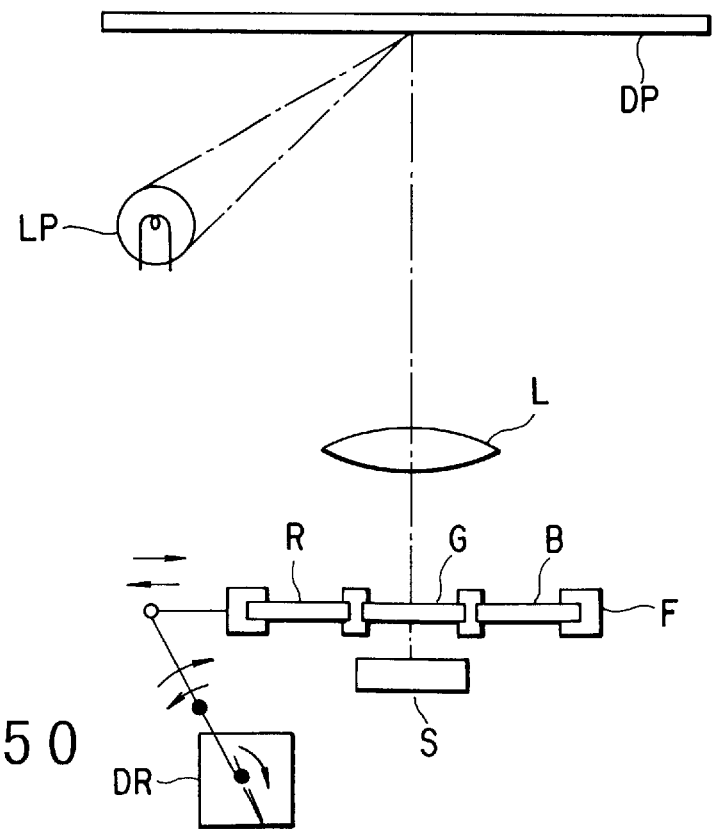
F I G. 50

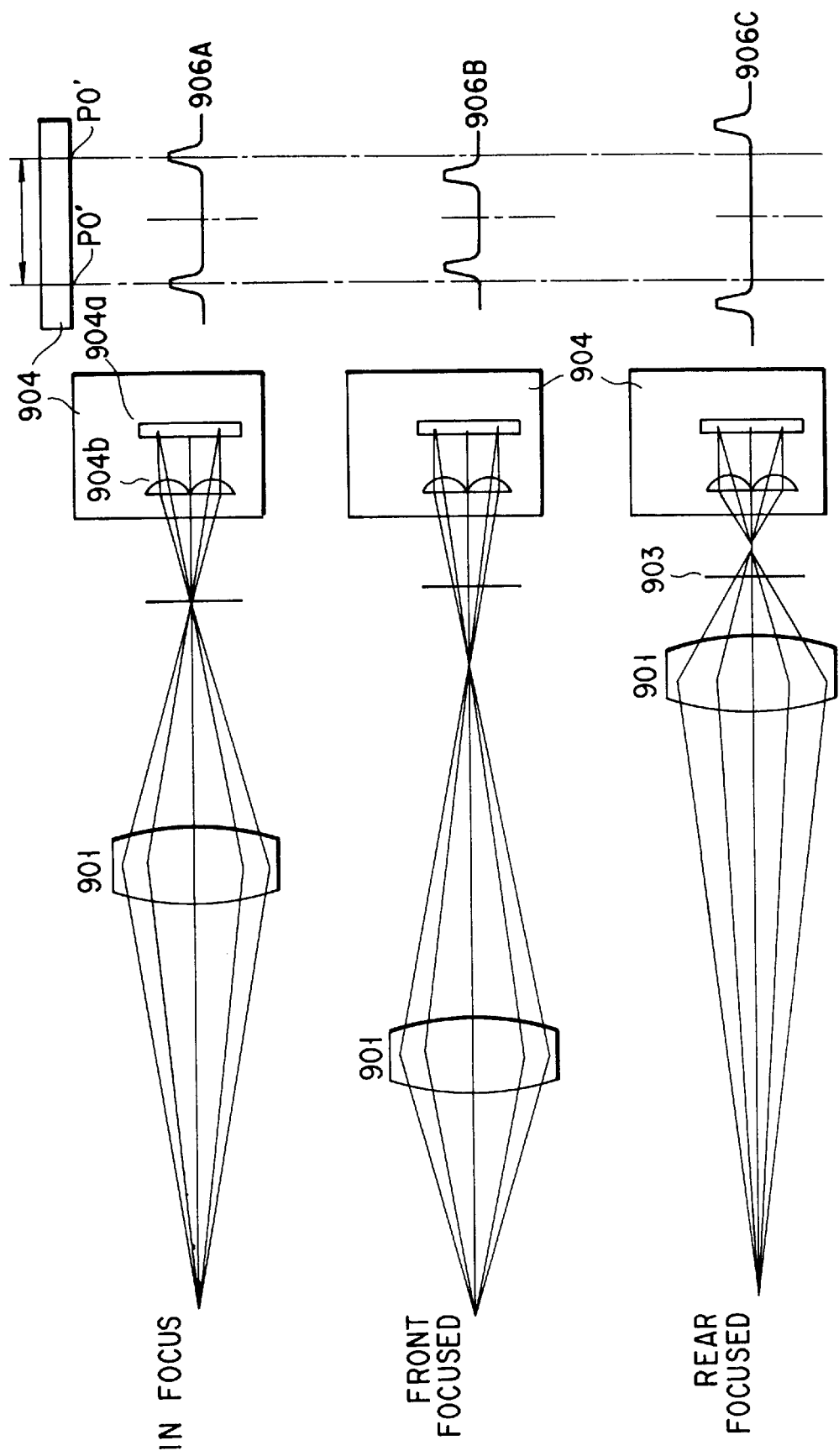
F I G. 53

MOS-TYPE SOLID STATE IMAGING DEVICE WITH HIGH SENSITIVITY

BACKGROUND OF THE INVENTION

The present invention relates to an MOS-type solid state imaging device, and more particularly to an MOS-type solid state imaging device having improved sensitivity. Further, the present invention relates to a system using the MOS-type solid state imaging device having improved sensitivity.

This application is based on Japanese Patent Application No. 8-248361, filed on Sep. 19, 1996, Japanese Patent Application No. 9-61041, filed on Mar. 14, 1997, and Japanese Patent Application No. 9-203816, filed on Jul. 14, 1997, the content of which is incorporated herein by reference.

Since the semiconductor device technique has been progressed, video cameras have been reduced in size and weight thereof and thus significant portability enabling wide use has been achieved. In a case of an electronic apparatus, a battery cell is employed as the power source because the portability must be retained. Hitherto, the video camera has employed a CCD sensor to serve as the image device. However, the CCD sensor requires a plurality of voltage levels when operated. Thus, a power supply circuit must be provided to generate the required voltage levels from the battery. The foregoing structure prevents further reduction of the size of the video camera. What is worse, electric power consumption cannot be reduced.

In order to further easily operate the video camera, size and weight reductions have been attempted. To obtain an image having an excellent quality, a solid state imaging devices have been researched and developed which have a larger number of pixels. To reduce the size and weight of the video camera, the size of the solid state imaging device must be reduced. Moreover, the electric power consumption must be reduced and the required voltage level must be lowered.

To simply reduce the size and enlarge the number of the pixels of the solid state imaging device, each pixel is required to be fined. However, if the pixel is fined, there arises a problem in that the quantity of a signal charge which can be treated by the pixel is reduced. As a result, there arises problems in that the dynamic range of the solid state imaging device is reduced and thus a clear image having an excellent resolution cannot be obtained.

Since a CCD requires a plurality of voltage levels when operated, a simple system cannot be realized in terms of the structure of the camera system and handling of the system. That is, to apply the CCD to a portable camera or a camera to be mounted on a personal computer, there arises a requirement for a solid state imaging device which is capable of reducing the electric power consumption and lowering the required voltage level, which exhibits excellent S/N ratio and which can be operated by a single power source. However, the CCD cannot be operated by a single power source, the electric power consumption cannot be reduced and the required voltage level cannot be lowered. What is worse, the S/N ratio deteriorates if the pixel is fined. Therefore, the CCD cannot meet the above-mentioned requirements.

To meet the above-mentioned requirements, it might be considered to employ an MOS-type solid state imaging device which is capable of reducing the electric power consumption and lowering the required voltage level and which can be operated by a single power source.

The MOS-type solid state imaging device has cells in each of which a signal detected by a photodiode is amplified by a transistor. The MOS-type solid state imaging device has an advantage of high sensitivity. Therefore, the MOS-type solid state imaging device is also called an amplifying type solid state imaging device.

The MOS sensor is manufactured by an MOS process which is widely used to manufacture semiconductor memories, such as DRAMs, and processors, though the CCD sensor is manufactured by a special process. Therefore, the MOS sensor has an advantage that it can be formed on the same semiconductor chip on which the semiconductor memory or a processor is formed or the same manufacturing line for the semiconductor memory or the processor can be used.

However, the conventional MOS sensor using the amplifying transistor has a problem in that the high photoelectric conversion gain cannot easily be obtained in a circumstance that high resolutions have been required by users, that is, high concentration and fine pixels have been required. Therefore, the gain must be raised.

Moreover, the amplifying type MOS sensor has poor dynamic range of about 60 dB which is unsatisfactory level as compared with 90 dB which can be realized by a silver salt photographic film and 70 dB which can be realized by the CCD sensor. Therefore, the amplifying type MOS sensor cannot be combined with the image system unit, such as the video camera, in a viewpoint of practical use when a satisfactory result is attempted to be obtained.

FIG. 1 is a circuit diagram showing a unit cell 10 of the conventional MOS-type solid state imaging device. FIG. 2 is a plan view thereof.

A signal charge generated by photoelectric conversion at a photodiode 1 is read to a gate of an amplifying transistor 4 when a read-out line 2 is made to a high level to turn a read-out transistor 3 on so that the potential of the gate thereof is changed. The potential of a vertical signal line 5 is changed in accordance with the potential of the gate of the amplifying transistor 4.

After the signal has been read, a gate wiring 7 of a reset transistor 6 is made to be a high level so that the potential of the gate of the amplifying transistor 4 is reset to a desired level. Addressing to the unit cell 10 is performed by using an address transistor 9, in series, coupled to the drain of the amplifying transistor 4.

Photoelectric conversion gain g [V/electron] of a unit cell 10 of an MOS-type solid state imaging device provided with a read-out transistor 3 is generated expressed by the following equation:

$$g[\text{V/electron}] = \Delta \text{V/electron} = 1.6 \times 10^{-19}/C_{sn} \qquad (1)$$

where $C_{sn}$ is a capacitor of a detection portion which is the sum of the capacitor of the gate of the amplifying transistor and the substrate capacitor of the drain of the read-out transistor. In actual, the capacitor of the detection portion is mainly the substrate capacitor of the drain of the read-out transistor.

To improve the sensitivity of the MOS-type solid state imaging device, the photoelectric conversion gain of the unit cell must be raised as described above. To obtain a high photoelectric conversion gain, the substrate capacitor of the drain of the read-out transistor must be reduced, as shown in Eq. (1).

Hitherto, the conventional MOS-type sensor has been formed such that one semiconductor region is provided for forming the drain capacitor. Thus, the area is too large to obtain a high photoelectric conversion gain. In the structure shown in FIG. 2, in which the reset transistor 6 for resetting the potential of the gate of the amplifying transistor 4 is connected to the drain of the read-out transistor 3, has a problem in that the substrate capacitor of the drain of the read-out transistor 3 can easily be increased.

Moreover, the above-mentioned conventional structure has another problem in that the drain of the read-out transistor 3 is substantially surrounded by the element isolation region. Since the impurity concentration of the substrate is generally high below the element isolation region, the parasitic capacitor is increased if a large portion of the drain is in contact with the element isolation region. As a result, the photoelectric conversion gain deteriorates and thus there arises a problem in that a sufficiently large dynamic range cannot be obtained.

BRIEF SUMMARY OF THE INVENTION

Accordingly, it is an object of the present invention is to provide a MOS-type solid state imaging device capable of increasing the photoelectric conversion gain in a unit cell and improving the sensitivity.

Another object of the present invention is to provide an image system, such as a video camera, including an MOS-type solid state imaging device capable of raising the gain.

According to the present invention, there is provided a solid state imaging device comprising:

unit cells formed in a surface region of a semiconductor substrate, each of the unit cells comprising a photoelectric converter, a read-out transistor for reading a signal from the photoelectric converter, an amplifying transistor having a gate connected to a drain of the read-out transistor and for amplifying the signal read by the read-out transistor, a reset transistor having a source connected to the drain of the read-out transistor and for resetting a potential of a gate of the amplifying transistor, and an addressing element connected in series to the amplifying transistor and for selecting the unit cell, wherein the read-out transistor is formed in a first device region in the semiconductor substrate, the reset transistor is formed in a second device region in the semiconductor substrate and the drain of the read-out transistor is connected to the source of the reset transistor through a wiring layer formed on the surface of the semiconductor substrate.

According to the solid state imaging device according to the present invention, enlargement of the region for the read-out transistor can be prevented. Therefore, the substrate capacitor of the drain can be reduced and thus the photoelectric conversion gain can be raised.

Additional objects and advantages of the present invention will be, set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a circuit diagram showing the overall MOS-type solid state imaging device according to a first embodiment of the present invention;

FIG. 4 is a circuit diagram showing an example of the vertical address circuit shown in FIG. 3;

FIG. 5 is a circuit diagram showing another example of the vertical address circuit shown in FIG. 3;

FIG. 6 is a circuit diagram showing another example of the vertical address circuit shown in FIG. 3;

FIG. 22 is a graph showing the relationship between the length of the gate and the threshold voltage for explaining a short channel effect of the third embodiment;

FIG. 23 is a circuit diagram showing a unit cell of an MOS-type solid state imaging device according to a fourth embodiment of the present invention;

FIG. 24 is a plan view showing the layout on the substrate according to the fourth embodiment;

FIG. 25 is a circuit diagram showing a unit cell of an MOS-type solid state imaging device according to a fifth embodiment of the present invention;

FIG. 30 shows an example of the disposition of active regions for forming the embedded transistor according to the sixth embodiment;

FIG. 31 is a circuit diagram showing a unit cell according to the sixth embodiment using the embedded transistor;

FIG. 32 is a plan view showing an example of the layout on the substrate according to the sixth embodiment;

FIG. 33 is a plan view showing another example of the layout on the substrate according to the sixth embodiment;

FIG. 34 is a timing chart showing signal waveforms for explaining the operation of the sixth embodiment;

FIG. 35 is a plan view showing an example of disposition of openings in a light shielding film according to a seventh embodiment for improving the efficiency of the photoelectric conversion;

FIG. 45 is a diagram showing an example of application of an MOS sensor to a network system according to a seventeenth embodiment of the present invention;

FIG. 46 is a diagram showing an example of application of an MOS sensor to a still camera according to an eighteenth embodiment of the present invention;

FIG. 49 is a diagram showing a handy image scanner using an MOS sensor according to a twenty-first embodiment of the present invention;

FIG. 50 is a diagram showing an example of the structure of an MOS sensor using a mechanical switch type color filter according to a twenty-second embodiment of the present invention;

FIG. 53 is a diagram showing the principle of focusing of the automatic focusing mechanism according to the twenty-fourth embodiment.

DETAILED DESCRIPTION OF THE INVENTION

A preferred embodiment of an MOS-type solid state imaging device according to the present invention will now be described with reference to the accompanying drawings.

First Embodiment

Figure 7:
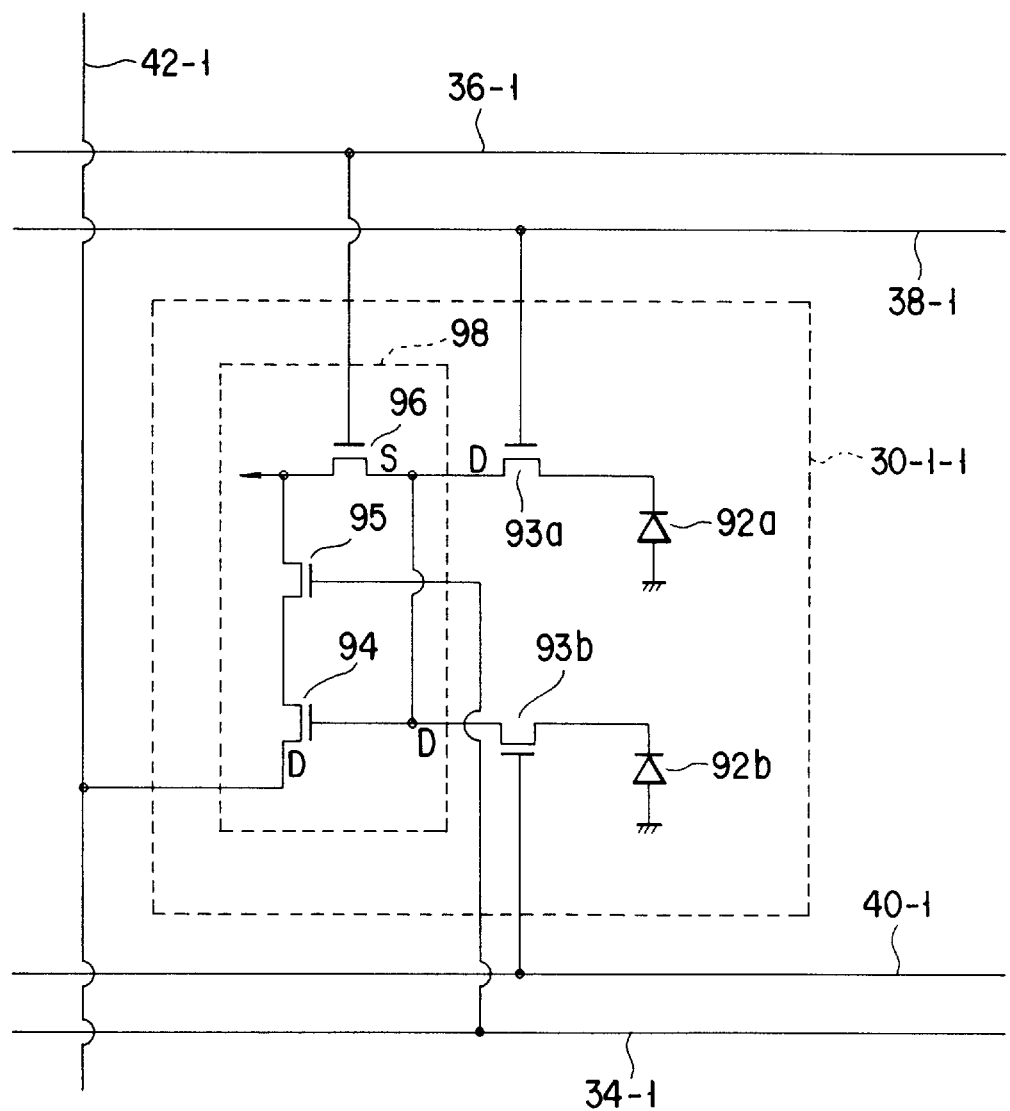
FIG. 7 is a circuit diagram showing a unit cell according to the first embodiment.
Figure 19:
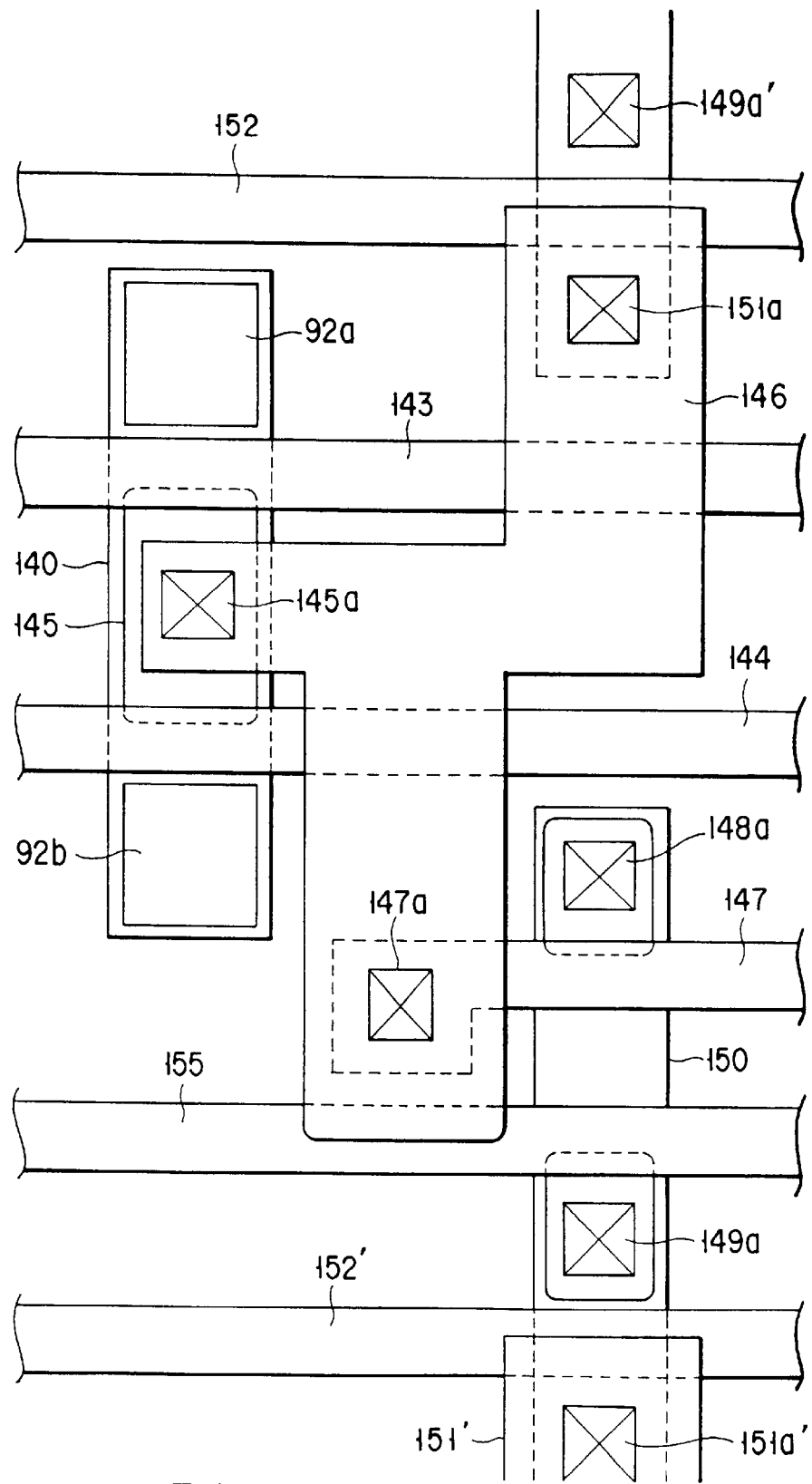
FIG. 19 is a plan view showing the layout on the substrate according to the first embodiment.

FIG. 3 shows the structure of the MOS-type solid state imaging device according to a first embodiment of the present invention. Unit cells 30-i-j are disposed in row and column directions to form a two-dimensional matrix array. Although only 2×2 cells are illustrated in FIG. 3, thousands× thousands cells are provided in actual. Referring to FIG. 3, an index i represents a row and an index j represents a column. The detailed structure of the unit cell 30-i-j is shown in FIGS. 7 and 19.

The MOS-type solid state imaging device according to the present invention may be applied to video cameras, electronic still cameras, digital cameras, facsimile machines, copying machines, scanners and the like.

Vertical address lines 34-1, 34-2, . . . extending horizontally from a vertical address circuit 32 are connected to the unit cells of each row so that a horizontal line for reading signals is determined. Similarly, reset lines 36-1, 36-2, . . . horizontally extending from the vertical address circuit 32 are connected to the unit cells of each row. Since the unit cell according to this embodiment includes two photodiodes as described later, also first photodiode selection lines 38-1, 38-2, . . . and second photodiode selection lines 40-1, 40-2, . . . horizontally extend from the vertical address circuit 32 so as to be connected to the unit cells of each row.

The unit cells of each column are connected to vertical signal lines 42-1, 42-2, . . . disposed in the vertical direction (columnar direction). Load transistors 44-1, 44-2, . . . are connected to ends of the vertical signal lines 42-1, 42-2, . . . . The gates and drains of the load transistors 44-1, 44-2, . . . are commonly connected to a drain voltage terminal 46.

Other ends of the vertical signal lines 42-1, 42-2, . . . are connected to gates of MOS transistors 48-1, 48-2, . . . . Sources of the MOS transistors 48-1, 48-2, . . . are connected to drains of MOS transistors 50-1, 50-2, . . . . The MOS transistors 48-1, 48-2, . . . and 50-1, 50-1, . . . act as source follower circuits. Gates of the MOS transistors 50-1, 50-2, . . . are connected to a common gate terminal 52.

The junctions between the MOS transistors 48-1, 48-2, . . . and the MOS transistors 50-1, 50-2, . . . are connected to ends of clamp capacitors 56-1, 56-2, . . . through sample and hold transistors 54-1, 54-2, . . . Gates of the sample and hold transistors 54-1, 54-2, . . . are connected to a common gate terminal 66. Sample and hold capacitors 58-1, 58-2, . . . and clamp transistors 60-1, 60-2, . . . are, in parallel, connected the other ends of the clamp capacitors 56-1, 56-2, . . . . Other ends of the sample and hold capacitors 58-1, 58-2, . . . are grounded. Other ends of the clamp capacitors 56-1, 56-2, . . . are also connected to a signal output terminal (a horizontal signal line) 64 through horizontal read-out transistors 62-1, 62-2, . . . . The horizontal read-out transistors 62-1, 62-2, . . . are selected by a horizontal address circuit 68.

The vertical address circuit 32 is a circuit for collectively shifting plural signals, in this case, four signals and has a structure as shown in any one of FIGS. 4, 5 and 6. In the structure shown in FIG. 4, a shift register 72 sequentially shifts and outputs an input signal 70 from a plurality of output terminals. The outputs of the shift register 72 are synthesized with a 4-input signal 78 by a multiplexer 76. In the structure shown in FIG. 5, an output from a decoder 82 for decoding an encode input 80 is synthesized with a 4-input signal 86 by a multiplexer 84. In the structure shown in FIG. 6, outputs from four shift register 90a, 90b, 90c and 90d are collected so as to be control signal lines for the unit cells of each row.

FIG. 7 shows an example of the structure of the unit cell 30-i-j shown in FIG. 3. Although the structure of only the unit cell 30-1-1 is illustrated here, each of the other unit cells 30-1-2, . . . has a similar structure.

As shown in FIG. 7, the unit cell of the MOS-type solid state imaging device according to the first embodiment comprises two photodiodes 92a and 92b adjacent in the vertical direction; two read-out transistors 93a and 93b for selecting detection signals from the photodiodes 92a and 92b as the output from the unit cell; and an output circuit 98 for outputting, from the unit cell, the output signal selected by the read-out transistors 93a and 93b. The read-out transistors 93a and 93b are independently turned on/off. When the read-out transistor 93a or 93b is turned on, charges stored in the photodiode 92a or 92b can be supplied to an output circuit 98 in a time division manner.

The output circuit 98 comprises an amplifying transistor 94 having a gate, to which a charge signal output from the photodiode 92a or 92b is supplied through the read-out transistor 93a or 93b and amplifying the charge signal, an address transistor 95 for selecting a unit cell for reading the signal and a reset transistor 96 for charging/discharging the gate of the amplifying transistor 94.

A vertical address line 34-1 horizontally extending from the vertical address circuit 32 is connected to the gate of the address transistor 95 to select a line from which a signal is read out. Similarly, the reset line 36-1 and the photodiode selection lines 38-1 and 40-1 horizontally extending from the vertical address circuit 32 respectively connected to the gate of the reset transistor 96 and the gates of the read-out transistors 93a and 93b.

As described above, the unit cell 30-i-j of the MOS-type solid state imaging device according to this embodiment has a structure in which the plural (which is two in this embodiment) photodiodes 92a and 92b adjacent in the vertical direction share one output circuit 98. Therefore, the unit cell is comprised of five transistors including the two transistor for selecting the photodiodes. That is, 2.5 transistors are needed for one photodiode. Therefore, the area of the unit cell can be reduced as compared with the conventional structure in which four transistors are required for one photodiode. Thus, a solid state imaging device capable of reducing the size thereof can be realized.

The unit cell 30-i-j of the MOS-type solid state imaging device according to this embodiment is characterized in that the two photodiodes 92a and 92b respectively are connected to the output circuit 98 through the read-out transistors 93a and 93b, that is, the photodiodes 92a and 92b are connected in parallel. The connection method permitting the plural photodiodes 92 share one output circuit 98 is not limited to the above-mentioned method. A so-called series connection method may be employed in which only one photodiode is directly connected to the output circuit and the other photodiode are connected to the output circuit through the one photodiode connected to the output circuit. However, the foregoing series connection method cannot easily independently read detection signals from a plurality of photodiodes without destruction of detection signals stored in the other photodiodes.

Since an amplifying-type MOS-type solid state imaging device involves a drawback that variation of the threshold voltage of the amplifying transistor 94 in the unit cells 30-i-j is generally superimposed on the output signal from the unit cell, the same outputs cannot be obtained even if the photodiodes 92a or 92b in the unit cells have the same potential. When an image is reproduced, two-dimensional noise (called as "fixed pattern noise" which is generated because noise is fixed in terms of the position) corresponding to the variation of the threshold voltages of the amplifying transistors 94 in the unit cells is generated. Therefore, a noise canceler circuit for suppressing fixed pattern noise is connected to an output of the unit cell according to this embodiment. Although FIG. 3 shows a correlated double sampling type noise canceler circuit which obtains a difference between the signal and noise in a voltage region, the noise canceler circuit is not limited to the correlated double sampling circuit. Other noise canceler circuits may be employed.

Figure 8:
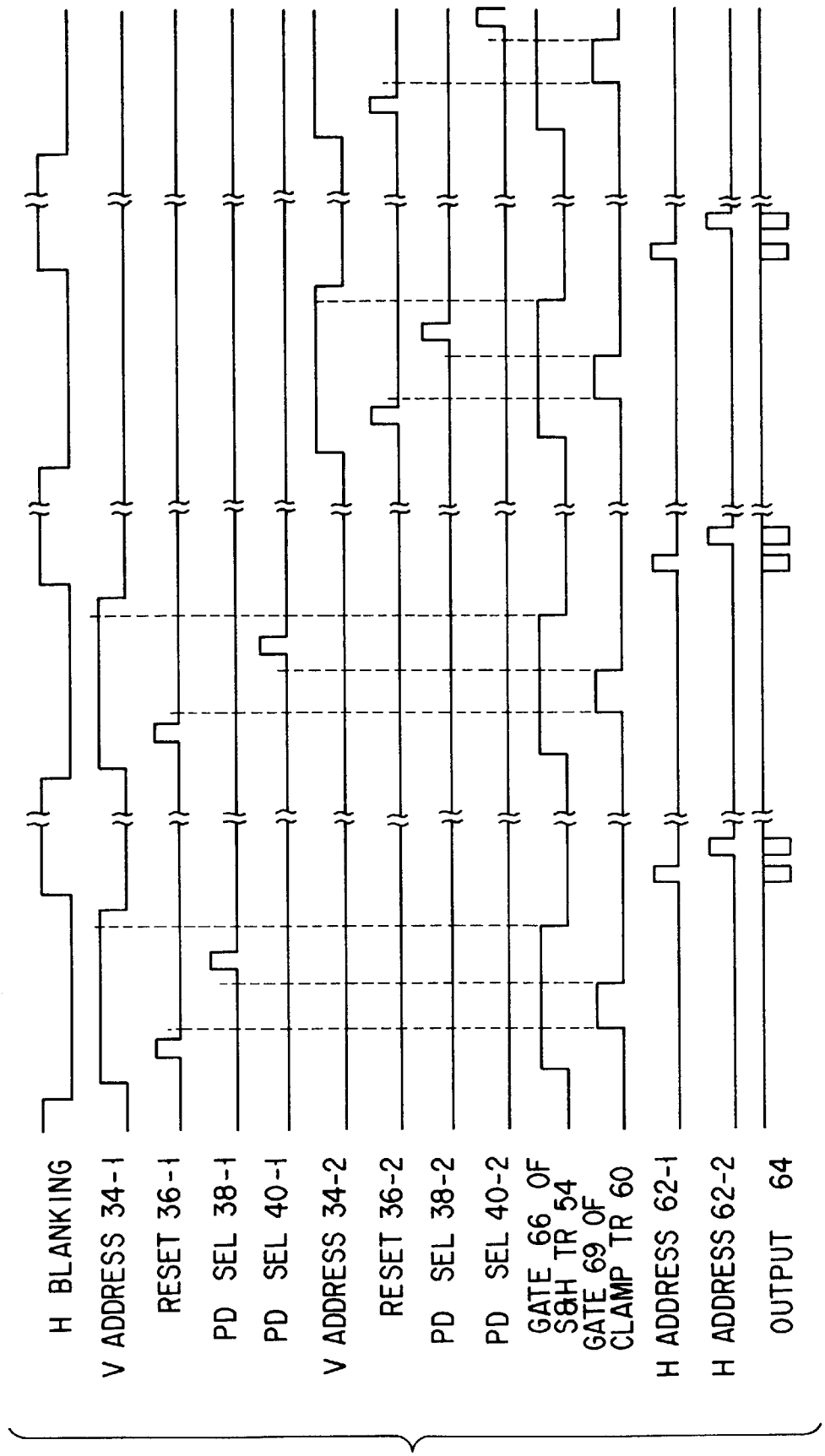
FIG. 8 is a timing chart showing signal waveforms for explaining the operation of the first embodiment.

Referring to a timing chart shown in FIG. 8, the operation of the MOS-type solid state imaging device of the first embodiment will now be described. Since the common drain terminal 46 of the load transistors 44-1, 44-2, . . . , the common gate terminal 52 of the transistors 50-1, 50-2, . . . in the impedance converter and the common source terminal 67 of the clamp transistors 60-1, 60-2, . . . are operated with a direct current, they are omitted from the timing chart.

When a high level address pulse is applied to the vertical address line 34-1, the address transistor 95 of the unit cells 30-1-1, 30-1-2, . . . connected to the vertical address line 34-1 is turned on so that a source follower circuit is formed by the amplifying transistor 94 and the load transistors 44-1, 44-2, . . . .

The level of the common gate 66 of the sample and hold transistors 54-1, 54-2, . . . is raised to a high level so that the sample and hold transistors 54-1, 54-2, . . . are turned on. Then, the level of the common gate 69 of the clamp transistors 60-1, 60-2, . . . is raised to a high level so that the clamp transistors 60-1, 60-2, . . . are turned on.

When a high level reset pulse is applied to the reset line 36-1, the reset transistors 96 of the unit cells 30-1-1, 30-1-2, . . . connected to the reset line 36-1 are turned on.

Thus, the charges of the input terminal of the output circuits 98 are reset. Therefore, the noise components corresponding to the variation of the threshold voltages of the amplifying transistors 94 in a case where the photodiodes 92a and 92b have no signal charges are output from the output circuits 98.

Then, the level of the common gate 69 of the clamp transistors 60-1, 60-2, . . . is made to be low so that the clamp transistors 60-1, 60-2, . . . are turned off. Therefore, the noise components appeared in the vertical signal lines 42-1, 42-2, . . . are stored in the clamp capacitors 56-1, 56-2, . . . The potentials of the vertical signal lines 42-1, 42-2, . . . are clamped by the clamp capacitors 56-1, 56-2, . . . at a timing when the clamping pulse, which is applied to the common gate 69 of the clamp transistors is returned to the low level, the timing being between the reset pulse timing and the photodiode selection pulse timing.

In the unit cells 30-1-1, 30-1-2, . . . , signal charges are stored in the photodiodes 92a after resetting the potential of the photodiodes 92a (normally, after the previous signal read out). Then, the signal charges are read out. Therefore, when a selection pulse of high level is applied to the photodiode selection line 38-1, an output signals (sum of the signal charge component and the noise component) from the photodiodes 92a are output from the output circuits 98. Since the noise components are stored in the clamp capacitors 56-1, 56-2, as described above, the degrees of change in the voltage of the vertical signal lines 42-1, 42-2, . . . that is, only signal voltages free from the fixed pattern noise obtained by subtracting the noise component from the sum of the signal component and the noise component appear in the clamp nodes N-1, N-2, . . . .

When only the noise component is read first followed by reading the sum of the signal component and the noise component, also random noise which is generated owning to the resetting operation can be canceled.

Then, the level of the common gate terminal 66 of the sample and hold transistors 54-1, 54-2, . . . is lowered and the sample and hold transistors 54-1, 54-2, . . . are turned off. As a result, voltages free from noise appeared on the clamp nodes N-1, N-2, . . . are stored in the sample and hold capacitors 58-1, 58-2, . . . .

Then, horizontal address pulses are sequentially applied to the horizontal read-out transistors 62-1, 62-2, . . . so that signals from the photodiodes 92a of the unit cells 30-1-1, 30-1-2, . . . free from noise and stored in the sample and hold capacitors 58-1, 58-2, . . . are sequentially read from the output terminal (the horizontal signal line) 64.

When a high level address pulse is applied to the vertical address line 34-1, a high level selection pulse is applied to the photodiode selection line 40-1 instead of the photodiode selection line 38-1 to cause output signals from the photodiodes 92b of the unit cells 30-1-1, 30-1-2, . . . to be output from the output circuits 98. Other operations are the same as those of the above-mentioned process.

Then, the foregoing operation is repeated for the vertical address lines 34-2, 34-3, . . . so that signals of all cells disposed in the two dimensional matrix can be read out.

The sequential order of the timings shown in FIG. 8 will now be described. The following three orders are required.

(1) raising of the vertical address→falling of the reset pulse→falling of the clamp pulse→raising of the photodiode selection pulse→falling of the photodiode selection pulse falling of the sample and hold pulse→falling of vertical address;

(2) raising of the sample and hold pulse→raising of the photodiode selection pulse; and (3) raising of the clamp pulse→raising of the photodiode selection pulse.

Although the sequential order of raising of the vertical address, raising of the sample and hold pulse, raising of the clamp pulse and raising of the reset pulse may be performed arbitrarily, it is preferable that the following sequential order be employed:

raising of the vertical address→raising of the sample and hold pulse→raising of the clamping pulse→raising of the reset pulse As described above, according to the operation shown in FIG. 8, the voltage which is the difference between a reset state and no signal exists and a state in which a signal (and noise) exists is appeared in the clamp node N. Therefore, the fixed pattern noise, which is generated attributable to the variation in the threshold voltages of the amplifying transistors 94 in the unit cells, can be compensated. That is, a circuit formed by the clamp transistor 54, the clamp capacitor 56, the sample and hold transistor 60 and the sample and hold capacitor 58 acts as a noise canceler.

The noise canceler according to this embodiment is connected to the vertical signal line 42-j through an impedance converter formed by the transistors 48-j and 50-j serving as the source follower circuit. That is, the vertical signal line 42-j is connected to the gate of the transistor 48-j. Since the gate of the transistor 48-j has a very small capacitor, the amplifying transistor 94 of the unit cell charges only the vertical signal lines 42-1, 42-2, . . . . Therefore, the CR time constant is short and thus a steady state is realized in a short time. Therefore, the timings at which the reset pulse and the photodiode selection pulse are applied can be advanced. Thus, the noise canceling operation can be completed in a short period of time. Since the noise canceling operation of a television is must be performed in a horizontal blanking period, a great advantage can be realized when noise canceling can accurately be completed in a short period of time. Since the impedance of the noise canceler viewed from the unit cell is not changed between a state where noise is output and a state where sum of the signal and noise is output, noise can accurately be canceled.

The structure of this embodiment will now be described.

As can be understood from the structure of the circuit shown in FIG. 3, the clamp capacitor 56 and the sample and hold capacitor 58 are directly connected to each other and thus disposed adjacently. Therefore, the clamp capacitor 56 and the sample and hold capacitor 58 can be stacked on the same portion so that the size of the unit cell is reduced.

Specifically, a first electrode 106 is formed on the silicon substrate 102 through a first insulation film 104 so that the sample and hold capacitor 58 is formed. Moreover, a second electrode 110 is formed on the first electrode 106 through a second insulation film 108 so that the clamp capacitor 56 is formed.

Figure 9:
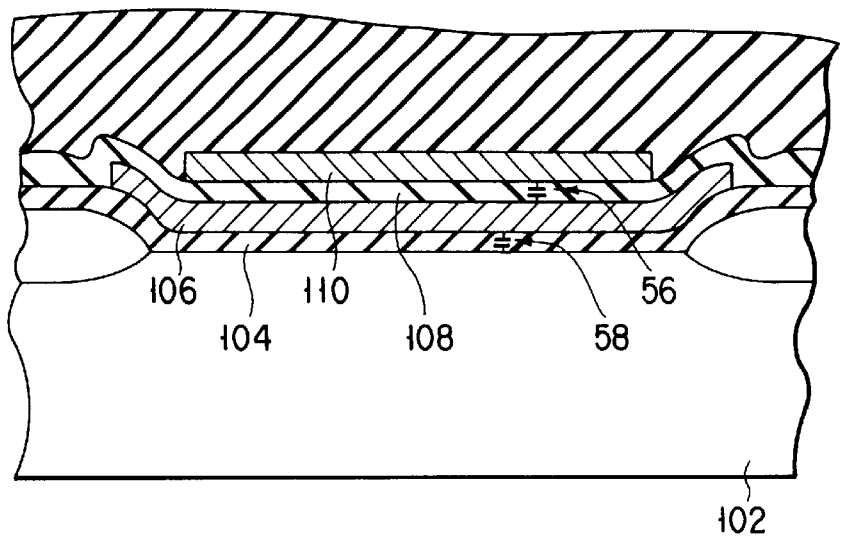
FIG. 9 is a partial cross sectional view showing the unit cell according to the first embodiment.

As can be understood from FIG. 9, the first electrode 106 is made to be a common electrode. Since the clamp capacitor 56 and the sample and hold capacitor 58 are stacked, the same capacitance can be obtained with an area which is half of the area required when they are formed individually.

In this embodiment, the peripheral circuits, such as the unit cells 30-1-1, 30-1-2, . . . , the vertical address circuit 32 and horizontal address circuit 68 are formed in a surface region of a $p^+$ type impurity region formed on a $p^-$ type substrate.

Figures 10A, 10B:
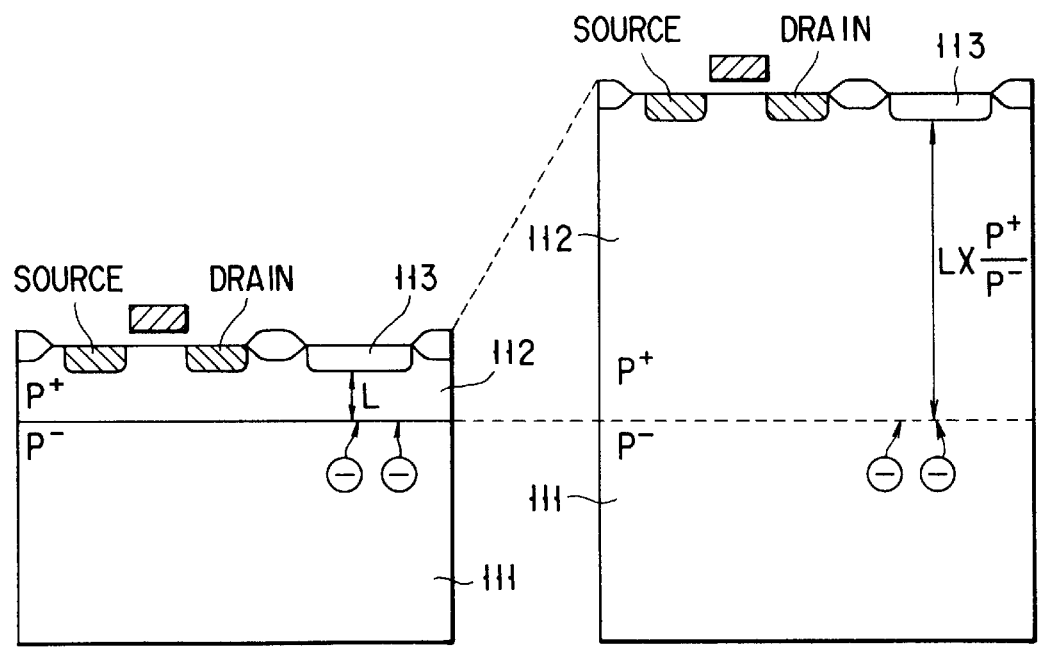
FIGS. 10A and 10B are cross sectional views showing the characteristics of the structure of the unit cell according to the first embodiment.

FIGS. 10A and 10B are cross sectional views of the foregoing semiconductor substrate.

As shown in FIG. 10A, cell elements, such as a photodiode 113, are formed in the surface region of the semiconductor substrate in which a p$^+$ type impurity region 112 is formed on a p$^-$ type substrate 111.

Since the substrate is formed as described above, the diffused potential existing in the p$^-$/p$^+$ boundary partially prevents introduction of a dark current generated in the p$^-$ type substrate 111 into the p$^+$ region.

As a result of detailed analysis of the flow of electrons, the thickness L of the p$^+$ type impurity region 112 is observed for electrons generated on the p$^-$ type substrate to be the multiple of the thickness L and the ratio of concentrations of p$^+$ and p$^-$, that is, L·p$^+$/p$^-$.

That is, the distance from the p$^-$ type substrate 111, which the source for the dark current, to the photodiode 113 is observed to be made farther by p$^+$/p$^-$ times. A portion of the dark current is generated in a depletion layer adjacent to the photodiode 113 as well region as a portion flowed from a deep portion of the substrate. The dark current which is generated in the depletion layer is substantially the same as the dark current which is flowed from the deep portion of the substrate. Since the thickness of the depletion layer is about 1 $\mu$m, the dark current, which is flowed from the deep portion of the substrate, is also flowed from a depth of about 100 $\mu$m. The depth is called as diffusion distance in the p type semiconductor. The reason why these two dark currents are similar as described above is that the generation probability of the dark current per unit volume in the depletion layer is higher. Since the dark current, which is generated in the depletion layer, cannot be separated from a signal current in principle, reduction of the dark current can be realized by reducing the dark current component which is flowed from the deep portion in the substrate.

Since the cell is formed in the surface region of the semiconductor substrate in which the p$^+$ type impurity region 112 is formed on the p$^-$ type substrate 111, a variation of the potential of the substrate occurring owning to generation of the dark current can be prevented. Since the p type substrate has a large thickness and thus low resistance, the noise canceler circuit can reliably be operated, as described above.

If the temperature of the device is raised, the component flowed from the deep position in the substrate is rapidly increased. The foregoing fact is an important factor. Therefore, the component flowed from the deep position in the substrate must be sufficiently smaller than the component generated in the depletion layer. Specifically, the dark current flowed from the deep position in the substrate must be smaller by about one digit as compared with that generated in the depletion layer. That is, the component flowed from the deep position in the substrate must be reduced to about 1/10 by setting p$^+$/p$^-$ to be 10.

It can be said that no dark current is flowed from the deep position in the substrate in the case of a semiconductor substrate composed of an n type substrate and a p type well region. To obtain the same level as that of the foregoing semiconductor substrate, the dark current flowed from the deep position in the substrate must be reduced to about 1/100 by setting p$^+$/p$^-$ to be 100.

A proven CCD has the impurity concentration in the n type embedded channel is about $10^{16}$ cm$^{-3}$, while the impurity concentration in the p type layer (which is p type substrate in this embodiment) surrounding the embedded channel for stably manufacturing the diffusion layer of the embedded channel is about $10^{15}$ cm$^{-3}$.

The concentration of the p$^+$ layer is about $10^{16}$ cm$^{-3}$ when p$^+$/p$^-$ is made to be 10. The concentration is about $10^{17}$ cm$^{-3}$ when the p$^+$/p$^-$ is made to be 100. Thus, the concentration is made to be substantially the same as the impurity concentration in the n type embedded channel or higher than that of the n type embedded channel by one digit.

Therefore, use of the p$^+$ layer having the above-mentioned impurity concentration has not been employed for the proved CCD. Another problem arises in that the sheet resistance of the substrate is raised if the impurity concentration of the p$^-$ layer is lowered.

However, the amplifying type MOS imaging device, having no embedded channel as in the CCD, is permitted to somewhat freely set the value of the p$^+$/p$^-$ without the necessity of lowering the impurity concentration of the p$^-$ layer.

Therefore, also improvement of the semiconductor substrate composed of the n type substrate and the p type well region by lowering the resistance of the p type well region enables a cell to be formed.

Figure 11:
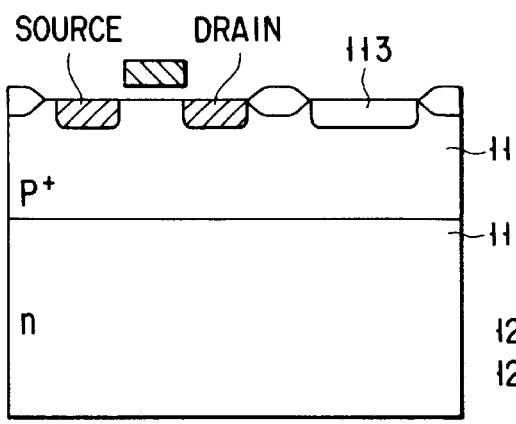
FIG. 11 is a cross sectional view showing a modification of the unit cell according to the first embodiment.
Figure 12:
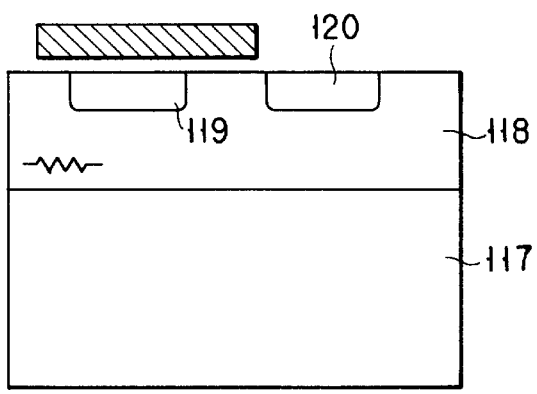
FIG. 12 is a cross sectional view of a cell of a CCD type solid state imaging device.

FIG. 11 is a cross sectional view showing a unit cell in which a p$^+$ well region 116 having low sheet resistance is formed on an n type substrate 115. FIG. 12 is a cross sectional view showing a unit cell of the CCD.

The impurity concentrations in the n type substrate 117, the p type well region 118 and the n type embedded channel 119 of the CCD respectively are set to be about $10^{14}$ cm$^{-3}$, about $10^{15}$ cm$^{-3}$ and about $10^{16}$ cm$^{-3}$, in order to stably perform manufacture.

Since the impurity concentrations in the n type photodiode 120 can somewhat freely be set, any particular limit exists in the manufacturing process. The sheet resistance of the p type well region 118 is about 100 k $\Omega$/□ when the impurity concentrations is about the above-mentioned value. As described above, the CCD involves a very low noise even if the concentration is such a very high level.

In a case where a noise canceler circuit is employed in the amplifying type MOS imaging device, the sheet resistance of the p type well region is a very important factor. The reason for this is that the period of time in which disturbance of the potential of the p type well region 118 caused by the reset pulse must match the system to which the foregoing apparatus is applied.

The NTSC system which is the present television system is arranged such that the noise canceler circuit is operated in about 11 [$\mu$s] which is a horizontal blanking period. The disturbance of the potential of the p type well region 118 must be converged to about 0.1 [mV].

The above-mentioned very small value of 0.1 [mV] is caused from a fact that the noise voltage output from the CCD is about the foregoing level. To converge the value to the very low level of 0.1 [mV] in a very short time period of 11 [$\mu$s], the sheet resistance of the p type well region 118 must be made to be 1 k $\Omega$/□ as a result of detailed analysis. The foregoing value is about 1/100 of the conventional CCD.

To achieve this, the impurity concentrations of the p type well region 118 is raised to about 100 times. As described in the description about the p type substrate, the CCD cannot meet the foregoing level. Since the Hi-Vision TV system has the horizontal blanking period set to 3.77 [$\mu$s], the sheet resistance of the p type well region 118 must be 300 $\Omega$/□ or lower.

It might be considered feasible to employ another modification in which a high concentration p$^+$ sandwich layer is formed on a p type substrate and a p type layer is formed on the concentration p$^+$ sandwich layer.

Figure 14:
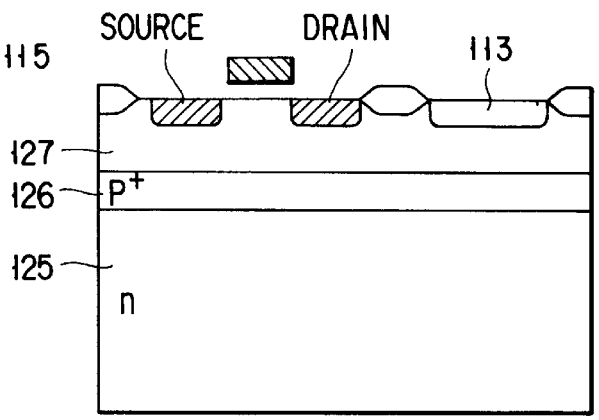
FIG. 14 is a cross sectional view showing a further modification of the unit cell according to the first embodiment.
Figure 13:
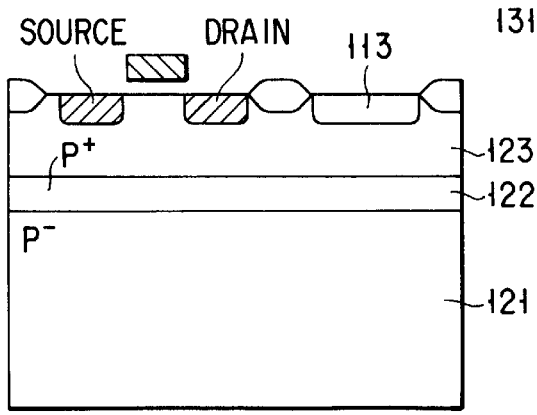
FIG. 13 is a cross sectional view showing another modification of the unit cell according to the first embodiment.

FIG. 13 is a diagram showing the structure of a semiconductor substrate in which a p$^+$ type sandwich layer 122 is formed between a p$^-$ type substrate 121 and a p type layer 123. FIG. 14 is a diagram showing the structure of a semiconductor substrate in which a p⁺ type sandwich layer 126 is formed between an n type substrate 125 and a p type layer 127.

The foregoing p⁺ sandwich layers 122 and 127 can be formed by a mega-volt ion implanting apparatus exhibiting a high acceleration rate.

In addition to the photodiode 113 and the transistors which are elements for the unit cell, peripheral circuits, such as a horizontal address circuit and a vertical address circuit are formed on the p type layer.

Figure 15:
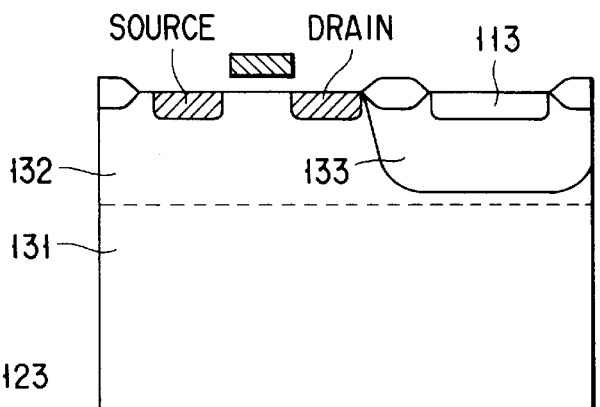
FIG. 15 is a cross sectional view showing a still another modification of the unit cell according to the first embodiment.

FIG. 15 is a diagram showing the structure of a semiconductor substrate in which the photodiode 113 is formed in the surface region in a high concentration p type well region 133 and the other portions are formed in the surface region in a p type well region 132 on the semiconductor substrate 131.

When the above-mentioned structure is employed, introduction of a dark current leaked into the photodiode 113 can be prevented. Note that the semiconductor substrate 131 may be a p⁻ type substrate.

Since the concentration of the p type well region for forming a portion or the overall portion of the horizontal address circuit and the vertical address circuit around the cell is determined from the viewpoint of the design and thus the concentration is different from an optimum concentration for the cell, it might therefore be considered to employ another p type layer independent from the p type well region which forms the imaging portion.

Figure 16:
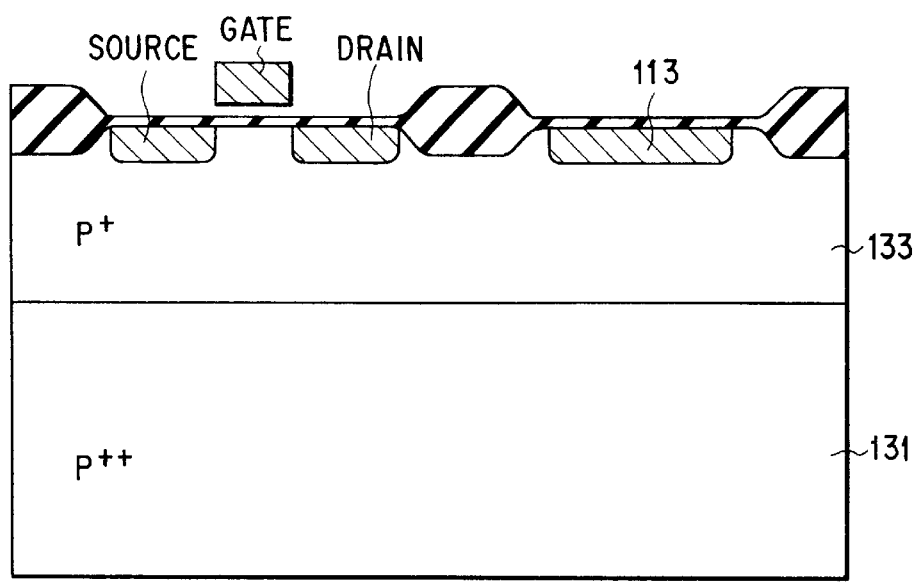
FIG. 16 is a cross sectional view showing a still further modification of the unit cell according to the first embodiment.

FIG. 16 is a diagram showing the structure of a semiconductor substrate in which a p type well region 133 is formed on a p⁺⁺ substrate 131. The photodiode 113 and transistors are formed in the surface region of the p type well region 133. Since the impurity concentration of the substrate is very high so that an average free path of electrons is short, the electrons cannot be flowed into the photodiode even if the electrons are generated in the substrate so that a dark current is decreased.

Figure 17:
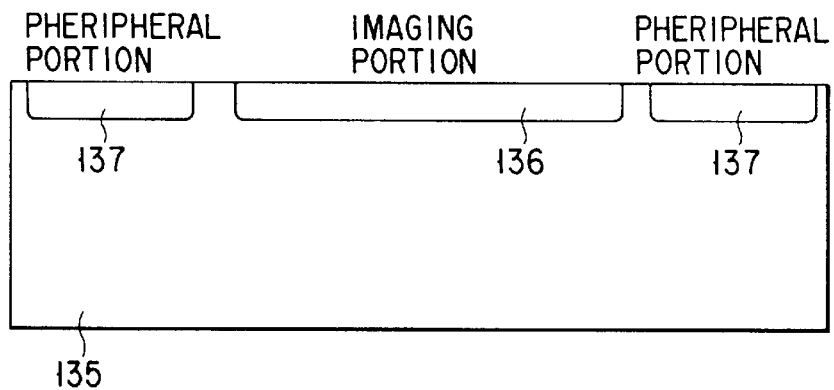
FIG. 17 is a cross sectional view showing a still another modification of the unit cell according to the first embodiment.

FIG. 17 is a diagram showing the structure of a semiconductor substrate in which a p type well region 136 for forming the imaging portion is formed on an n type substrate 135 and another p type well region 137 for forming the peripheral circuit portion is individually formed.

When the above-mentioned structure is employed, a p type well region suitable for each element can be formed. Note that the n type substrate 135 may a p⁻ substrate.

Figure 18:
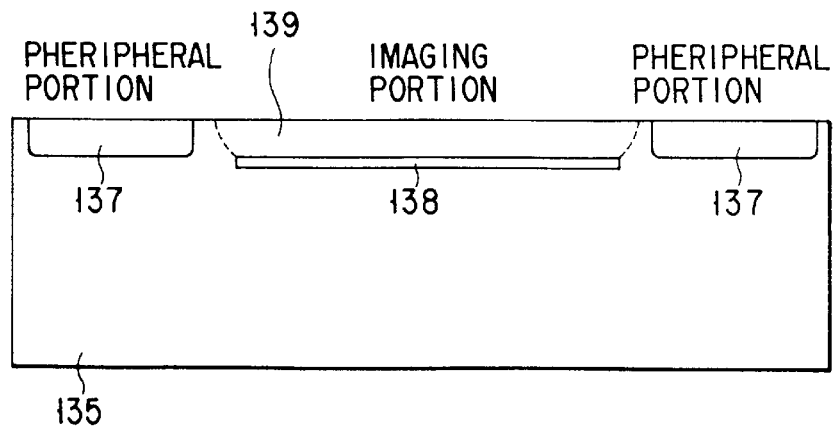
FIG. 18 is a cross sectional view showing a further modification of the unit cell according to the first embodiment.

FIG. 18 shows a structure in which a p⁺ type sandwich layer 138 for forming the imaging portion and a p type layer 139 having a low concentration are formed on an n type substrate 135 and another p type well region 137 is formed in the peripheral circuit portion.

When the above-mentioned structure is employed, a p type well region suitable for each element can be formed. Moreover, leakage of the dark current into the photodiode can be prevented. Note that the n type substrate 135 may be a p⁻ substrate.

FIG. 19 is a plan view showing a unit cell of a solid state imaging device according to the first embodiment. As shown in FIG. 7, the unit cell has first and second photodiodes 92a and 92b on a first device region 140. The first and second photodiodes 92a and 92b are arranged in a vertical direction. A gate wiring 143 of the first read-out transistor 93a is arranged adjacent to the first photodiode 92a. A gate wiring 144 of the second read-out transistor 93b is arranged adjacent to the second photodiode 92b. A common drain region 145 for the first and second read-out transistors is formed between the gate wirings 143 and 144. The first and second photodiodes 92a and 92b are sources of the first and second read-out transistors 93a and 93b.

A drain contact 145a is electrically connected to a gate contact 147a of the amplifying transistor 94 disposed on a second device region 150 through a jump wiring 146 formed on the surface of the device. A drain contact 148a of the amplifying transistor 94 is connected to a vertical signal line 42 (shown in FIG. 7 but not shown in FIG. 19). Reference numeral 155 represents a gate wiring of the address transistor 95. A source contact 149a of the address transistor 95 is connected to a power supply line (not shown). The gate wiring 147 of the amplifying transistor 94 is also connected to a source contact 151a of the reset transistor 96 provided in the second device region 150 through the jump wiring 146. A drain contact 149a which is common to the source contact of the address transistor 95 is formed opposite to the source contact 151a across a gate wiring 152 of the reset transistor.

Portions, such as 151' and 152', given prime respectively are second device region, gate wiring and so forth of the adjacent unit cell.

In the first embodiment, the substrate capacitor of the drain of the read-out transistor is substantially the sum of the substrate capacitor of a portion in the device region 140 connected to the contact 145a (a portion between the gates 143 and 144) and the substrate capacitor of a portion in the device region 140 connected to the contact 151a.

In the first embodiment, the first device region 140 in which the common drain 145 of the read-out transistors 93a and 93b is formed and the second device region 150 in which the source 151 of the reset transistor 96 is formed are not formed integrally. The first and second device regions 140 and 150 are formed as different regions which are separated by a LOCOS region but electrically connected to each other via the jump wiring 146 formed on the substrate. Therefore, the substrate capacitor of the common drain 145 of the read-out transistors 93a and 93b can be prevented from being unnecessary increased.

The common drain 145 of the read-out transistors 93a and 93b is surrounded by the gate wirings 143 and 144 of the two read-out transistors. Thus, an advantage can be realized in that the external length which is in contact with the device separation region can be shortened and the parasitic capacitor can be reduced.

As described above, according to this embodiment, in which a unit cell is formed such that one output circuit is shared by plural (which is two in this embodiment) photodiodes disposed adjacent in the vertical direction, the area of the unit cell can be made small. The number of the photodiodes which shares the output circuit is not limited to two. The number may be three or more.

Since the output from the unit cell is output through the noise canceler, fixed pattern noise corresponding to the variation of the threshold voltage of the amplifying transistor of the unit cells can be canceled. Since the noise canceler is structured such that the clamp capacitors 56-1, 56-2, . . . and the sample and hold capacitors 58-1, 58-2, . . . are directly connected and thus disposed adjacent, they can be stacked on the same portion. As a result, the capacitor can be reduced.

Since the output from the unit cell is supplied to the noise canceler through the impedance converter, the impedance of the noise canceler is not substantially changed between the state in which is noise is output and the state where the signal and noise are output when viewed from the unit cell. Therefore, the noise component is made to be substantially the same between the two output states. When the difference of the outputs between the two states is obtained, the noise component can accurately be canceled. Thus, only the signal component can be extracted. As a result, noise can accurately be canceled. When the noise canceler is viewed from the unit cell, only the gate capacitor can be viewed in terms of the impedance, the gate capacitor being very small. Therefore, noise can reliably be canceled in a short time.

The device region forming the drain of the read-out transistor is divided into a plurality of regions by the LOCOS region so that the area of the device region can be reduced. Since the gate capacitor is mainly determined by the substrate capacitor of the drain of the read-out transistor, a unit cell in which the gain of the amplifying transistor is high can be obtained.

Since the drain of the read-out transistors is surrounded by the gate wirings of the read-out transistors, a unit cell can be obtained in which a long length is in contact with the element isolation region, the parasitic capacitor can be reduced and the gain of the amplifying transistor is high.

A substrate composed of a p⁻ type substrate and a p⁺ type layer formed on the p⁻ type substrate is employed as the semiconductor substrate for forming the unit cell. Therefore, a dark current which is introduced into the unit cell can be reduced. Moreover, the potential of the surface of the substrate can be stabilized. Therefore, the noise canceler circuit can reliably be operated.

Other embodiments of the solid state imaging device according to the present invention will be described. The same portions as those of the first embodiment will be indicated in the same reference numerals and their detailed description will be omitted.

Second Embodiment

Figure 20:
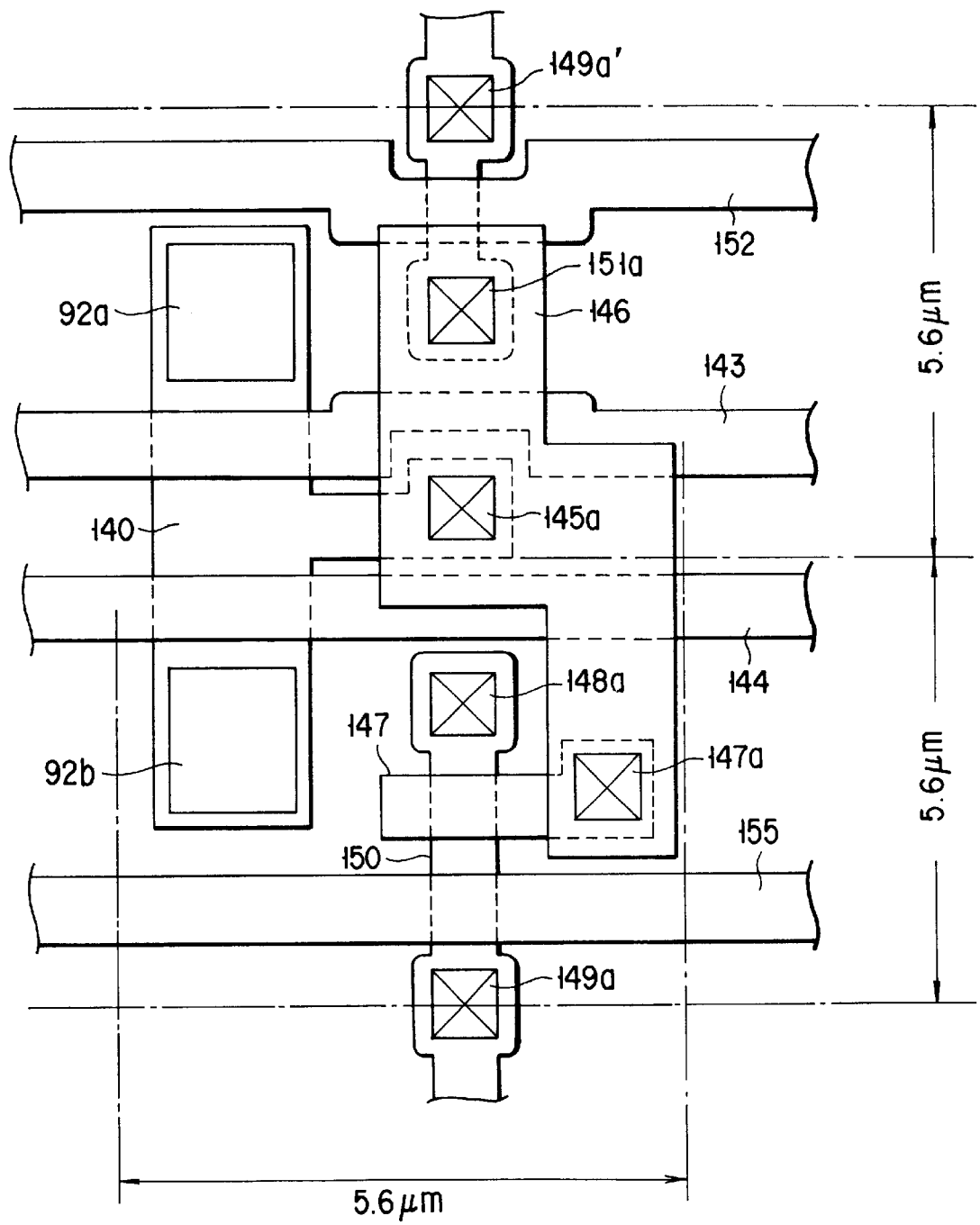
FIG. 20 is a plan view showing the layout on the substrate of the MOS-type solid state imaging device according to a second embodiment of the present invention.

FIG. 20 is a plan view showing a layout pattern of a circuit for a unit cell according to a second embodiment. The circuit structure of the overall apparatus is the same as that according to the first embodiment shown in FIG. 3. Also the circuit for the unit cell is the same as that according to the first embodiment shown in FIG. 7. The second embodiment has a structure in which two pixels each having a size as 5.6 μm×5.6 μm and disposed vertical form one cell.

That is, the second embodiment is a modification of the layout pattern of the circuit for the unit cell according to the first embodiment. In the first embodiment, the common drain 145 for the first and second read-out transistors 93a and 93b is formed between the first and second photodiodes 92a and 92b.

In this case, a margin for positioning the contact 145a of the common drain 145 is required. Therefore, the areas of the first and second photodiodes 92a and 92b cannot be enlarged, thus causing a problem in that the sensitivity cannot be raised. Thus, the second embodiment is structured such that the common drain 145 for the first and second read-out transistors 93a and 93b is not disposed accurately between the first and second photodiodes 92a and 92b. That is, the common drain 145 is disposed at a position somewhat deviated in a lateral direction from that of the first embodiment. Therefore, the first device region 140 is not formed into a rectangular shape and the same is formed into a T-like shape. The first device region 140 has a leading end projecting sidewards in which the common drain 145 is formed. That is, the first embodiment has the structure in which the first and second photodiodes 92a and 92b and the common drain 145 of the first and second read-out transistors 93a and 93b are disposed to form one line. Moreover, the drain contact 148a of the amplifying transistor 94, the source contact 149a, of the address transistor 95 and the source contact 151a of the reset transistor 96 are disposed to form a line. On the other hand, the second embodiment has the structure such that the first and second photodiodes 92a and 92b are disposed to form a line. Moreover, the drain contact 148a of the amplifying transistor 94, the source contact 149a, of the address transistor 95, the source contact 151a of the reset transistor 96 and the contact 145a of the first and second read-out transistors 93a and 93b are disposed to form a line.

The gate wiring in each transistor is a first polysilicon wiring, while the jump wiring 146 which is disposed on the first polysilicon wiring is a second polysilicon wiring.

Thus, the distance between the gate wirings 143 and 144 of the first and second read-out transistors 93a and 93b can be shortened. As a result, the sizes of the first and second photodiodes 92a and 92b can be enlarged. Thus, the sensitivity can be raised.

Third Embodiment

Figure 21:
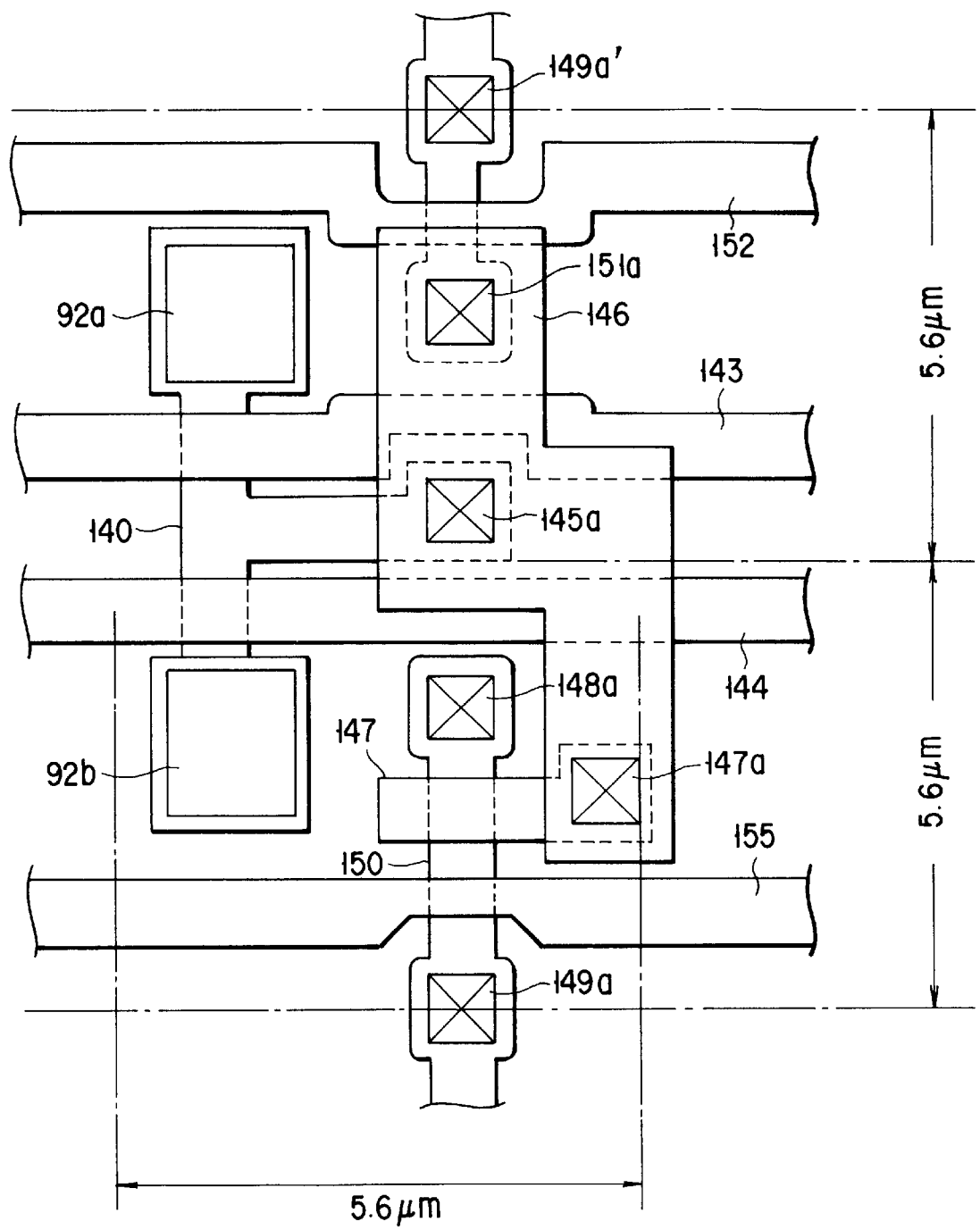
FIG. 21 is a plan view showing the layout on the substrate of the MOS-type solid state imaging device according to a third embodiment of the present invention.

FIG. 21 is a plan view showing the layout pattern of a circuit for use in a unit cell according to a third embodiment. The circuit for the overall portion of the device is the same as that according to the first embodiment shown in FIG. 3. Also the circuit for the unit cell is the same as that according to the first embodiment shown in FIG. 7. The third embodiment is a modification of the layout pattern of the circuit for the unit cell according to the second embodiment. The structure shown in FIG. 21 is different from that shown in FIG. 20 in that the gate length of the gate wiring is not constant. The reason for this will now be described.

As described in the first embodiment with reference to FIG. 7, the unit cell must have four types of transistors (five transistors), that is, the read-out transistors 93a and 93b, the amplifying transistor 94, the address transistor 95 and the reset transistor 96. Since the transistors have different functions and the power supply voltage is limited, the threshold voltages of the plural types of the transistors in the unit cell must be controlled to be different from one another.

In a case of the unit cell having the structure shown in FIG. 7, the threshold of the address transistor must be controlled to be a high level because the address transistor has the common wiring shared by the read-out transistor.

Since the reset transistor must have the gate which is reliably closed when the level is low, the threshold voltage must somewhat be high. Also the read-out transistor must have a high threshold voltage to separate the photodiode and the detection node (the sample and hold transistor). It is therefore preferable that the threshold voltage of the read-out transistor has a threshold voltage higher than that of the reset transistor.

It is preferable that the amplifying transistor has a low threshold voltage in order to have a wide amplifying function. On the other hand, it is preferable that the address transistor has a somewhat low threshold voltage because of the same reason as that for the amplifying transistor.

Since the above-mentioned transistors are made of the material for the gate in the same layer, each of the transistors has a gate oxide film having the same thickness. Therefore, the impurity concentrations of the gate region of each transistor must be changed to control the threshold voltage of the transistor.

Therefore, the process for manufacturing the MOS-type solid state imaging device must have photolithography processes and impurity control processes, for example, an ion implanting process by the number which is the same as the number of the types of the transistors having the different threshold voltages.

In the case of the above-mentioned structure of the unit pixel, the threshold voltages of the four types of the transistors must independently be controlled by performing the usual process for forming the MOS transistor, three times of photolithography processes, three times of ion implanting processes and additional processes. Thus, the manufacturing process cannot easily be reduced.

The third embodiment is arranged to modulate the threshold voltages of the plural types of the transistors forming the unit cell with the size of the gate. As described above, it is preferable that the four types of the transistors, that is, the read-out transistor, the amplifying transistor, the address transistor and the reset transistor, are independently controlled. In this embodiment, the size of the gate is modulated as shown in Table 1 to realize required threshold voltages.

TABLE 1

| Transistor | Gate Length ($\mu$m) | Gate Width ($\mu$m) | Threshold Voltage (V) |
|---|---|---|---|
| Amplifying Transistor 94 | 0.9 | 0.9 | 0.2 |
| Address Transistor 95 | 0.4 | 0.9 | 0.4 |
| Reset Transistor 96 | 0.5 | 0.9 | 0.6 |
| Read-out Transistors 93a, 93b | 0.8 | 0.9 | 0.9 |

Table 1 is a list of the sizes of the gates of plural types of MOS transistors and threshold voltages. As shown in Table 1, all transistors have the same gate width of 0.9 $\mu$m. On the other hand, the length of the gate of the amplifying transistor 94 is 0.9 $\mu$m, that of the address transistor 95 is 0.4 $\mu$m, that of the reset transistor 96 is 0.5 $\mu$m and that of the read-out transistors 93a and 93b is 0.8 $\mu$m. By changing the length of the gate of each transistor, the threshold voltages can be controlled to be individual values.

Hitherto, the threshold voltages of the four types of the transistors are made to be different values by varying the impurity concentrations in the gate region of each transistor. At this time, the size of the gate of each transistor has been set to be the values shown in the following Table 2.

TABLE 2

| Transistor | Gate Length ($\mu$m) | Gate Width ($\mu$m) |
|---|---|---|
| Amplifying Transistor 94 | 0.9 | 2.0 |
| Address Transistor 95 | 0.9 | 2.0 |
| Reset Transistor 96 | 1.2 | 1.7 |
| Read-out Transistors 93a, 93b | 0.9 | 4.3 |

As described above, the amplifying transistor 94 must have a low threshold voltage. It is necessary to set the gate length shorter than 0.4 $\mu$m in order to control the threshold voltage by means of gate length modulation. However, the very short gate length leads to a large variation in the threshold voltage. Therefore, only the gate of the amplifying transistor 94 is, in this embodiment, subjected to the control of the threshold voltage of the transistor by performing the impurity concentration control. However, a required threshold voltage can be obtained in the amplifying transistor by performing the modulation of the threshold voltage by changing the size of the gate if manufacturing accuracy can be improved.

In this embodiment, the semiconductor substrate in which the concentration of boron is $1\times10^{17}$ (cm$^{-2}$), the thickness of gate oxide film of the MOS transistor is 140 angstroms, phosphorous doped polysilicon having specific resistance of 1.6 (m $\Omega\cdot$cm) is employed as the material of the gate, SiN side walls each having a thickness of 1500 angstroms are formed to form an LDD (Lightly Doped Drain) structure so that an nMOS transistor is formed.

Variation of the threshold voltage of the MOS transistor realized by the length of the gate, that is, the characteristic of the short channel effect is shown in FIG. 22. As can be understood from the graph shown in FIG. 22 and Table 1, the four types of the transistors for forming the pixels of the MOS-type solid state imaging device can be controlled to respective required threshold voltages.

As shown in FIG. 21 and Table 1, this embodiment is able to simultaneously form the three types of the transistors (the address transistor 95, the read-out transistors 93a and 93b and the reset transistor 96) except for the amplifying transistor 94. Therefore, the two times of the photolithography processes, the ion implanting processes and the accompanying processes, for example, the resist peeling process, can be omitted. Thus, the manufacturing process can significantly be simplified.

When the short channel effect is positively used, variation in the manufacturing directly causes the foregoing effect. Thus, a possibility of generation of variation in the threshold voltage is considered. However, according to the experiments performed by the inventors of the present invention, a fact has been confirmed that the increase in the variation in the threshold voltage is within an allowable range if the gate length is shorter than 0.41 $\mu$m.

Although the threshold voltage of the transistor in the unit cell is modulated by only the short channel effect, the method is not limited to this. For example, a so-called narrow channel effect may, of course, positively be used in which the threshold voltage is raised by reducing the width of the gate to attain a similar effect.

As described above, according to the third embodiment, plural types of MOS transistors having different threshold voltages can simultaneously be formed without changing the impurity concentrations in the gate region of each of the transistor. Thus, the number of manufacturing processes can significantly be reduced.

Fourth Embodiment

Although the first to third embodiments use the same unit cell, a fourth embodiment uses a different nit cell. FIG. 23 is a circuit diagram for a unit cell according to the fourth embodiment. The unit cell according to this embodiment is different from the first embodiment in only the output circuit 98. That is, an address capacitor 99 is provided instead of the address transistor 96. This embodiment is able to further reduce the number of transistors per unit cell. Thus, an advantage can be realized when the cell is precisely formed. When high level voltage is applied to the address line 34-1, the gate voltage of the amplifying transistor 94 is shifted to a high level through an address capacitor 99 (due to capacitive coupling). Since the gate voltage of the amplifying transistor 94 in the adjacent unit cell is retained to the low level, a signal of the addressed amplifying transistor 94 appears on the vertical signal line 42-1.

FIG. 24 is a plan view showing a unit cell according to the fourth embodiment. The first and second photodiodes 92a and 92b are, adjacent in the vertical direction, disposed in the surface region of the first device region 160. A gate wiring 162 of the first read-out transistor 93a is disposed adjacent to the photodiode 92a. A gate wiring 164 of the second photodiode 93b is disposed adjacent to the second photodiode 93b. A common drain 166 for the first read-out transistor 93a and the second read-out transistor 93b is formed between the gate wirings 162 and 164.

The drain 166 is, through a jump wiring 168, electrically connected to a gate 170 of the amplifying transistor 94. A drain 172 of the amplifying transistor 94 is, through a contact, connected to a power supply line (not shown), while a source 174 of the amplifying transistor 94 is, through a contact, connected to a vertical signal line 42 (not shown in FIG. 24). Moreover, the gate 170 of the amplifying transistor 94 is, through the jump wiring 168, also connected to a source 178 of the reset transistor 96 formed on a second device region 176. On the second device region 176 of the reset transistor 96, there is formed a drain 182 opposite to a source 178 across a gate wiring 180 of the reset transistor 96.

Reference numeral 184 represents a gate wiring of an address transistor.

Also the above-mentioned fourth embodiment, in which the device region of the drain of the read-out transistor is divided into a plurality of regions by the LOCOS region, the area of the device region can be reduced. Thus, the substrate capacitor of the gate of the amplifying transistor can be reduced. Therefore, a unit cell in which the gain of the amplifying transistor is high, can be obtained.

Since the drain of the read-out transistor is surrounded by gate wirings of the two types of the read-out transistors, a unit cell can be obtained with which the length which is in contact with the element isolation region can be elongated, the parasitic capacitor can be reduced and the gain of the amplifying transistor is high.

Fifth Embodiment

Figure 26:
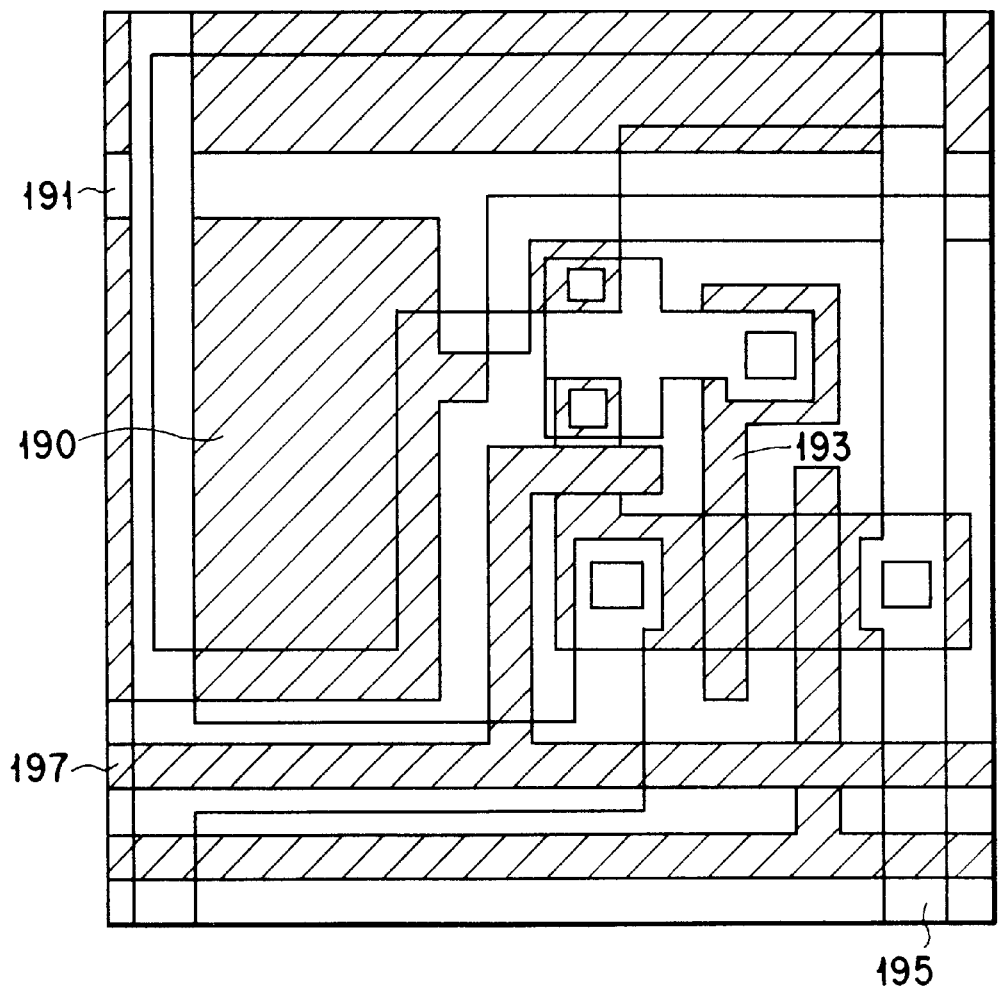
FIG. 26 is a plan view showing the layout on the substrate according to the fifth embodiment;.

FIG. 25 is a circuit diagram for a unit cell according to a fifth embodiment. FIG. 26 is a plan view showing the unit cell according to this embodiment.

The signal charge generated by photoelectric conversion at a photodiode 190 is transferred to a gate 194 of an amplifying transistor 193 when a read-out transistor 192 is turned on by making a read-out line 191 a high level so that the potential of the gate 194 is changed. The potential of a vertical signal line 195 is changed in accordance with the potential of the gate 194 of the amplifying transistor 193.

After the signal has been read, a gate 197 of a reset transistor 196 is made to be a high level so that the gate potential of the amplifying transistor 193 is reset to a required level. Addressing to the unit cell is performed by using an address gate wiring 199 capacitive-coupled to the gate of the amplifying transistor 193 by the capacitor 198.

Figure 27:
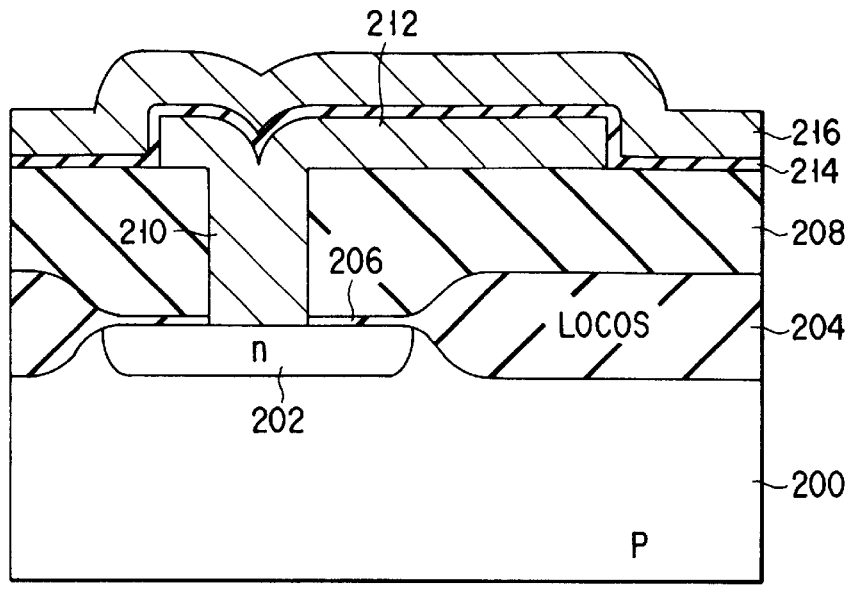
FIG. 27 is a cross sectional view showing the structure of a unit cell according to the fifth embodiment.

FIG. 27 is a partial cross sectional view of the unit cell according to the fifth embodiment shown in FIGS. 25 and 26.

Referring to FIG. 27, an n type diffusion layer 200, a LOCOS region 204, a gate oxide film 206 and a layer insulation film 208 are formed on a p type substrate 200. The n type diffusion layer 200 is connected to a jump wiring 212 formed on the layer insulation film 208 through a contact 210 and arranged to serve as a lower electrode. The jump wiring 212 is fully covered by a vertical selection capacitor insulation film 214. An address gate wiring 216 serving as an upper electrode is formed on the vertical selection capacitor insulation film 214.

As described above, the fifth embodiment, in which the lower electrode 212 electrically connected to the gate oxide film 206 of the amplifying transistor 193 is fully covered with the vertical selection capacitor insulation film 214, is relatively free from introduction of noise from a vertical signal line or the like having a parasitic capacitor. Therefore, an advantage can be realized when a solid state imaging device is attempted to cancel noise.

It is preferable that the upper electrode 216 and the lower electrode 212 which form the address capacitor are formed by a self-aligning method to form the unit cell in such a manner that the edges are aligned. As a result, variation of the capacitor can be prevented. If the variation of the capacitor can be prevented, a solid state imaging device free from excessive variation in the sensitivity can be formed.

Sixth Embodiment

Figure 28A:
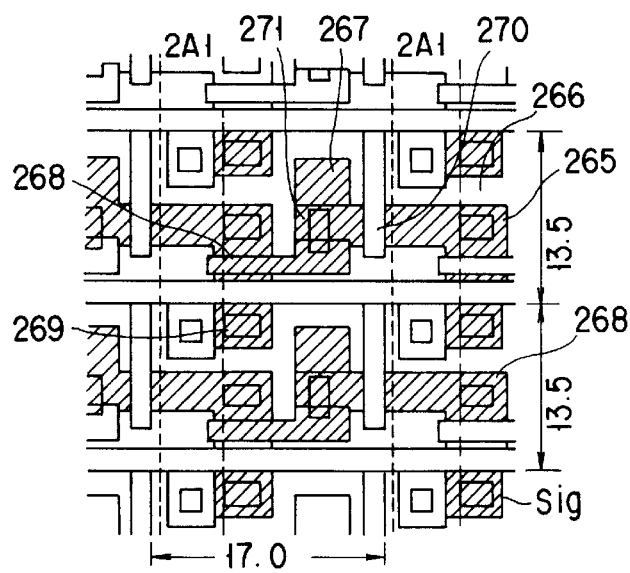
FIGS. 28A, 28B and 28C are diagrams showing comparative examples for explaining a sixth embodiment of the present invention.
Figures 28B, 28C:
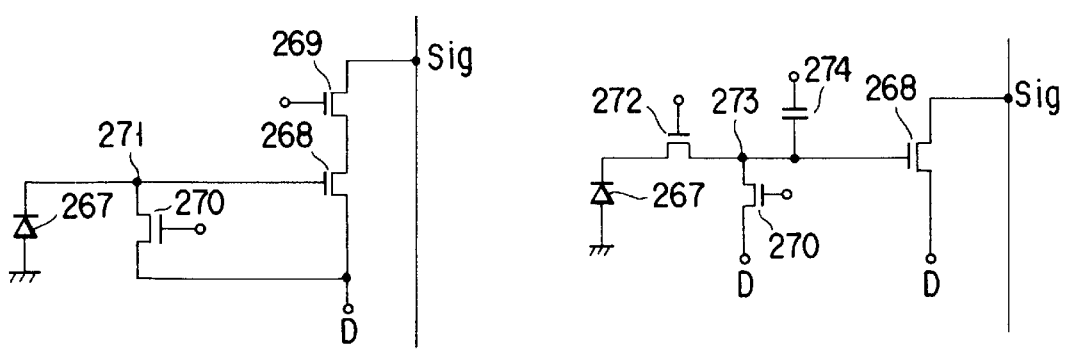

FIG. 28A is a plan view showing a usual unit cell which is a basis of the sixth embodiment, and FIG. 28B is a circuit diagram for the unit cell. In an active region 265, a photodiode and source/drain of the transistor are formed. In portions except for the active region 265, an element isolation region 266 is formed. A photodiode 267 is electrically connected to the gate of an amplifying transistor 268. An electric current of the amplifying transistor 268 is modulated by the potential of the photodiode 267. As a result, a signal of the photodiode 267 is read to the outside.

Since a multiplicity of cells are disposed two-dimensionally, an address transistor 269 for selecting a row is provided. Only with a row in which the address transistor 269 is turned on, an electric current flows in the amplifying transistor so that a required row is selected.

A reset transistor 270 is provided to reset a signal of the photodiode 267. A photoelectric signal is allowed to pass through the reset transistor 270 so as to be drained to a drain 268D of the amplifying transistor. In this embodiment, the gate of the reset transistor 270 is common to the address gate of the unit cells in an upper row. The drain 286D is common to the drain of the amplifying transistor.

To simplify the illustration, wiring for the drain is omitted. The wiring for the drain is formed by aluminum (1Al) in the first layer. A signal line Sig is made of aluminum (2Al) in the second layer as indicated with a line shown in the drawing.

A detection region 271 is made to be a section which is electrically connected to the gate of the amplifying transistor 268. That is, the detection region 271 is a section for directly determining a signal to be read to the outside of the cell. For example, the detection region 271 is an active region on the left side of the reset transistor 270 in the structure shown in FIG. 28A, while the detection region 271 is a portion with a thick line in the structure shown in FIG. 28B.

Another example of the cell circuit is shown in FIG. 28C.

Electrons of the photodiode 267 are transferred to a detection portion 273 through a transfer transistor 272. Although the detailed reason of this is omitted here, the foregoing structure is formed for the purpose of canceling kTC noise and performing a simultaneous operation. Addressing is performed by an address capacitor 274 instead of the transistor. That is, the potential of the node of the address capacitor 274 opposite to the transfer transistor 272 is changed so as to change the potential of the detection portion, that is, the potential of the amplifying gate by capacitive coupling so that a row is selected.

The drain of the amplifying transistor 268 and that of the reset transistor 270 may be provided individually.

As described above, the conventional amplifying type solid state imaging device comprising a large number of transistors for each cell has a problem in that a precise structure cannot easily be formed. For example, a CCD, which is a general solid state imaging device at present, and which has been put into practical use, has a structure in which a cell having a size of about 7 $\mu$m in a design rule of about 0.8 $\mu$m. On the other hand, an MOS-type solid state imaging device has a structure such that the size is 13.5 $\mu$m×17.0 $\mu$m with a design rule of 0.8 $\mu$m.

As described above, a precise cell, such as the CCD, cannot easily be formed by the basic structure of the amplifying type solid state imaging device. If a transfer gate is added, the structure cannot easily precisely be formed.

Figure 1:
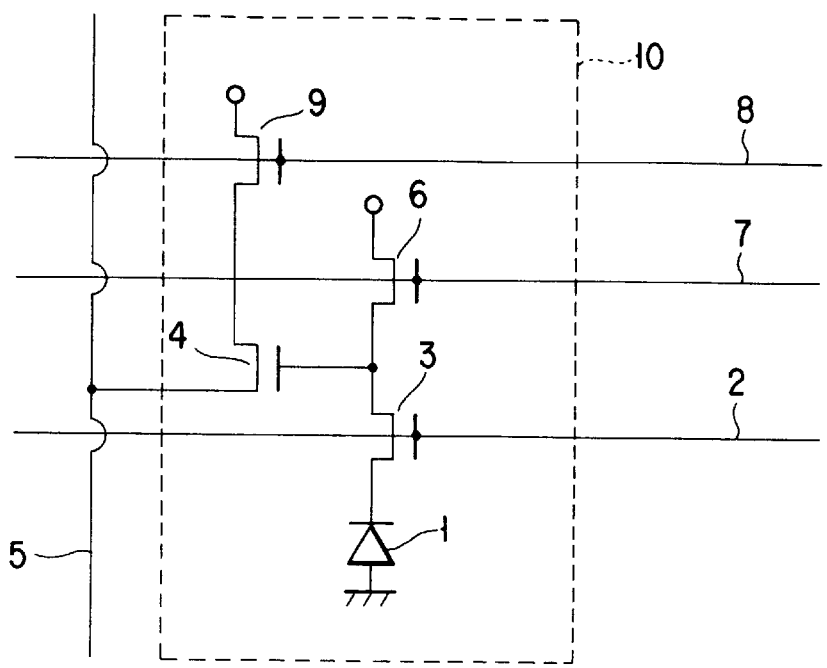
FIG. 1 is a circuit diagram showing a conventional MOS-type solid state imaging device.
Figure 2:
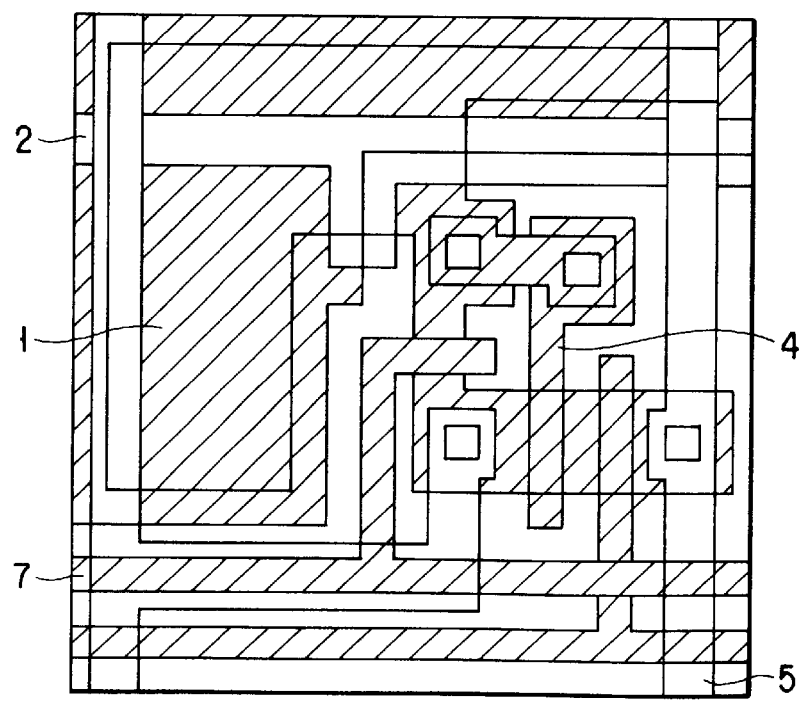
FIG. 2 is a plan view showing the device shown in FIG. 1.

A standard MOS-type solid state imaging device has a high height from the silicon substrate because of the following reason. Since the drain wiring and the signal line are lines through which an electric current flows, both of the lines must be made of metal having low resistance. With the present technology, an aluminum line is required. In the structure shown in FIG. 28A, 1Al is used to serve as a drain wiring and 2Al is used to serve as a signal line. To put the structure into practical use, a light shielding film for shielding light made incident to a portion except the photodiode must be provided. The light shielding film must be formed by metal portion in the third layer (for example, 3Al). As a result, the height of the device from the silicon substrate is further increased.

If the height is increased, the color filter and microlens, which are formed on the device, cannot easily be formed. If the light shielding film is provided at a higher position, the precision thereof is decreased. If the number of wiring layers is increased, the manufacturing process cannot be simplified. Since the CCD requires one aluminum layer, the MOS-type solid state imaging device has a disadvantage with respect to this point.

The MOS-type solid state imaging device generates blooming in which electrons, which have been photoelectrically converted, overflow the photodiode if a large amount of light is made incident on the photodiode and the electrons are absorbed by the photodiode of the adjacent cell. If blooming occurs, there arises a problem in that a state as if light is made incident is realized though light is not made incident. In the case of the standard MOS-type solid state imaging device, blooming easily occurs in a period in which the potential of the signal must be retained in the amplifying gate because photoelectrons of the photodiode cannot be reset.

The sixth embodiment of the MOS-type solid state imaging device will now be described in which the cell is formed precisely, increase of the height of the device from the silicon substrate is prevented and blooming is prevented.

In this embodiment, an embedded type transistor is employed as a reset means to form a further precise cell having the transfer gate. The principle of the operation of the embedded type transistor will now be described with reference to FIGS. 29A to 29D.

Figure 29A:
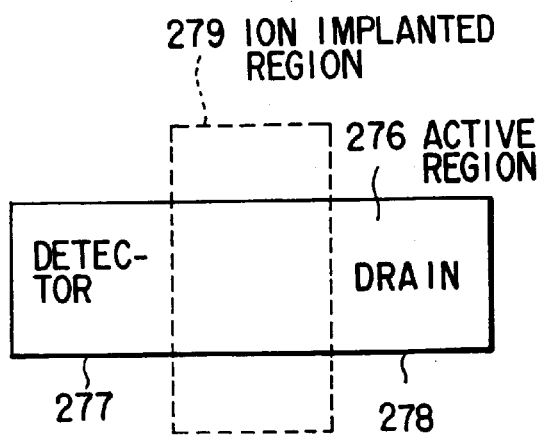
FIGS. 29A, 29B, 29C and 29D are diagrams showing an embedded transistor for use in the sixth embodiment.

FIG. 29A is a plan view showing the embedded type transistor. An ion implanting region 279 exists between a detector portion 277 and a drain 278 on an active region 276. The ion implanting region 279 is a portion in which a wiring serving as a gate exists when an MOS transistor performs a resetting operation. Since no electric wiring is formed in the ion implanting region 279 and only the channel potential is set in the portion by implanting ions, an advantage can be realized to form a precise structure.

Figure 29B:
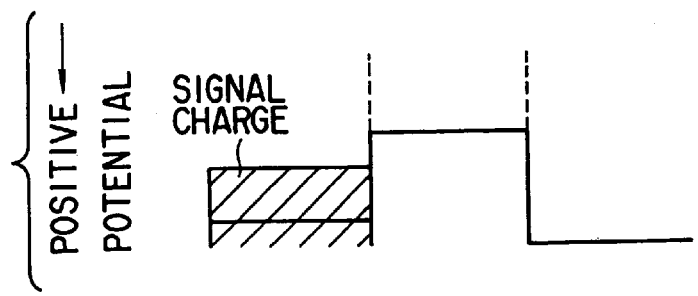
Figure 29C:
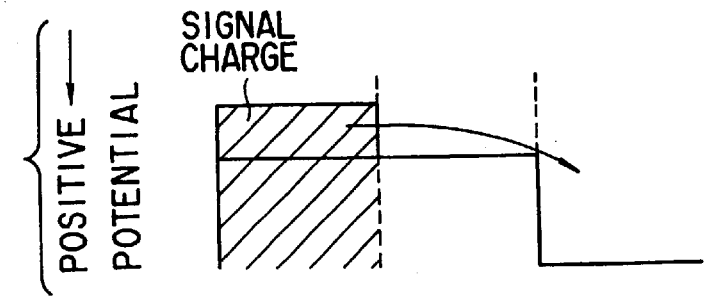
Figure 29D:
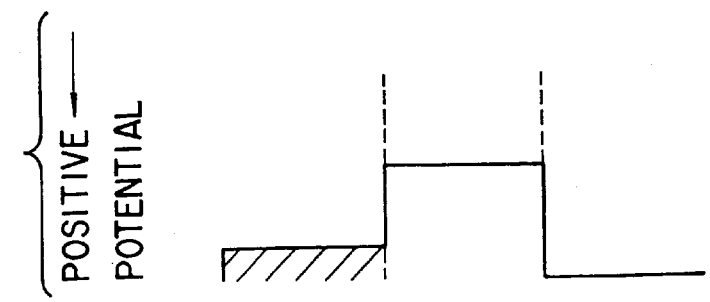

FIGS. 29B to 29D show potentials in the above-mentioned portions during the period in which the signal is retained, the resetting period and a period after resetting has been performed, in which a positive direction is made to be downwards.

As shown in FIG. 29B, signal electrons exist in the detection portion 277 in the signal retention period. As shown in FIG. 29C, the signal is reset such that the potential of the detection portion 277 is brought to a negative level to discharge electrons having energy higher than the channel potential of the ion implanting region 279 to the drain. The potential of the detection portion 277 is brought to the negative level by a method in which the voltage of the line having a capacitive coupling with the detection portion 277 is brought to a negative level. After resetting has been performed, the potential of the detection portion 277 is reset to the original level as shown in FIG. 29D so that the resetting process is ended.

As described above, employment of the embedded type transistor results in an advantage being realized when a precise structure is formed. In the structure having the embedded type transistor, a most efficient planar cell pattern can be formed such that the direction of an electric current generated when a photoelectric signal is transferred from the photodiode to the detection portion and the direction of an electric current in the amplifying transistor are made to be in parallel to each other and opposite to each other. Moreover, resetting is performed in a direction perpendicular to the direction of the electric currents to connect the detection portion and the drain of the amplifying transistor to each other.

That is, it is preferable that the active region be disposed as shown in FIG. 30.

Referring to FIG. 30, the gate of the transfer transistor 272 is formed as indicated with a continuous line running in the horizontal direction. A gate wiring extending from the detection portion 277 to the amplifying transistor 268 is connected to the right or left amplifying transistor 268 as indicated by an arrow. When, for example, an address line having a capacitive coupling is allowed to pass while superimposing on the gate, a row can be selected by changing the potential of the amplifying gate by using the above-mentioned line, as has been known. Moreover, another effect can be obtained in that the embedded type reset transistor 270 can be operated by changing the potential of the detection portion 277.

As described above, the gate wirings are formed at both sides of the reset transistor 270 in the longitudinal direction. Thus, the reset transistor 270 is formed as the embedded type transistor which does not requires a gate wiring. Therefore, a most efficient planar cell pattern can be formed.

Then, it is assumed that the light shielding film is commonly used as the drain wiring. To reduce the height from the silicon substrate, the light shielding film and the wiring can be formed to serve as a common element. In particular, it is preferable that the drain wiring and the light shielding film are formed into a common element. This is because that it is required to supply an individual potential to the gate wirings of the transistors in each row and to supply an individual potential to the signal wirings of the transistors in each column. On the other hand, the drain is permitted to have the same potential for all pixels.

A portion of the pixel section except for the portion upper than the photodiode is covered with a metal wiring of the drain so that the height of the device is reduced. Moreover, the number of the manufacturing process can be decreased and light can reliably be shielded.

Another method capable of reducing the height from the silicon substrate is to form the drain wiring and the signal wiring by the same wiring layer. Since the drain wiring is not required to be always independent for each row, if the drain wiring is extended in the same direction as that of the signal wiring, it is possible to form the signal wiring and the drain wiring by the same metal wiring layer. Only two metal wiring layers including the light shielding film are required. Thus, the height of the device can be reduced, the number of the manufacturing processes can be decreased and light can reliably be shielded.

To form a reset transistor and an amplifying transistor by only the usual MOS transistor without use of the embedded type transistor, resetting is directly performed from the photodiode and the drain thereof is made coincide with the drain of the amplifying transistor so that a precise structure is easily be formed.

When address is realized by the address capacitor 274 and the transfer transistor is provided, a cell circuit is formed as shown in FIG. 31. When the transfer transistor 272 is provided, it is preferable that the direction of the reset transistor 270 (the direction from source to drain) is perpendicular to that of the transfer transistor 272 and that of the amplifying transistor 268. The reason for this is to meet the requirement from the pattern arrangement. When a transistor is directly connected to an element, such as a photodiode, attempted to have a large size, disposition can easily be performed even in a small area.

When a signal charge transferred to the detection portion 277 through a transfer gate is to be reset in a cell of a type structured to have the transfer transistor 272 as shown in FIG. 31, both of the transfer gate and reset gate are turned on to drain signal electrons from the detection portion 277 to the drain through the photodiode 267. When the transfer gate is turned off and the reset gate is turned on, the photodiode 267 can be reset without any influence on the signal of the detection portion 277.

By using this, the signal of the photodiode 267 is transferred to the detection portion 277, and then the photodiode 267 is reset. As a result, blooming, in which electrons leak from the photodiode 267 in a case where intense light is made incident in the above-mentioned period, can be prevented.

FIG. 32 shows the pattern of a cell in an MOS-type solid state imaging device according to the sixth embodiment.

Referring to FIG. 32, the gate of a transfer transistor 272 is formed below the photodiode 267 in the horizontal direction. A signal charge is transferred from the photodiode 267 to the detection portion 277 through a transfer transistor 272. The gate of the amplifying transistor 268 is connected to the detection portion 277.

A region of the embedded type reset transistor 270 for performing resetting exists on the right-hand side of the detection portion 277. In this region, implantation of ions is performed to control the channel potential. When resetting is performed, the signal charge is drained from the detection portion 277 to a drain D through the embedded transistor 270. The drain is formed to also serve as a drain for the amplifying transistor 268. The source side Sig of the amplifying transistor 268 is connected to a signal wiring formed vertically.

In this structure, the direction of the electric current generated by flowing a photoelectric signal from the photodiode 267 to the detection portion 277 and the direction of the electric current in the amplifying transistor 268 are in parallel and opposite to each other. The reset transistor 270 connects the detection portion 277 and the drain of the amplifying transistor 268 in a direction perpendicular to the above directions to reset the charges.

Addressing is performed by using the address capacitor 274. The address capacitor 274 is formed as a capacitor between the gate of the amplifying transistor 268 and a straight address gate wiring formed above the foregoing gate. Note that the address gate wiring is omitted from illustration to simplify the drawing.

The address capacitor 274 is also used to perform resetting using the embedded type reset transistor 270 by changing the potential of the detection portion 277. The signal wiring is formed by the metal wiring in the first layer, while the drain wiring is formed to also serve as the light shielding film 280 by covering the portion except the portion above the photodiode 267 by the metal wiring in the second layer.

As a result of employment of the above-mentioned structure, a cell can be formed, each side of which is 5.5 $\mu$m corresponding to 330,000 pixels in ¼ inch while maintaining an aperture ratio of 16% in the photodiode 267 by using a design rule of 0.7 $\mu$m. Thus, pixels can be fined similarly to that realized by the CCD.

FIG. 33 is a diagram showing a modification of the cell pattern according to the sixth embodiment of the present invention.

Referring to FIG. 33, a signal charge of a photodiode 281 is transferred to a detection portion 283 through a transfer transistor 282 disposed in the right-hand portion. The gate of an amplifying transistor 284 is connected to the detection portion 283.

A reset transistor 285 is disposed above the photodiode 281. The direction of the reset transistor 285 is made to be perpendicular to that of the transfer transistor 282 and that of the amplifying transistor 284. In this embodiment, the gate of the reset transistor 270 and that of the transfer transistor 282 are shared by the pixels disposed in the upper and lower portions of FIG. 33.

The photodiode 281 is reset by transferring a charge from the photodiode 281 to the drain D through the reset transistor 285. The detection portion 283 is reset by also turning on the gate of the transfer transistor 282 to discharge electrons to the drain through the photodiode 281.

The drain D also serves as the drain of the reset transistor 285 and the drain of the amplifying gate, the drain D being connected to a drain wiring (not shown). The source Sig of the amplifying transistor 284 is connected to a signal wiring formed vertically.

The drain wiring and the signal wiring are formed in parallel to each other and are formed by the Al line in the first layer. Although not shown in FIG. 33, a light shielding film made of Al in the second layer is formed in portion except for the position of the photodiode 81. As for the address, a similar structure to that shown in FIG. 32 is formed. The address gate wiring is not shown in FIG. 33.

As a result of employment of the above-mentioned structure, similarly to the structure shown in FIG. 32, a cell can be formed, each side of which is 5.5 $\mu$m corresponding to 330,000 pixels in ¼ inch while maintaining an aperture ratio of 16% in the photodiode by using a design rule of 0.7 $\mu$m. Thus, pixels can be fined similarly to that realized by the CCD.

Referring to a timing chart shown in FIG. 34, the operation of the sixth embodiment will now be described.

The timing chart shown in FIG. 34 shows the pulses for the gate of the transfer transistor 282 and that of the reset transistor 285 in a case where cells are disposed in two rows. Since the other pulses are not the essential portion for the present invention and they depend upon the circuit on the outside of the cell portion, they are omitted.

Initially, the transfer transistors 282 and the reset transistors 285 on all rows are turned on in a period from time t1 to t2 so that the detection portions 283 and the photodiodes 281 for all pixels are reset. Then, at time t2, the transfer transistors 282 and the reset transistors 285 on all rows are turned off. Thus, storage of photoelectrons in the photodiodes 281 is started.

At time t3, the transfer transistors 282 on all rows are turned on so that electrons stored in the photodiodes 281 are transferred to the detection portion 283. That is, the period from t2 to t3 is the light receiving period.

At time t4, the reset transistors 285 on all rows are turned on so that photoelectrons which are introduced into the photodiode 281 are discharged to the drain D. As a result, blooming can be prevented even if intense light is made incident.

Since the above-mentioned standard cell circuit as shown in FIGS. 28B and 28C is structured such that the signal electrons of the detection portion are undesirably reset if the reset transistor is turned on, the above-mentioned operation cannot be performed for the above-mentioned standard cell circuit as shown in FIGS. 28B and 28C.

At time t5, a circuit on the outside of the cell portion reads the potentials of the detection portions 283 on the first row. Then, at time t6, the transfer transistors 282 on the first row are turned on so that the detection portions 283 on the first row are reset. Then, at time t7, the reset potentials of the detection portions 283 on the first row are read by the circuit on the outside of the cell portion so that the difference from the above-mentioned value is output as a true signal quantity.

Then, at time t8, the potentials of the detection portions 283 on the second row are read by the circuit on the outside of the cell portion. Then, at time t9, the transfer transistors 282 on the second row are turned on so that the detection portions 283 on the second row are reset.

At time t10, the circuit on the outside of the cell portion reads the reset potentials of the detection portions 283 on the second row so that the difference from the above-mentioned value is output as a true signal quantity.

Thus, the signals of the overall frame are read.

Although the description has been performed about the structure in which the number of rows is two, the present invention is not limited to this. The number of the rows may be three or more for the essential portion of this embodiment.

Seventh Embodiment

When the cell is formed precisely, a consideration is made that the signal wirings of the adjacent cells are used commonly. However, in the case where the cells are disposed adjacently and the apertures on the cells have the same size, portions which are partially shielded by the light shielding film and the electrode exist. Therefore, the same sensitivity for the same incidental light cannot be realized in actual. This is because of a difference between the design value and the actual value.

To overcome this, it is preferable that the photoelectric conversion ratio is designed to be different between adjacent rows or columns, for example, between cells on the odd-numbered rows and even-numbered rows so that the actual ratios have the same value. Therefore, the portions shielded by the light shielding film or the electrode can be the same area. Specifically, (1) An optical aperture ratio defined by the light shielding film and other electrodes is made to be different between odd-numbered rows and even-numbered rows.

(2) A sampling efficiently of light generating carriers in the photoelectric conversion section in the semiconductor substrate is made to be different between the odd-numbered rows and the even-numbered rows.

FIG. 35 is a diagram showing the disposition of apertures in a light shielding film according to a seventh embodiment arranged to improve the photoelectric conversion efficiency of the cell. Referring to FIG. 35, apertures 290 in light shielding films formed on, for example, odd-numbered rows are larger than apertures 291 in light shielding films formed on adjacent rows, that is, even-numbered rows.

Since the optical aperture ratio is previously made to be different between the adjacent rows, the same sensitivity with respect to incidental light can be realized between the adjacent cells.

Eighth and Ninth Embodiment

Figure 36A:
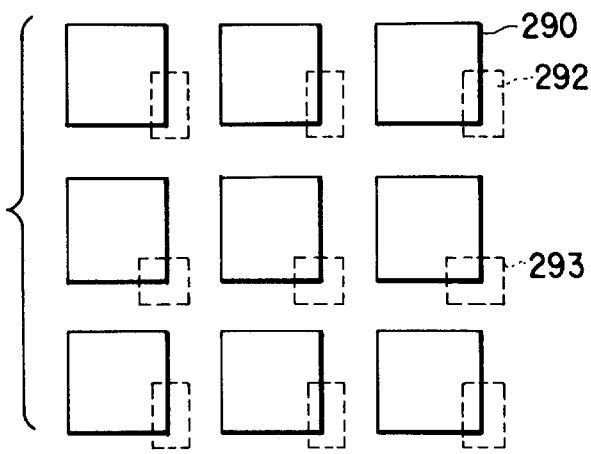
FIGS. 36A and 36B are plan views showing an example of disposition of openings in a light shielding film according to an eighth embodiment for improving the efficiency of the photoelectric conversion.
Figure 36B:
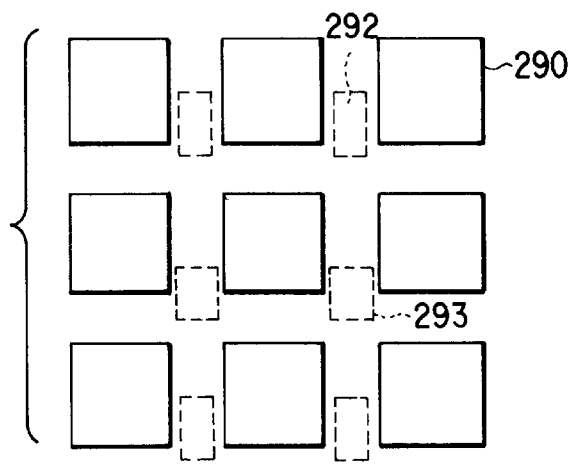
Figure 36C:
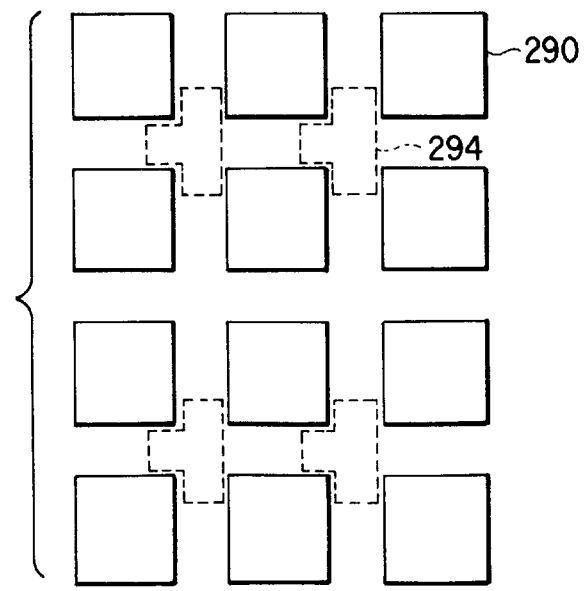
FIG. 36C is a plan view showing an example of disposition of openings in a light shielding film according to a ninth embodiment for improving the efficiency of the photoelectric conversion.

FIGS. 36A, 36B and 36C are diagrams showing dispositions in a case where the apertures in the light shielding films are made to be the same.

FIGS. 36A and 36B show structures in each of which electrodes 292 except for light shielding films corresponding to odd-numbered cells and electrodes 293 except for the light shielding films corresponding to even-numbered cells have different areas. FIG. 36A shows a structure in which the electrodes 292 and 293 are formed to partially project over the corner portions of the apertures 290 in a light shielding films. FIG. 36B shows a structure in which the electrodes 292 and 293 are disposed between adjacent cells.

FIG. 36C shows a ninth embodiment in which electrodes 294 except the light shielding films which are shared by odd-numbered rows and even-numbered rows are disposed among the cells.

Tenth Embodiment

Figure 37:
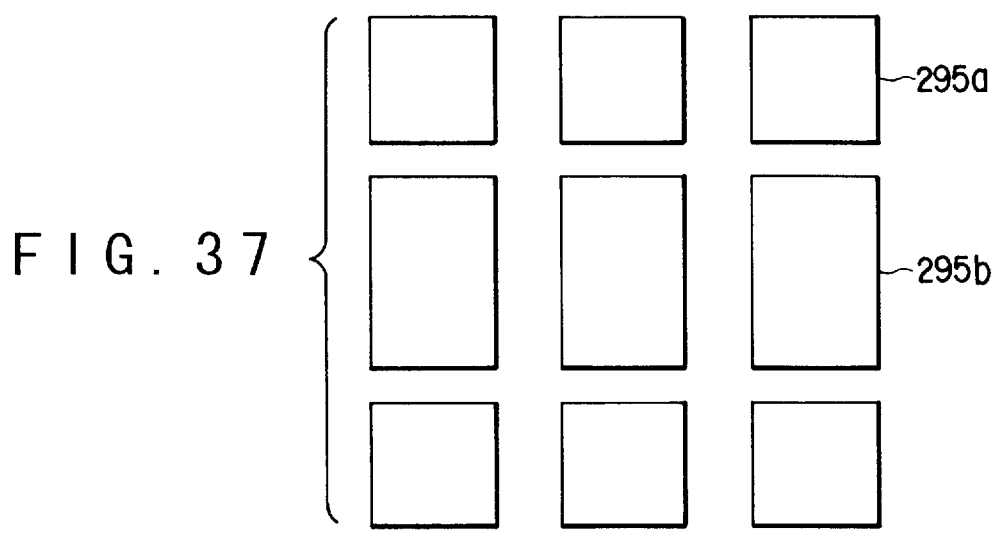
FIG. 37 is a plan view showing an example of disposition of photodiodes according to a tenth embodiment for improving the efficiency of the photoelectric conversion.

FIG. 37 shows a tenth embodiment in which the efficiency to collect light generating carriers in the photoelectric conversion section in the semiconductor substrate is designed to be different. That is, the area of each of the photodiodes 295a on the odd-numbered rows and that of the photodiodes 295b on the even-numbered rows are made to be different from each other.

Eleventh Embodiment

Figure 38:
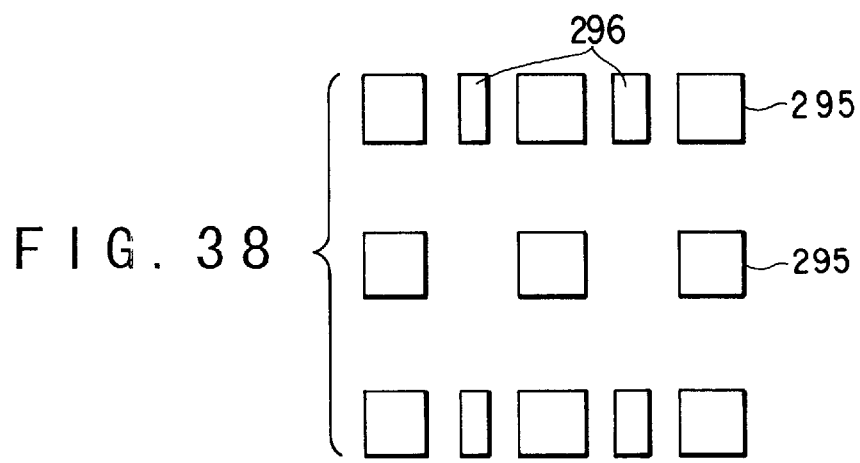
FIG. 38 is a plan view showing an example of disposition of photodiodes according to an eleventh embodiment for improving the efficiency of the photoelectric conversion.

FIG. 38 shows an eleventh embodiment in which the efficiency to collect the light generating carriers in the photoelectric conversion section in the semiconductor substrate is designed to be different. For example, other diffusion layers 296 are formed between the photodiodes 295 on the odd-numbered rows, while the diffusion layers 296 are not formed between the photodiodes 295 on the even-numbered rows.

Twelfth Embodiment

Figure 39:
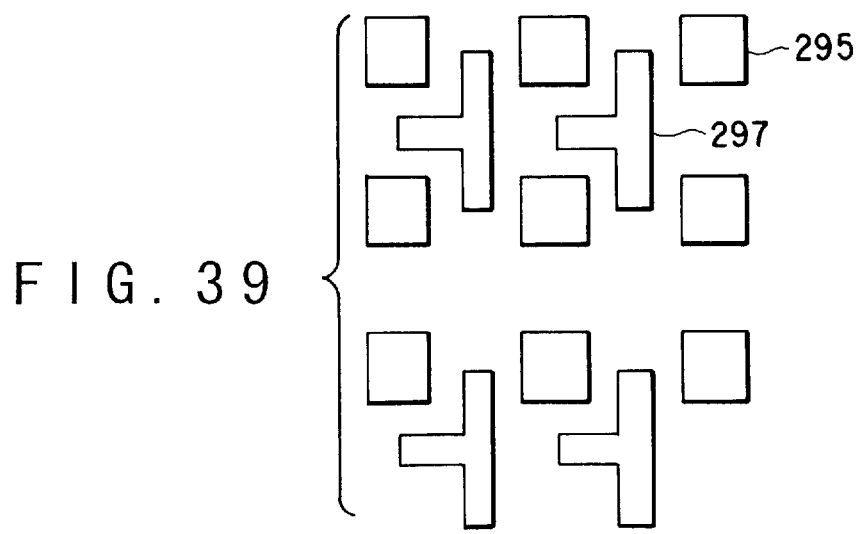
FIG. 39 is a plan view showing an example of disposition of photodiodes according to a twelfth embodiment for improving the efficiency of the photoelectric conversion.

FIG. 39 shows a twelfth embodiment in which the efficiency to collect the light generating carriers in the photoelectric conversion section in the semiconductor substrate is designed to be different. That is, diffusion layers 297 shared by the photodiodes 295 on the odd-numbered and even-numbered rows are formed between the photodiodes 295.

The opening in the light shielding film or the photodiode shown in FIGS. 35 to 39 may be converted between the odd-numbered rows and the even-numbered rows.

As a result, the amplifying type MOS solid state imaging device can be formed precisely. Moreover, the height of the solid state imaging device can be reduced to enable color filters and microlenses to easily be attached. Moreover, light can reliably be shielded.

Embodiments of applicable apparatuses using the MOS-type solid state imaging device (CMOS sensor) exhibiting high photoelectric conversion gain and low noise will now be described.

Thirteenth Embodiment

Figure 40:
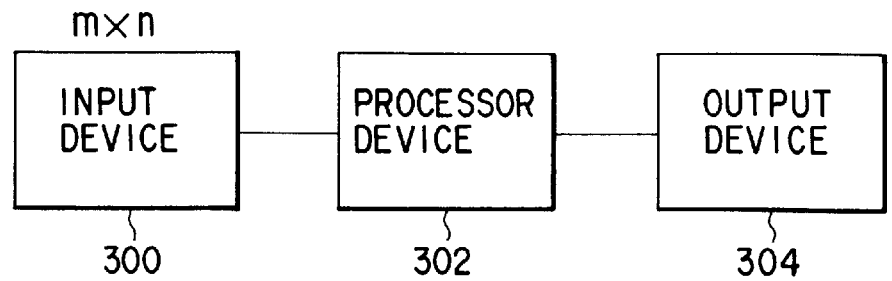
FIG. 40 is a diagram showing the basic structure of a solid state imaging device according to a thirteenth embodiment.

In general, a CCD sensor has been employed as the solid state imaging device. The basic structure of the solid state imaging device comprises an input device 300, a processor device 302 and an output device 304, as shown in FIG. 40. The input device 300 is a light receiving section. The input device 300 has a structure in which photodiodes forming pixels for plural pixels are disposed to output photoelectric signals from the pixels to correspond to the quantity of received light. The processor device 302 sequentially reads the signals from the pixels and cancels noise. The output device 304 is a circuit for outputting the signals read from the pixels. Since the CCD sensor requires a plurality of power sources for operation, energy cannot easily be saved. When the CCD sensor is structured to be operated with a battery, a power supply circuit having a large circuit size is required to generate a plurality of voltage levels.

In the present invention, an MOS sensor which can be operated by a single power source is employed instead of the CCD sensor. To cancel noise and improve the quality of the formed image, the MOS sensor according to the present invention is employed to form an applicable system.

Although an essential portion of the present invention, a noise canceler circuit is provided in the processor device in addition to the reading control circuit to correspond to a case where prevention of fixed pattern noise is attempted. Thus, saving of energy, size reduction and improvement in the formed image can further satisfactorily be achieved.

An MOS sensor according to the present invention is an MOS sensor in which m×n photodiodes are disposed in a matrix configuration to have m×n pixels. The MOS sensor according to the present invention comprises a light receiving section (an input device) in which the photodiodes are disposed into m×n matrix configuration, a processor device having a reading section for sequentially reading signals from the photodiodes forming the light receiving section and a noise canceler circuit section, and an output device for outputting the signals read by the processor device.

The processor device has the reading section and the noise canceler circuit according to the present invention. The MOS sensor according to the present invention is arranged to fetch signals at respective timing at which only the noise component is fetched and timing at which a signal component on which the noise component is superimposed is fetched. Thus, the noise component is canceled to obtain a signal component free from an influence of the noise. The noise canceler circuit is arranged to be capable of aligning the impedance when only the noise component is output and when the noise component and the signal component are output so as to be capable of accurately canceling noise. Since the above-mentioned noise canceler circuit is provided, the MOS sensor according to the present invention is made to be an advanced MOS sensor exhibiting low noise which is a satisfactory level for practical use and performing noise cancellation at high speed.

If the solid state imaging device is the MOS sensor according to the present invention, the sensor section of the MOS sensor for performing photoelectric conversion and another circuit (such as an IV converter, an AGC circuit, a CLP circuit and an ADC circuit) can be manufactured by employing a usual MOS process. Therefore, the foregoing circuits can easily be formed on one semiconductor chip. Moreover, the electric power consumption can be reduced and thus a video camera or the like can be operated with a single voltage level. Thus, the power supply circuit can be simplified and the apparatus can easily be operated with a battery.

Fourteenth Embodiment

An application embodiment of the system will now be described.

A variety of systems comprising the MOS-type solid state imaging device will now be described which is attempted to reduce electric power consumption, lower the voltage level, improve the S/N ratio and realize single power source operation.

Figure 41:
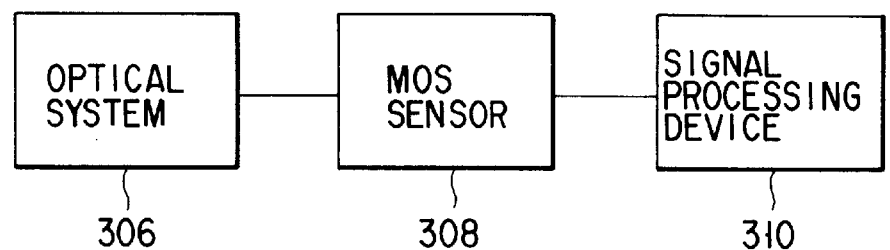
FIG. 41 is a diagram showing the basic structure of a solid state imaging device using an MOS sensor as an image detection portion according to a fourteenth embodiment.

FIG. 41 shows a general structure of an apparatus comprising the MOS sensor to serve as an image detection portion. As shown in FIG. 41, the apparatus comprises an optical system 306, an MOS sensor 308 and a signal processing section 310. The optical system 306 is a unit for introducing an optical image to the MOS sensor 308, the optical system 306 being specifically formed by arbitrarily combining lenses, prisms, pin holes, diachronic mirrors, light converging optical fibers, concave mirrors, convex mirrors, color filters, a shutter mechanism and a diaphragm mechanism to meet the purpose of the apparatus.

The MOS sensor 308 converts an optical image introduced by the optical system 306 into an image signal corresponding to the quantity of light of the optical image and performs a noise canceling process to output only a signal component free from noise. The element of the noise canceling process of the MOS sensor 308 is a noise canceler circuit which is one of important elements to be described later.

The signal processing section 310 is a unit for processing the output from the MOS sensor 308 subjected to the noise canceling process according to the structure of the system. If a video camera is assumed as the system, the signal processing section 310 is an application function section for converting an image signal output from the MOS sensor 308 into a composite video signal according to the PAL system, an NTSC system or the like.

The MOS sensor 308 can be operated by a single power source. The MOS sensor 308 comprises photodiodes to form a light receiving section for converting light into electric signals. The plural photodiodes corresponding to pixels are disposed in a matrix configuration as has been performed by the conventional structure. To precisely form the pixels, the area of each photodiode is reduced, thus resulting in that the output from each photodiode being decreased. In order to amplify the small output, amplifiers (transistors) are provided to correspond to the pixels. Noise (inevitable noise component caused from the characteristic of the amplifying transistor) generated due to use of the amplifiers is canceled by an operation of resetting the output from the photodiode of the MOS sensor 308, retention of the output signal (the noise component) of the amplifier when the resetting operation is performed and canceling process of the signal component and the noise component by using the retained output signal (the noise component) and output signal (the signal component+the noise component) from the amplifier before or after the resetting operation. Thus, noise is canceled and only the signal component is extracted.

Since the MOS sensor 308 is structured as described later, an output free from 1/f noise can be obtained in which the amplitude of the voltage of the output signal is about 10 mV or lower and output current is about 1 mA or larger. Moreover, the dynamic range of the output from the MOS sensor 308 can be improved to 70 dB or greater which is a similar level as that obtainable from the CCD sensor. When a proper signal process is performed, the dynamic range can be improved to 90 dB, which is similar to that obtainable from a silver salt film.

As a result, a variety of systems can be realized in which the high sensitive amplifying type MOS sensor is used as an imaging device thereof. Thus, an applicable apparatus of the amplifying type MOS solid state imaging device (the amplifying type MOS sensor) can be provided with which the electric power consumption can be reduced, the required voltage level can be lowered and the S/N ratio can be improved. Fifteenth Embodiment (Application of Amplifying Type MOS Sensor to Video Camera)

Figure 42:
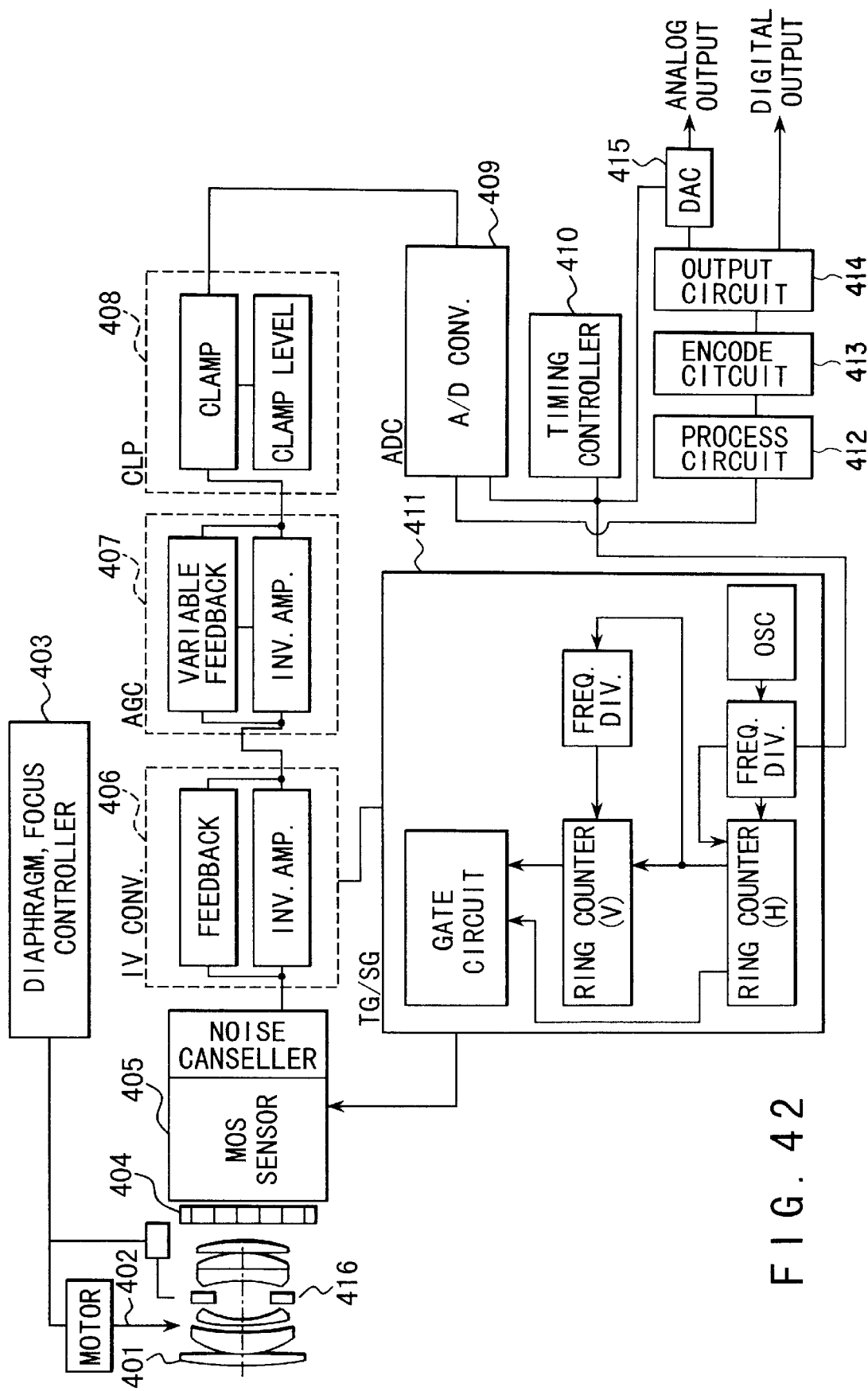
FIG. 42 is a schematic view showing a video camera using an MOS sensor according to a fifteenth embodiment of the present invention.

FIG. 42 shows an embodiment of a video camera using the MOS sensor according to the present invention. As shown in FIG. 42, a video camera according to the present invention comprises a lens 401 for picking up an image of an object, a focus adjusting mechanism 402 for adjusting the focus of the optical system, a diaphragm/focus adjusting circuit 403 for controlling a diaphragm mechanism 416 and the focus adjusting mechanism 402, an MOS sensor 405 for converting an optical image formed by the lens 401 into an electric signal corresponding to the quantity of light of the optical image in pixel units, a color filter array 404 disposed on the image forming side of the MOS sensor 405 and having a color filer section for each pixel for any one of R, G and B, a current-to-voltage converter 406 for converting the electric signal obtained by the MOS sensor 405 into a voltage signal, an AGC circuit 407 for adjusting the level of the voltage signal obtained through the current-to-voltage converter 406, a clamp (CLP) circuit 408 for clamping voltage signals having levels aligned by the AGC circuit 407, an analog-to-digital converter (ADC) 409 for converting an output from the CLP circuit 408 into a digital signal having the corresponding level, a timing control circuit 410 for generating a timing pulse (a clock signal) for arranging timing which is the base of the operation of the system, a TG/SG circuit 411 for controlling the operation of the MOS sensor 405 in synchronization with the clock signal output from the timing control circuit 410, a process control circuit 412 for processing a digital signal output from the ADC circuit 409, an encoder circuit 413 for encoding a signal processed by the process control circuit 412, an output circuit 414 for outputting an encoded signal and a digital-to-analog converter 415 for converting a signal output through the output circuit 414 into an analog signal.

In the video camera 400 having the above-mentioned structure, light from the object is made incident on the MOS sensor 405 through the lens 401, and incidental light is photoelectrically converted into an electric signal so as to be output as a current value. The color filter array 404 in which red, blue and green filters are periodically disposed to correspond to the pixels is formed on the MOS sensor 405. As a result, color image signals corresponding to three primary colors are output from one MOS sensor 405 as electric signals.

The electric signals output from the MOS sensor 405 are supplied to the ADC circuit 409 through the current-to-voltage converter 406, the AGC circuit 407 and the CLP circuit 408.

The ADC circuit 409 converts the output into digital data in which one sample value is formed by, for example, 8 bits in response to an image signal supplied from the CLP 408, and then supplies data to the process control circuit 412.

The process control circuit 412 comprises, for example, a color separation circuit, a clamping circuit, a gamma correction circuit, a white clip circuit, a black clip circuit and a knee circuit to subject the supplied image signal to required processes. If necessary, the process control circuit 412 subjects the supplied image signal to a color balance process and the like. The signal processed by the process control circuit 412 is supplied to the encoder circuit 413.

The encoder circuit 413 calculates the supplied signal to convert the signal into a brightness signal and a color difference signal. When the output from the video camera is communicated through a network or the like, the encoder circuit 413 performs a process for converting the signal to be adaptable to the PAL method, the NTSC method or the like.

The timings of the operations of the MOS sensor 405 and the current-to-voltage converter 406 are controlled in response to a timing signal and a synchronizing signal supplied from the TG/SG circuit (a timing generator/signal generator) 411. The power for operating the TG/SG circuit 411 and output voltage from the same are the same as the level of the power supplied to the MOS sensor 405.

Then, the image signal is supplied to the digital-to-analog converter 415 through the output circuit 414. The digital-to-analog converter 415 converts the supplied signal into an analog video signal so as to output the same as a camera signal. Also the image signal can directly be output as a digital signal through the output circuit 414. The foregoing camera signals are supplied to a recording apparatus, such as a video tape recorder and a monitor apparatus.

According to this embodiment, a video camera having a necessity of processing an image at 30 frames in one second and capable of reducing electric power consumption, lowering required voltage level can be provided which is enabled to cancel a fixed pattern noise component in a horizontal blanking period and obtain an image signal exhibiting excellent S/N and an excellent quality of the formed image.

Figure 43:
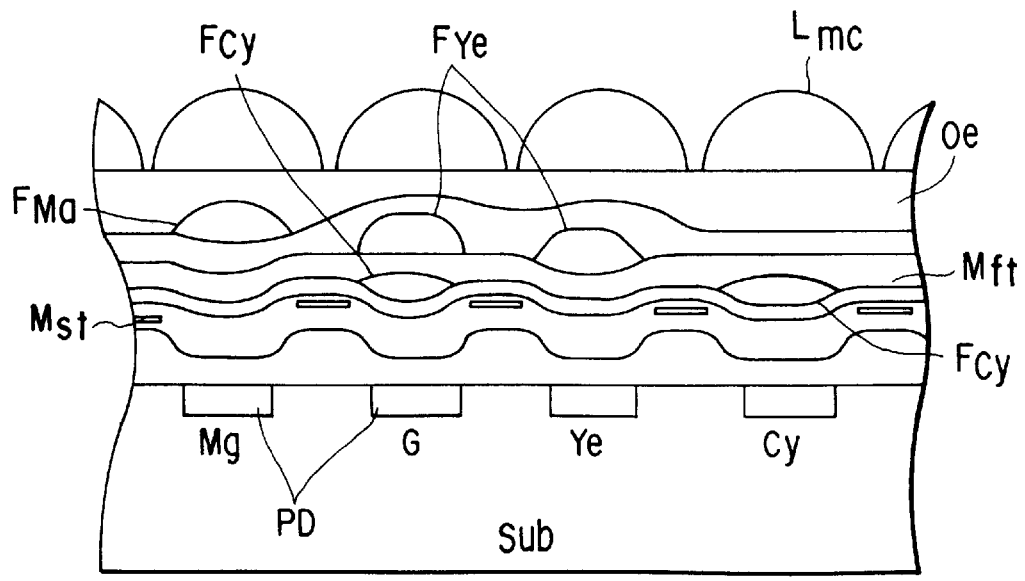
FIG. 43 is a cross sectional view showing an MOS-type imaging device having a structure in which a color filter array and an MOS sensor are integrated according to the fifteenth embodiment.

Although the color filter array 404 and the MOS sensor 405, which is the imaging device, are individual devices in this embodiment, a CCD device has been structured in recent years such that the imaging device and the color filter are integrally formed. Therefore, the color filter array 404 and the MOS sensor 405 may be formed integrally. An imaging device having the integrated color filter array 404 and the MOS sensor 405 may have a structure shown in FIG. 43.

That is, a light shielding film Mst which is a light shielding mask having an opening corresponding to the light receiving region of each photodiode and made of, for example, aluminum, is formed on the light receiving surface of each photodiode of the semiconductor substrate SUB in which a plurality of small photodiodes PD are disposed into a matrix configuration. On the light shielding film Mst, a transparent flat and smooth film Mft is formed, and then a cyan filter Fcy, a magenta filter Fmg and a yellow filter Fye are formed thereon.

The photodiodes PD are sectioned into those for a magenta image Mg, a green image G, a yellow image Ye and a cyan image Cy. The cyan filter Fcy is formed to be positioned on the light receiving surface of the photodiodes for the green image and the cyan image, the magenta filter Fmg is formed to be positioned on the light receiving surface of the photodiode for the magenta image, and the yellow filter Fye is formed to be positioned on the light receiving surface of the photodiode for the yellow image. Then, a transparent overcoating layer Oc is formed on the upper surface of the photodiode PD, and a microlens array Lmc is formed on the overcoating layer Oc. The microlens array Lmc has a structure in which a multiplicity of small lenses are disposed. Each of the small lens sections is designed to be positioned on the light receiving surface of the photodiode PD. The microlens array Lmc acts to maintain the quantity of incidental light upon the photodiode PD so that the detection sensitivity of the photodiode PD is raised.

When an imaging device having the integrated color filter is employed as an imaging device (the MOS sensor 405) of a single-plate type imaging system, the necessity of individually disposing the color filter can be canceled. Thus, the position alignment of the color filter with respect to each pixel on the light receiving surface of the MOS sensor 405 can be omitted. As a result, the space of the optical system can be reduced.

Sixteenth Embodiment (Application to Amplifying MOS Sensor to Video Camera)

Figure 44:
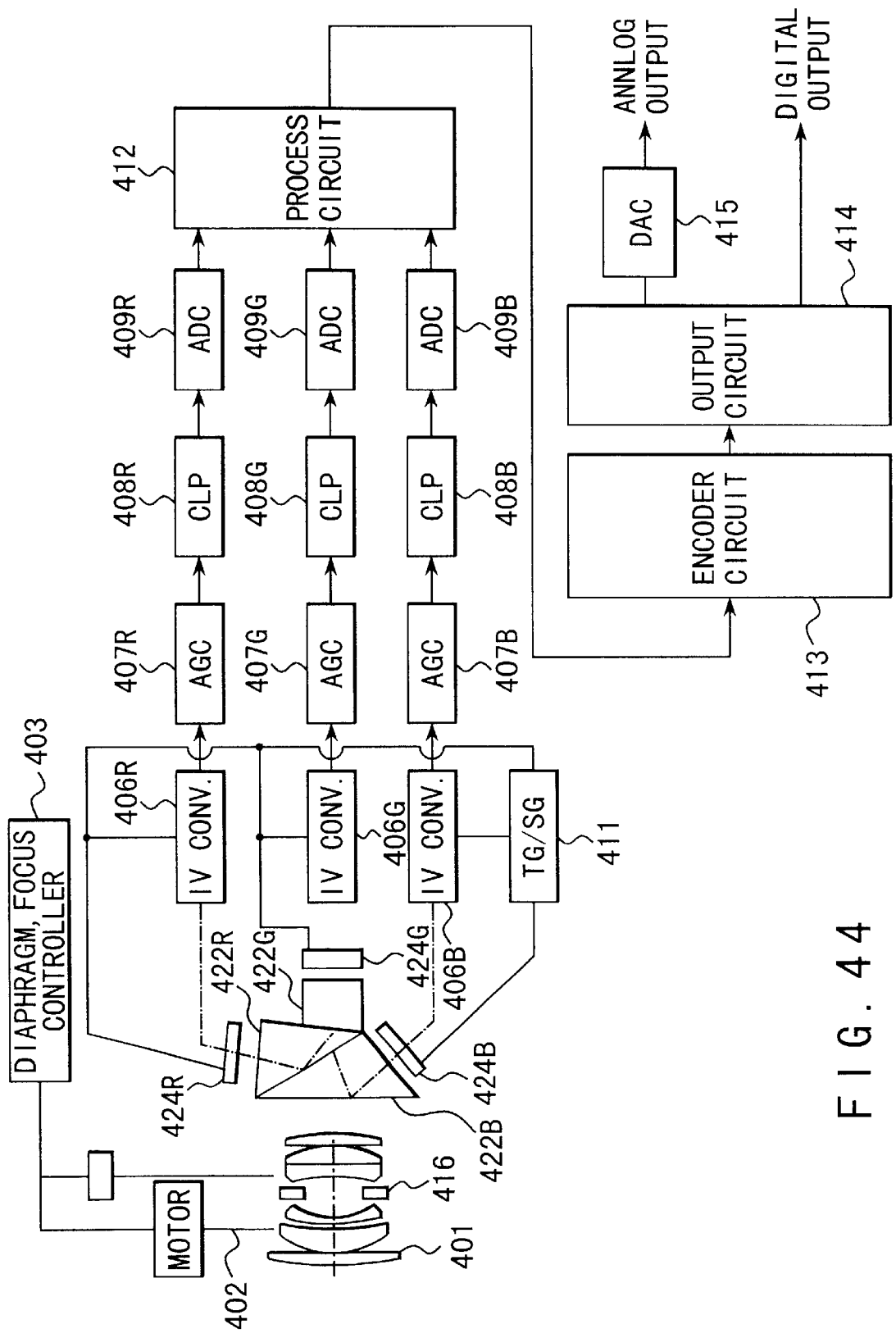
FIG. 44 is a schematic view showing another video camera using an MOS sensor according to a sixteenth embodiment of the present invention.

FIG. 44 shows another embodiment of the video camera comprising the MOS sensor according to the present invention. The video camera shown in FIG. 44 has a three-plate type structure, in which the imaging system is divided into three (RGB: Red, Green and Blue) systems as compared with the structure shown in FIG. 42 which has the single-plate type imaging system. As shown in FIG. 44, a video camera according to the present invention comprises a lens 401 which is an optical system for forming an image of an object, a focus adjusting mechanism 402 for adjusting the focus of the optical system, a diaphragm/focus adjusting circuit 403 for controlling a diaphragm mechanism 416 for adjusting the quantity of incidental light into the optical system and a focus adjusting mechanism 402, a color separating prisms 422R, 422G and 422B for separating the optical image formed by the lens 401 into three primary color components (RGB), MOS sensors 424R, 424G and 424B for R component, the G component and the B component which are imaging devices on which the image separated into the three primary color components R, G and B by the color separating prisms 422R, 422G and 422B is formed and in which the image is converted into an electric signal corresponding to the quantity of light of the optical image in pixel units, current-to-voltage converters 406R, 406G and 406B for R component, the G component and B component for converting the electric signals obtained by the MOS sensors 424R, 424G and 424B into voltage signals, AGC circuits 407R, 407G and 407B for R component, the G component and B component for adjusting the levels of the voltage signals obtained by the current-to-voltage converters 406R, 406G and 406B, clamp (CLP) circuits 408R, 408G and 408B for R component, the G component and B component for clamping the voltage signals having the levels aligned by the AGC circuits 407R, 407G and 407B, analog-to-digital converters (ADC) 409R, 409G and 409B for R component, the G component and B component for converting outputs from the CLP circuits 408R, 408G and 408B into digital signal having the corresponding levels, a timing control circuit 410 for generating timing pulses for arranging the timing which is the base of the operation of the system, a TG/SG circuit 411 for R component, the G component and B component for controlling the operation of the MOS sensor 405 in synchronization with the timing pulse output from the timing control circuit 410, a process control circuit 412 for processing digital signals from the ADC circuits 409R, 409G and 409B, an encoder circuit 413 for encoding the signal processed by the process control circuit 412, an output circuit 414 for controlling input and output of the encoded signal and a digital-to-analog converter 415 for converting the signal through the output circuit 414 into an analog signal.

In the video camera having the above-mentioned structure, light from an object is allowed to pass through the lens 401 and the color separating prisms 422R, 422G and 422B so as to be focused on the MOS sensors 424R, 424G and 424B.

The color separating prisms 422R, 422G and 422B separate the optical image into R, G and B three primary color components. An image separated into the R, G and B three primary color components by the color separating prisms 422R, 422G and 422B is, for each component, focused on the MOS sensors 424R, 424G and 424B.

The optical image in the form of the R, G and B components formed on the MOS sensors 424R, 424G and 424B is photoelectrically converted into an electric signal so as to be output as a current value corresponding to the brightness.

The electric signals in the form of color components output from the MOS sensors 424R, 424G and 424B are supplied to the ADC circuits 409R, 409G and 409B through the current-to-voltage converter 406, the AGC circuit 407 and the CLP circuit 408 corresponding to the color components.

The circuits 409R, 409G and 409B for the corresponding colors convert an image signal supplied from the CLP circuit 408 into digital data in which one sample value is comprised of, for example, 8 bits to supply data above to the process control circuit 412.

The process control circuit 412 comprises, for example, a gamma correction circuit, a white clip circuit, a black clip circuit and a knee circuit to subject the supplied image signal to required processes. If necessary, the process control circuit 412 subjects the supplied image signal to a color balance process and the like. The signal processed by the process control circuit 412 is supplied to the encoder circuit 413. The encoder circuit 413 calculates the supplied signal and subjects the signal to a color balance process or the like. When the output from the video camera is communicated through a network or the like, the encoder circuit 413 performs a process for converting the signal to be adaptable to the PAL method, the NTSC method or the like which are standard color television broadcast method.

The timings of the color separating prisms 422R, 422G and 422B and the current-to-voltage converter 406 are controlled in response to the timing signals and synchronizing signals supplied from the corresponding TG/SG circuits 411. The operating power for the TG/SG circuit 411 and the output voltage from the same are the same level as that of the electric power which is supplied to the MOS sensor 405.

Then, the image signal is, through the output circuit 414, supplied to the D/A converter 415. The D/A converter 415 converts the supplied signal into an analog video signal so as to output the same as a camera signal. Also the image signal can directly be output as a digital signal through the output circuit 414. The foregoing camera signals are supplied to a recording apparatus, such as a video tape recorder and a monitor apparatus.

According to this embodiment, a video camera having a necessity of processing an image at 30 frames in one second and capable of reducing electric power consumption, lowering required voltage level can be provided which is enabled to cancel a fixed pattern noise component in a horizontal blanking period and obtain an image signal exhibiting excellent S/N and an excellent quality of the formed image.

Although the above-mentioned structures are arranged to use the color separating prism to separate the optical image into the three primary color components R, G and B, a diachronic mirror may be employed to separated the optical image. In this case, diachronic mirrors for reflecting red, green and blue components are employed to separate and distribute incidental light so as to separate the optical image into the R, G and B components. The optical images are formed by MOS sensors for R, G and B images so that R, G and B image signals are obtained. Thus, a structure can be formed in which any prism is required to separate the optical image into three primary color components.

Seventeenth Embodiment (Application of Amplifying Type MOS Sensor in Network System)

FIG. 45 shows an example of the structure of a system for transferring, to a monitor or the like, a signal from the video camera 400 or 400-2 according to the fifteenth and sixteenth embodiments through a network. Referring to FIG. 45, reference numeral 430 represents a network such as a LAN (Local Area Network), a public line (a telephone line), an exclusive line, Internet or Intranet or the like. The video camera 400 or 400-2 is connected to the network 430 through an interface 432.

Reference numeral 434 represents an intelligent terminal which is a personal computer or a work station. The intelligent terminal 434 comprises a personal computer 436 including a processor, a main memory, a clock generator and so forth, an interface 438 for establishing the connection to the network, a video RAM 440 which is a memory for displaying an image, a printer interface 442, a standard bus interface 444 such as SCSI (Small Computer System Interface), an interface 446 for connecting the video camera and an interface 448 for connecting the scanner.

A monitor 450, such as a CRT or a liquid crystal display unit, is connected to the video RAM 440. A printer 452 is connected to the printer interface 442. A large-capacitor external storage unit 454, such as an optical disk unit, a hard disk unit or a DVD (Digital Versatile Disc) is connected to the standard bus interface 444. An image scanner 458 for fetching an image from, for example, a hard copy is connected to the interface 448 for connecting the scanner. A video camera 456 having, for example, the above-mentioned structure is connected to the interface 446 for connecting the video camera.

In the above-mentioned structure, an image of an object obtained by the video camera 400 or 400-2 is, as described above, subjected to a process for converting the same into a digital signal compressed by the MPEG method so as to be output to the network or the like by the encoder circuit 413 (see FIGS. 42 and 44). The composite video signal is, as digital data, output to the network 430 through the interface 432 while being formed into a transmission format for the network. The intelligent terminal 434 is connected to the network 430 through the interface 438. Thus, if data transferred from the video camera 400 or 400-2 is destined to the intelligent terminal 434, the computer 436 of the intelligent terminal 434 receives transferred data from the network 430 through the interface 438. Then, the computer 436 extracts image information portion from transferred data. Since the image has been compressed in the video camera 400 or 400-2, the computer 436 expands the image so as to reproduce an original image. Data of the reproduced image is sequentially written on the video RAM 440. Since the image is in the form of a dynamic image, image data in the video RAM 440 is sequentially updated. As a result, the dynamic image supplied from the video camera 400 or 400-2 is displayed on the monitor 450 for displaying introduced data in the video RAM 440 as an image.

The image of the object obtained by the video camera 400 or 400-2 is, as described above, converted into digital data in the compressed form by the MPEG method so as to be communicated through the network or the like. Then, digital data is output to the computer 436 through the interface 438. The computer 436 expands the supplied image to reproduce the original image. Then, the computer 436 sequentially writes data of the reproduced image onto the video RAM 440. Thus, the dynamic image supplied from the video camera 400 or 400-2 is displayed on the monitor 450 for displaying image data from the video RAM 440 as an image.

When the image obtained by the video camera 400 or 400-2 connected to the intelligent terminal 434 is transferred to the network 430, the computer 436 edits the image into the transferring format adapted to the network, and then outputs the same to the network 430 through the interface 438.

Eighteenth Embodiment (Application of Amplifying Type MOS Sensor to Still Camera)

FIG. 46 shows an embodiment of a still camera using the MOS sensor according to the present invention. As shown in FIG. 46, a still camera according to the present invention comprises an optical system 511 including a lens system and a diaphragm and arranged to extract an image of an object, an MOS sensor 515, on which an image formed by the optical system 511 is made incident, a mirror 512 disposed between an imaging surface of the MOS sensor 515 and the optical system 511 so as to have a function of a shutter which is arbitrarily inserted/removed to and from an optical path formed between the MOS sensor 515 and the optical system 511 to distribute the image of the object extracted by the optical system 511 to a finder 514 when the mirror 512 is inserted into the foregoing optical path and cause the image of the object extracted by the optical system 511 to be formed on the imaging surface of the MOS sensor 515 when the mirror 512 is removed from the optical path, a mirror 513 for introducing light reflected by the mirror 512 to the finder 514, an imaging circuit 516 for reading the signal of the image supplied from the MOS sensor 515 for each color component, an A/D converter 517 for converting the read output into a digital signal, a frame memory 518 for, for each frame, storing the digital signal converted by the A/D converter 517, a compressing circuit 519 for compressing the digital signal stored by the frame memory 518 in frame units, a memory card 521 for storing image data and a card control circuit 520 for controlling compressed image data to be written on the memory card 521.

When a shutter button (not shown) is depressed, an image of an object obtained by the optical system 511 is made incident on the MOS sensor 515. The MOS sensor 515 is a solid state imaging device having the noise canceler circuit according to the present invention arranged to convert the image into an electric signal corresponding to the quantity of light of the optical image in pixel units when the optical image obtained by the optical system 511 has been formed. To take a color image, the MOS sensor 515 has a color filter array having any one of R, B and G color filters on the image forming surface thereof for each pixel. The imaging circuit 516 separates the electric signal obtained from the MOS sensor 515 into R, B and G components so as to output the separated components. The current-to-voltage converter 506 converts the electric signals for the respective colors output from the imaging circuit 516 into digital signals, the digital signals being temporarily stored in the frame memory 518 for each frame.

The digital signal stored in the frame memory 518 is compressed by the compressing circuit 519 for a unit of frame so as to be output to the card control circuit 520. The card control circuit 520 causes data of the compressed image to be stored in the memory card 521 which is the data storage medium.

Thus, the still image picked up whenever the shutter button is depressed is compressed for each frame so as to be stored in the memory card 521. The memory card 521 is arranged to be detachable from the camera. The image stored in the memory card 521 is expanded so as to be reproduced so that the original image is displayed on the monitor or output to a hard copy unit, such as a video printer by loading the memory card 521 to a reading and reproducing apparatus (not shown).

This embodiment enables the electric power consumption to be reduced, required voltage level to be lowered and a high speed successive image picking-up to be performed with a high S/N ratio such that a plurality of frames can successively be picked up in one second. Thus, a still camera exhibiting a compact size, excellent function and satisfactory performed can be obtained. That is, a still camera can be provided which is capable of canceling fixed pattern noise component, which is a problem for the MOS sensor, in a short time, which exhibits excellent S/N and which enables a high quality picture to be obtained.

Nineteenth Embodiment (Application of Amplifying Type MOS Sensor to Facsimile Machine)

Figure 47:
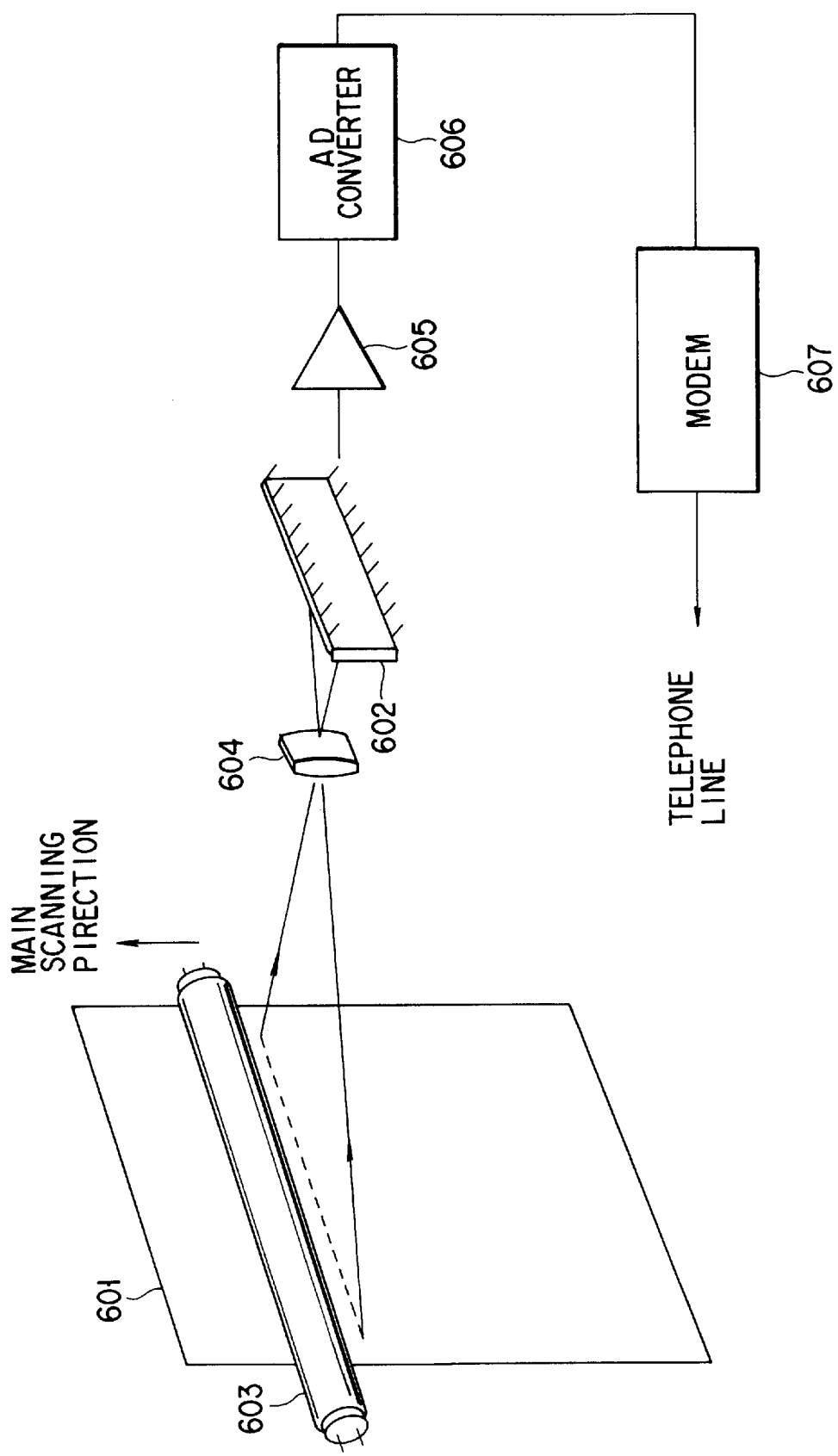
FIG. 47 is a diagram showing a facsimile machine using an MOS sensor according to a nineteenth embodiment of the present invention.

FIG. 47 shows an embodiment in which a facsimile machine comprises the MOS sensor according to the present invention. FIG. 47 shows a principle structure. An original document, such as a handwritten paper or a printed sheet, or a sheet-shape original document 601, such as a photograph, is fed by a main conveyance mechanism (not shown) in the main scanning direction so as to be read by an MOS sensor 602 fixed at a predetermined position traversing the original document. Reference numeral 603 represents a light source, and 604 represents a lens for forming the image of the original document on the light receiving surface of the MOS sensor 602.

The MOS sensor 602 is a linear sensor having light receiving portions (photodiodes) corresponding to the pixels and disposed in one-dimensional configuration, the MOS sensor 602 being a monochrome solid state imaging device having the noise canceler circuit according to the present invention.

When the sheet original document 601 is set to the facsimile machine, the main conveying mechanism (not shown) conveys the original document 601 into the main scanning direction. Thus, the image of the original document is, through the lens 604, formed on the light receiving surface of the MOS sensor 602 secured to a predetermined position by a quantity for each line. The MOS sensor 602 reads information of the formed image of the original document.

That is, the MOS sensor 602 reads and outputs the signals corresponding to the quantity of received light in the receipt order as image signals in unit of pixels. Thus, the amplifier 605 sequentially amplifies the image signals. Then, the amplified image signals are converted into digital signals by the A/D converter 606. Then, the modem 607 modulates the digital signals to be adaptable to the telephone line, and then outputs to the telephone line.

The receiving side machine demodulates the supplied signals, and prints the pixels in the traversing direction of a recording sheet with a density corresponding to the signal level in the receipt order. Thus, the image is reproduced as a hard copy.

This embodiment is able to reduce electric power consumption, lowers the required voltage and reads an image at high speed with high S/N. Thus, a facsimile machine having a compact size, excellent function and satisfactory performance can be obtained. That is, the problem of fixed pattern noise component experienced with the MOS sensor can be canceled in a short time. Therefore, a facsimile machine exhibiting excellent S/N and capable of transferring a high quality image at high speed can be provided.

In recent years, a linear sensor of a contact type has been put into practical use which comes in contact with the surface of an original document to read the image of the original document. To realize the contact type linear sensor, a structure may be formed by integrating a lens for introducing the image of the original document, a light receiving section to which the image introduced by the lens is formed and which converts the image into an electric signal which corresponds to the quantity of light and a light emitting device which applies light to the surface of the original document. The present invention may be applied to the foregoing structure.

Twentieth Embodiment (Application of Amplifying Type MOS Sensor to Copying Machine)

Figure 48:
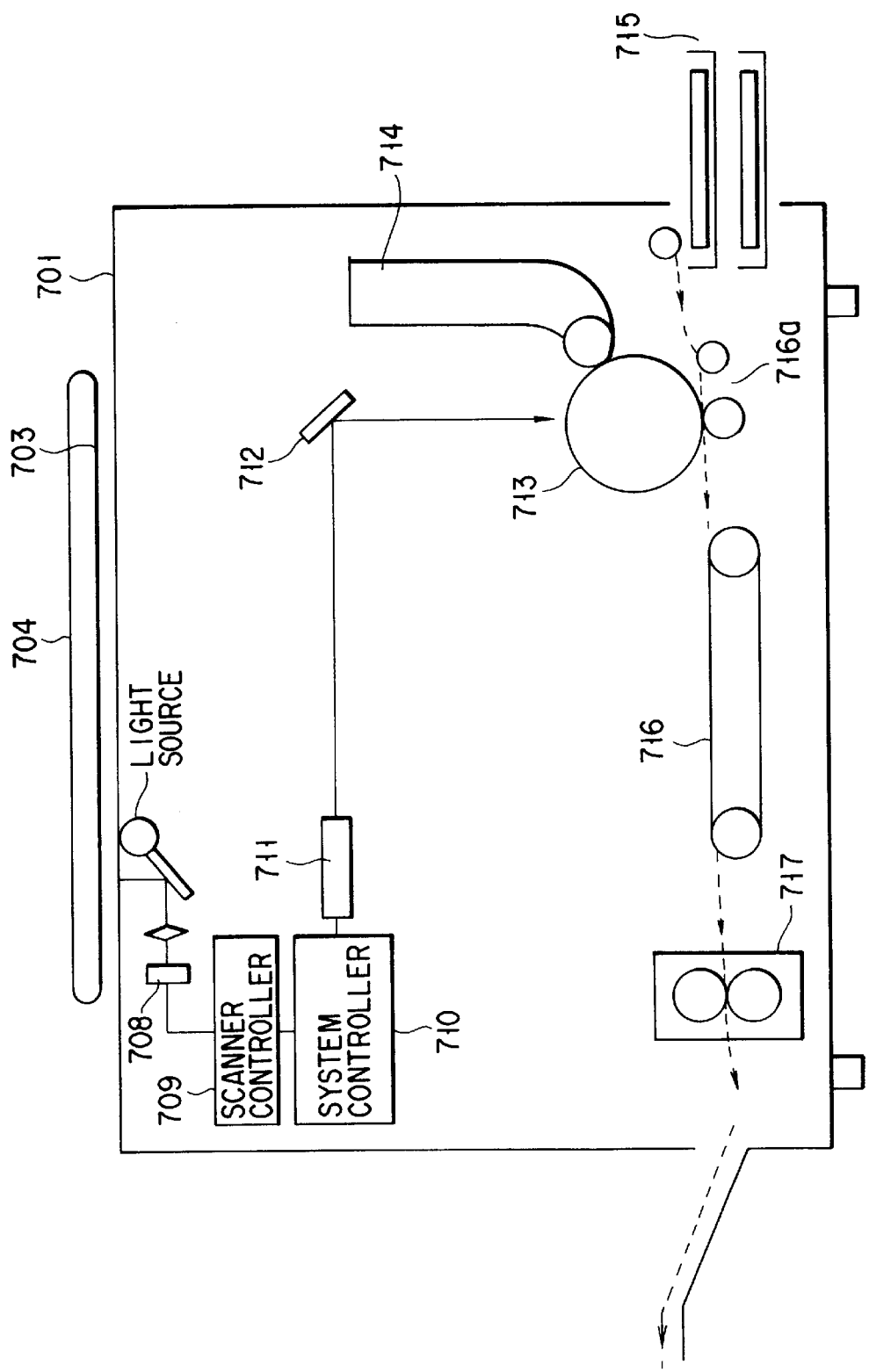
FIG. 48 is a diagram showing an electronic copying machine using an MOS sensor according to a twentieth embodiment of the present invention.

FIG. 48 shows an embodiment of an electronic copying machine having the MOS sensor according to the present invention. FIG. 48 shows the principle structure. A original-document retainer 702 comprising a transparent glass is disposed on the upper surface of a box-like frame 701. A sheet original document 703, which is a handwritten original document or a sheet shape original document 703, such as a picture, is placed on the original-document table 702, the original document 703 being pressed by a pressing cover 704.

The frame 701 includes an optical system disposed substantially just below the original-document table 702 and arranged to be capable of reciprocating between two ends of the original-document table 702 at predetermined speed. The reciprocative direction is, in this embodiment, called a main scanning direction. The optical system comprises a light source 705, a mirror 706 and a lens 707. The light source 705 is disposed in a direction (which is called as a "sub-scanning direction") perpendicular to the main scanning direction.

AN MOS sensor 708 is disposed at the imaging position of the lens 707. The MOS sensor 708 is a linear sensor having light receiving sections (photodiodes) corresponding to pixels and disposed in one-dimensional configuration, the MOS sensor 708 being a monochrome solid state imaging device having the noise canceler circuit according to the present invention.

An image for one line in the sub-scanning direction is formed on the MOS sensor 708. The MOS sensor 708 converts the image into a signal corresponding to the quantity of light. A scanner controller 709 controls the MOS sensor 708 so that signals corresponding to the quantity of received light are read as image signals in the disposing order of the pixels and then output. Moreover, the scanner controller 709 controls the movement of the optical system in the main scanning direction so that the optical system is sequentially moved in the main scanning direction. The system controller 710 totally controls the system. Moreover, the system controller 710 controls the output from a laser beam source 711 in response to the signals output from the MOS sensor 708 and corresponding to the quantity of received light. A laser beam source 711 emits a spot-shape laser beam. The laser beam emitted from the laser beam source 711 is reflected by a polygonal mirror 712 which is a scanning mirror for scanning the laser beam so as to be formed on a cylindrical photosensitive drum 713. The position, at which the laser beam is formed, is the image forming position. The photosensitive drum 713 is rotated in one direction at predetermined speed. The photosensitive drum 713 is electrically charged by a charging unit (not shown) at a position (upstream of the image forming position) upstream of the position at which the laser beam is applied.

The polygonal mirror 712 is controlled by the system controller 710 so that the surface of the cylindrical photosensitive drum 713 is scanned with the spot-shape laser beam corresponding to the output speed of the signal output from the MOS sensor 708. Assuming that the direction of rotation of the photosensitive drum 713 is the main scanning direction, the laser beam is scanned in a direction perpendicular to the rotation direction, the surface of the photosensitive drum 713 loses the electric charges to correspond to the quantity of the laser beam. Thus, a latent image corresponding to the image of the original document is formed on the surface of the photosensitive drum 713. When the photosensitive drum 713, at a position downstream of the image forming position, passes through the position of a developing section 714 for converting the latent image into a visible image, the latent image at the corresponding position is converted into a visible image with toner supplied from the developing section 714. The toner image is transferred to copy paper sheets sequentially picked up from an accommodating tray 715 for the copy paper sheets and conveyed to a conveying passage 716 below the photosensitive drum 713.

The speed at which the copy paper sheet is conveyed and the rotation speed of the photosensitive drum 713 are synchronized with each other. The toner image of the latent image sequentially formed for each line and then formed on the surface of the photosensitive drum 713 are transferred to the copy paper sheets so that toner images, which are the same as those of the original document, are left on the copy paper sheets. The conveying passage 716 is a passage through which the copy paper sheet to which the toner image has been transferred is conveyed to a discharge port. A conveying mechanism provided for the conveying passage 716 conveys the copy paper sheet to the discharge port. A fixing section 717 is a unit disposed in front of the discharge port to fix the toner. When copy paper sheet, to which the toner image has been transferred, is allowed to pass through the fixing section 717, the toner is fixed to the copy paper sheet. Then, the copy paper sheet is discharged to the discharge port.

Since the structure is formed as described above, the copying operation is performed such that the sheet original document 703 is placed on the upper surface of the original-document table 702. Then, the pressing cover 704 presses the original document 703. Since the optical system capable of reciprocating from one end of the original-document table 702 to another end of the same in the main scanning direction at predetermined speed is disposed at a position substantially just below the original-document table 702, a print start operation causes the light source 705, the mirror 706 and the lens 707 forming the optical system reciprocate in the main scanning direction.

Assuming that the main scanning direction is considered the vertical direction, the lateral direction of the original-document table 702 is determined to be the widthwise direction. In this case, the light source 705 of the optical system illuminates the portion corresponding to the width of the original-doĉument table 702. The mirror 70G and the lens 707 of the optical system forms the image in the foregoing range on the light receiving surface of the MOS sensor 708. The MOS sensor 708 is a linear sensor having light receiving sections (the photodiodes) corresponding to the pixels and disposed in one-dimensional configuration, the MOS sensor 708 being a monochrome solid state imaging device having the noise canceler circuit according to the present invention.

Therefore, the MOS sensor 708 picks up images for one line (that is, one line in the sub-scanning direction) in the widthwise direction, and then converts the images into signals corresponding to the quantity of received light. The scanner controller 709 controls the MOS sensor 708 so that the signals corresponding to the quantity of received light in the disposing order of the pixels are read and output as image signals in pixel units. Moreover, the scanner controller 709 controls the movement of the optical system in the main scanning direction so that the optical system is sequentially moved in the main scanning direction. As a result, signals of the images of the original document 703 on the original-document table 702 corresponding to the quantity of received light are obtained sequentially in the main scanning direction for each line in the sub-scanning direction in the disposing order of the pixels.

The signals are supplied to the system controller 710, and then the system controller 710 controls the output from the laser beam source 711 to correspond to the signals. Therefore, the laser beam source 711 emits light having the intensity corresponding to the quantity of received light output from the MOS sensor 708.

Since the system controller 710 controls the polygonal mirror 712 to swing in synchronization with the reading speed of the MOS sensor 708, the optical images for one line (that is, for one line in the sub-scanning direction) are formed on the photosensitive drum 713 by the polygonal mirror 712.

The photosensitive drum 713 is rotated in one direction at peripheral speed corresponding to the main scanning speed. The outer surface of the photosensitive drum 713 has been electrically charged by the charging means when the outer surface reaches the position, at which the image is formed with the laser beam. When the photosensitive drum 713 is irradiated with the laser beam, the portion of the photosensitive drum 713 irradiated with the laser beam loses charges by a quantity corresponding to quantity of applied light. Therefore, the image of the original document is, as a latent image, left on the photosensitive drum 713 in a downstream region in the direction of rotation from the position which has been scanned with the laser beam for forming the image.

The latent image is developed and converted into a visible image with the toner supplied from the developing section 714 when the latent image passes through the position corresponding to the developing section 714. The toner image is transferred to the copy paper sheets sequentially picked up from the accommodating tray 715 for accommodating the copy paper sheets and conveyed to the conveying passage 716 at a position below the photosensitive drum 713. Since the conveyance speed of the copy paper sheet and the speed of rotation of the photosensitive drum 713 are synchronized with each other, the toner image of the latent image sequentially formed on the surface of the photosensitive drum 713 for each line is transferred. Thus, the toner image of the image which is the same as the image of the original document is left on the copy paper sheet. The copy paper sheet, to which the toner image has been transferred, is conveyed through the conveying passage 716 toward the discharge port by the conveying mechanism. When the copy paper sheet passes through the fixing section 717 formed in front of the discharge port, toner is fixed to the copy paper sheet by the fixing section 717. Then, the copy paper sheet is discharged.

According to this embodiment, the electric power consumption can be reduced, the required voltage level can be lowered and an original document can be read at high speed with excellent S/N ratio. Thus, an electronic copying machine exhibiting a compact size, excellent function and satisfactory performance can be obtained. That is, a fixed pattern noise component which has raised a problem with the MOS sensor can be canceled in a short time. Thus, an electronic copying machine can be provided which exhibits an excellent S/N ratio and thus capable of reading a high quality image at high speed and copying the same.

Although the position of the original document is fixed and the optical system is moved in the main scanning direction in this embodiment, the optical system may be fixed and the original document may be conveyed in the main scanning direction. Although the copying machine according to this embodiment is a monochrome machine, a copying machine may be employed in which color filters in three primary colors are provided for the optical system to separate the color so as to form latent images in the respective colors and develop the latent images with tone in the corresponding colors so that a color copy is obtained.

Twenty-First Embodiment (Application of Amplifying Type MOS Sensor to Scanner)

FIG. 49 shows an embodiment of a handy image scanner using the MOS sensor according to the present invention. An image scanner, as shown in FIG. 49, comprises a frame 801 in which a LED array 802 serving as a light source, a mirror 803 and a roller 804 are attached. The LED array 802 has a length substantially the same as the width of the frame 801 to illuminate the outside portion below the frame 801. The mirror 803 is disposed adjacent to the LED array 802 to pick up an image of an original document irradiated by the LED array 802 into the frame 801 through a slit 801a formed in the lower portion of the frame 801.

The frame 801 is placed on an original document. Then, it is manually slid on the original document to scan the original document. At this time, a roller 804 is disposed to synchronize detection of the line position and the reading timing in order to fetch the image of the original document for line units through the slit 801a.

To be brought into contact with the original document and rotated attributable to friction with the original document, a portion of the outer surface of the roller 804 is exposed through the lower portion of the frame 801. The position of exposure is near the slit 801a.

The frame 801 includes an encoder 805 for detecting a direction and amount of rotation of the roller 804 in synchronization with the rotation of the roller 804. Moreover, the frame 801 includes an MOS sensor 806 and a lens 807 for forming, on the light receiving surface of the MOS sensor 806, an image of the original document introduced by the mirror 803.

The MOS sensor 806 is a linear sensor having light receiving sections (photodiodes) disposed in one-dimensional array for unit of pixels, the MOS sensor 806 being a monochrome solid state imaging device having the noise canceler circuit according to the present invention. In recent years, the linear sensor of a type arranged to be brought into close contact with the surface of an original document to read the image of the original document has been widely used. The contact type sensor can be realized by employing a structure formed by combining a lens for introducing the image of an original document, light receiving sections disposed in pixel units to convert the image into an electric signal corresponding to the quantity of light and a light emitting device for irradiating the surface of the original document with light.

The signal read from the MOS sensor 806 is subjected to position corresponded in accordance with an output from the encoder 805 so as to be used to control the reading timing.

The sheet-form original document is placed on a plain portion, and then the handy scanner is placed on the original document. Then, the handy scanner is moved in the direction in which the roller 804 can be rotated. The direction of movement at this time is the main scanning direction. At this time, the LED array 802 illuminates the surface of the original document so that the image of the original document is introduced into the mirror 803 through the slit 801a. The image is reflected by the mirror 803, and then formed on the MOS sensor 806 by a lens 807.

The MOS sensor 806 is a line image sensor on which the image of the original document for each line is made incident through the lens 807.

As described above, the handy image scanner according to this embodiment is arranged such that the frame 801 is placed on the original document and then manually moved to slide on the surface of the original document. To fetch the image of the original document in unit of lines through the slit 801a, the roller 804 is provided which synchronizes the detection of the position of the line and the reading timing. The roller 804 is brought into contact with the original document so as to be rotated because of the friction with the original document. As a result, a detection signal representing the direction and amount of rotation of the roller 804 is output from the encoder 805. In response to the detection signal supplied from the encoder 805, a control means (not shown) performs control in such a manner that the output signal from the MOS sensor 806 coincides with each line.

According to this embodiment, the electric power consumption can be reduced, the required voltage can be lowered and high speed reading with excellent S/N can be realized. Thus, a compact image scanner can be obtained which exhibits advanced function and satisfactory performance. That is, the fixed pattern noise component raised a problem for the MOS sensor can be canceled in a short time. Thus, an image scanner exhibiting excellent S/N and thus capable of transferring a high quality image at high speed can be provided.

Although the handy image scanner has been described in this embodiment, the present invention can be applied to a desk-top type image scanner structured such that an original document is placed on a original-document table and the optical system performs the main scanner operation. Moreover, an apparatus can be realized which has a structure in which the position of the optical system is fixed and the original document is conveyed in the main scanning direction. Although this embodiment has been described about the monochrome unit, a color image scanner can be realized by providing color filters in three primary colors for the optical system to separate colors to obtain image signals in respective colors so as to obtain color image signals. Moreover, a variety of modification are permitted such that the optical system comprises a concave mirror to introduce the image to the MOS sensor or an optical fiber formed by binding optical fibers is employed to introduce the image to the MOS sensor.

Twenty-Second Embodiment (Desk-Top Type Color Image Scanner)

FIG. 50 shows the structure of a desk-top type color image scanner according to a twenty-second embodiment. The desk-top type color image scanner has an optical system fixed to a predetermined position to scan an original document in the main scanning direction. As shown in FIG. 50, color filters in three primary colors are provided for the optical system to separate colors so as to obtain image signals in respective colors. Referring to FIG. 50, an MOS sensor S for obtaining image signals is a line sensor formed by linearly disposing pixels for one line. A color filter F is disposed on the light receiving side of the MOS sensor S. The color filter F has a structure in which optical filter sections in R (Red), G (Green) and B (Blue) are disposed in parallel. An optical image of an original document DP is formed on the MOS sensor S through a lens L and the color filter F. The original document DP is irradiated with light emitted from a light source LP.

The color filter F is movably supported by a drive and scanning mechanism DR to perform scanning so that the optical filter sections in R (Red), G (Green) and B (Blue) are moved on the light receiving surface of the MOS sensor S. When a red image is received, the optical filter section for the red component is brought to the light receiving surface of the MOS sensor. When a green image is received, the optical filter section for the green component is brought to the light receiving surface. When a blue image is received, the optical filter section for the blue component is brought to the light receiving surface. The foregoing movement is performed in synchronization with the timing at which the images are collected.

As a result, image signals of optical images in R (Red), G (Green) and B (Blue) can be obtained from the MOS sensor.

Twenty-Third Embodiment (Application of Amplifying Type MOS Sensor to Film Scanner)

The amplifying type MOS sensor according to the present invention may be applied to a film scanner for reading each frame of, for example, 35 mm long film to cause a personal computer or an image display unit.

Figure 51:
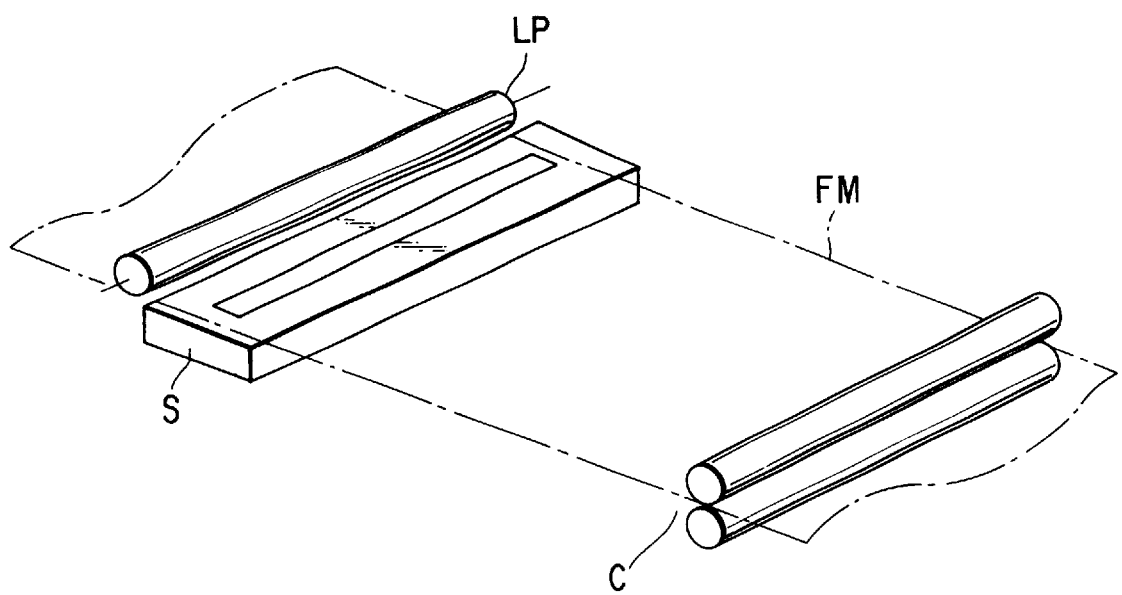
FIG. 51 is a diagram showing an example of application of an MOS sensor to a film scanner according to a twenty-third embodiment of the present invention.

An example of the structure is shown in FIG. 51. As shown in FIG. 51, the film scanner has a contact type line sensor S comprising an amplifying type MOS sensor, a developed silver salt long film FM disposed to face the light receiving surface of the line sensor S, a light source LP for irradiating the silver salt long film FM with light at a position above the light receiving position of the line sensor S and a pair of conveying rollers C for holding and conveying the silver salt long film F in one direction at predetermined speed.

Thus, the conveying roller C holds the silver salt long film FM, and then the conveying roller C is rotated at predetermined speed. As a result, the silver salt long film FM is conveyed in one direction at predetermined speed. Thus, the contact type line sensor S reads the image on the silver salt long film FM in such a manner that synchronization with the speed at which the film is conveyed is established. Thus, a signal corresponding to the quantity of received light is obtained. The signal is subjected to the noise canceling process so that an image of the film composed of only the image component is, in line units, converted into an electric signal so as to be output.

Twenty-Fourth Embodiment (Application to Auto-Focusing Mechanism)

Figure 52:
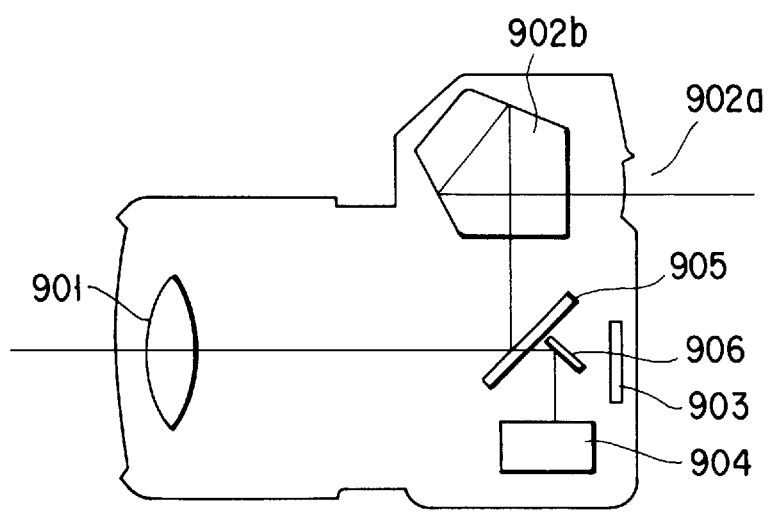
FIG. 52 is a diagram showing a single lens reflex camera having an automatic focusing mechanism using an MOS sensor according to a twenty-fourth embodiment of the present invention.

FIG. 52 shows an embodiment of a single lens reflex camera having an automatic focusing mechanism comprising the MOS sensor according to the present invention. Referring to FIG. 52, the single lens reflex camera 900 according to the present invention comprises a lens 901 provided with a focal point adjustment mechanism, a film 903 on which an optical image obtained by the lens 901 is formed and exposed to light, a prism 902b for introducing the optical image obtained by the lens 901 into a finder 902a of the single lens reflex camera 900, an automatic focus sensor module 904 according to the present invention, automatic focus sensor module 904 comprising a half mirror, disposed on an optical path for the lens 901 and arranged to be completed deviated from the optical path in response to a shutter operation and a sub-mirror 906 attached to the rear side of the finder mirror 905 and arranged to cause an optical image which has transmitted the finder mirror 905 to be formed on the film 903 when the finder mirror 905 is positioned on the optical path for the lens 901.

The automatic focus sensor module 904 comprises the MOS sensor having the noise canceler circuit according to the present invention. As shown in FIG. 53, a separator lens 904b is secured on the front surface of the light receiving surface of the MOS sensor 904a. The MOS sensor 904a has a light receiving surface having a two-dimensional configuration structure. The separator lens 904b is, as shown in FIG. 53, structured such that one pair of convex lenses are disposed adjacently. An optical image distributed by the sub-mirror 906 is, by the separator lens 904b, formed on different regions of the light receiving surface of the MOS sensor 904a. Since the separator lens 904b having the structure in which the pair of the convex lenses are disposed adjacently introduces the optical image to the light receiving surface of the MOS sensor 904a, images are formed on different regions of the light receiving surface so that a pair of images are obtained.

In the camera having the above-mentioned structure, an image of an object obtained by the lens 901 is distributed to the prism 902b and the sub-mirror 906 by the finder mirror 905. The image of the object distributed to the finder mirror 905 is allowed to pass through the prism 902b, and then formed on the finder 902a. Thus, the image of the object captured by the single lens reflex camera 900 can be visualized.

On the other hand, the image of the object distributed to the sub-mirror 906 is introduced into the automatic focus sensor module 904. The automatic focus sensor module 904 comprises the MOS sensor 904a. The front surface of the MOS sensor 904a has the separator lens 904b. The separator lens 904b forms the image onto different regions of the light receiving surface of the MOS sensor 904a. Since the MOS sensor 904a generates electric signals corresponding to the quantity of light of the optical image formed on the photodiodes corresponding to the pixels forming the light receiving, the electric signals are sequential read.

In the automatic focus sensor module 904, the light receiving surface of the portion of the MOS sensor 904a is divided into two image forming regions by the separator lens 904b. Thus, in a state of in focus, the MOS sensor 904a outputs images of the object respectively formed on the two image forming regions in the form as indicated with 906A on the uppermost portion shown in FIG. 53 such that same images appear with respect to reference pixel positions P0 and P0' in each of the divided image forming regions.

In a front focused state (a state where the focus position is deviated forwards than the surface of the film), the MOS sensor 904a outputs as indicated with 906B in the middle portion of FIG. 53 such that same images appear more inwards than the reference pixel positions P0 and P0' in each of the divided image forming regions.

In a rear focused state (a state where the focus position is deviated rearwards than the surface of the film), the MOS sensor 904a outputs as indicated with 906C in the lowermost portion of FIG. 53 such that same images appear outwardly apart from the reference pixel positions P0 and P0' in each of the divided image forming regions.

Therefore, a controlling variable is obtained which is required to adjust the focus of the lens 901 in a direction in which the output from the MOS sensor 904a is made in such a manner that the same images appear with respect to the reference pixel positions P0 and P0' in each of the divided image forming regions. Then, the focal point adjustment mechanism is controlled by a degree corresponding to the obtained controlling variable. Thus, the focal point of the lens 901 is adjusted to focus the surface of the film.

When a shutter button is depressed, the finder mirror 905 is jumped and deviated from the optical path. Thus, the image of the object obtained by the lens 901 is formed on the surface of the film, and the film is exposed to light. As a result, a focus-adjusted image of the object can be photographed.

The camera having the automatic focusing mechanism according to the present invention is able to detect a state of focusing with a small electric power consumption and low voltage. Moreover, high speed reading can be realized with excellent S/N. Even if an object is photographed at high shutter speed or if a high speed successive photographing is performed, the state of focusing can satisfactorily be detected. As a result, the focusing control can immediately be performed to photograph a clear image. That is, the fixed pattern noise component, which has raised a problem for the MOS sensor, can be canceled in a short time. Therefore, a high quality image can be read at high speed with excellent S/N and state of focusing can be detected at high speed. As a result, control of focusing can immediately be performed so that a clear image is photographed.

Although the single lens reflex camera has been described in this embodiment, the automatic focusing mechanism may be applied to a lens shutter camera, a binocular and an optical microscope.

As described above, according to the present invention, a solid state imaging device can be provided which is capable of realizing excellent sensitivity by raising the gain in the photoelectric conversion for unit cell and suppressing introduction of noise from the vertical signal wiring or the like into the gate of an amplifying transistor through a parasitic capacitor and thus realizing low noise operation.

Moreover, a variety of applicable units using the high sensitive and low noise solid state imaging device and exhibiting a high resolution and high image quality can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the embodiments may arbitrarily be combined with one another.

What is claimed is:

1. A solid state imaging device comprising:
   unit cells formed in a surface region of a semiconductor substrate, each of the unit cells comprising:
   a photoelectric converter,
   a read-out transistor configured to read a signal from the photoelectric converter, the read-out transistor being formed in a first device region in the semiconductor substrate,
   an amplifying transistor including a gate connected to a drain of said read-out transistor and configured to amplify the signal read by said read-out transistor,
   a reset transistor including a source connected to the drain of said read-out transistor and configured to reset a potential of a gate of said amplifying transistor, the reset transistor being formed in a second device region in the semiconductor substrate, the second device region being separated from the first device region through an insulator region formed in the surface of the semiconductor substrate,
   a wiring formed above the insulator region of the semiconductor substrate and connected between the drain of the read-out transistor and the source of the reset transistor, and
   an addressing element connected in series to said amplifying transistor and configured to select the unit cell.

2. A device according to claim 1, in which said photoelectric converter comprising one photoelectric conversion element.

3. A device according to claim 1, in which said photoelectric converter comprising plural photoelectric conversion elements.

4. A device according to claim 3, in which said photoelectric converter comprising odd number of photoelectric conversion elements.

5. A device according to claim 3, in which said photoelectric converter comprising even number of photoelectric conversion elements.

6. A device according to claim 3, in which said photoelectric converter comprising two photodiodes.

7. A device according to claim 6, in which said two photodiodes are formed in the first region and are respectively connected to sources of two read-out transistors, the drains of the two read-out transistors are commonly connected to the gate of one amplifying transistor and are formed between the two photodiodes.

8. A device according to claim 7, in which
contacts of the drains of said two read-out transistors and said wiring layer are formed between the two photodiodes.

9. A device according to claim 7, in which contacts of the drains of said two read-out transistors and said wiring layer are formed at positions except for positions between the two photodiodes and form a contact line with a source contact and a drain contact of the read-out transistor, the amplifying transistor and the reset transistor.

10. A device according to claim 9, in which
a gate wiring of each of the read-out transistor, the amplifying transistor and the reset transistor is formed perpendicular to said contact line.

11. A device according to claim 10, in which
said gate wiring meanders at an intersection with said contact line to prevent contact with said contact.

12. A device according to claim 10, in which
said gate wiring is arranged in a lateral direction and said line is arranged in a longitudinal direction.

13. A device according to claim 1, in which
said addressing element, said amplifying transistor and said reset transistor are formed into a straight line.

14. A device according to claim 1, in which
said addressing element comprises a transistor.

15. A device according to claim 1, in which
said addressing element comprises a capacitor.

16. A solid state imaging device comprising:
photoelectric conversion cells, each of the cells comprising:
 a photodiode configured to generate an electric signal corresponding to a quantity of received light,
 an amplifying transistor configured to amplify and output an output signal from said photodiode,
 a read-out transistor including a drain, which acts as a control electrode of said amplifying transistor, and a source which acts as said photodiode, the read-out transistor being formed in a first device region in the semiconductor substrate,
 a reset transistor including a source connected to the drain of said read-out transistor and configured to reset a potential of a gate of said amplifying transistor, the reset transistor being formed in a second device region in the semiconductor substrate, the second device region being separated from the first device region through an insulator region formed in the surface region of the semiconductor substrate,
 a wiring formed above the insulator region of the semiconductor substrate and connected between the drain of the read-out transistor and the source of the reset transistor, and
 an addressing element connected to the gate of the amplifying transistor and configured to select the unit cell.

17. A solid state imaging device comprising:
unit cells disposed in a two-dimensional matrix configuration on a semiconductor substrate, each of said unit cells comprising the transfer transistor being formed in a first region in the semiconductor substrate,
a detection portion formed of an active region in the semiconductor substrate and configured to detect the signal transferred by said transfer transistor,
an amplifying transistor including a gate connected to said detection portion,
an addressing element configured to activate said amplifying transistor, and
an embedded type reset element including a gate formed of an ion implanted region and a drain formed of the active region and configured to discharge the signal of said photodiode, said embedded type reset element includes a source connected to a drain of said transfer transistor and configured to reset a potential of a gate of said amplifying transistor, the embedded type reset element being formed in a second device region in the semiconductor substrate, the second device region being separated from the first device region through an insulator region formed in the surface region of the semiconductor substrate,
 a wiring formed above the insulator region of the semiconductor substrate and connected between the drain of the transfer transistor and the source of the embedded type reset element, and
 an addressing element configured to activate said amplifying transistor, the addressing element connected to the gate of the amplifying transistor and configured to select one of the unit cells, and;
a potential barrier being formed between said detection portion and a drain of said amplifying transistor and the potential of said detection portion being changed to perform resetting such that electrons are discharged to said drain over said potential barrier.

18. An imaging system comprising:
an optical system configured to receive an optical image of an object and to introduce the optical image to a predetermined position;
an image processor including a sensor configured to photoelectrically convert the optical image introduced into the predetermined position into an electric signal corresponding to a quantity of light of the optical image in pixel units; and
a signal processor configured to process an output from said image processor into a predetermined format to output the processed output,
wherein said sensor comprises a photoelectric conversion element positioned at the predetermined position and an output circuit including an amplifying type MOS sensor, connected to said photoelectric conversion element, configured to amplify an output from said photoelectric conversion element to output the amplified output, and
said MOS sensor comprises:
 unit cells formed in a surface region of a semiconductor substrate, each of the unit cells comprising:
  a photoelectric converter,
  a read-out transistor configured to read a signal from the photoelectric converter, the read-out transistor being formed in a first device region in the semiconductor substrate,
  an amplifying transistor including a gate connected to a drain of said read-out transistor and configured to amplify the signal read by said read-out transistor,
  a reset transistor including a source connected to the drain of said read-out transistor and configured to reset a potential of a gate of said amplifying transistor, the reset transistor being formed in a second device region in the semiconductor substrate, the second device region being separated from the first device region through an insulator region formed on the surface region of the semiconductor substrate, a wiring formed above the insulator region of the semiconductor substrate and connected between the drain of the read-out transistor and the source of the reset transistor, and an addressing element connected in series to said amplifying transistor and configured to select the unit cell.

19. The solid state imaging device according to claim 1, further comprising:

a power supply for said amplifying transistor and said reset transistor;

a plurality of vertical signal lines arranged in a first direction in which an electric current of said amplifying transistor is read;

a plurality of horizontal read-out transistors connected to an end of said vertical signal lines;

horizontal selection means for sequentially supplying selection pulse signals to gates of said horizontal read-out transistors;

a horizontal signal line for reading a signal electric current from said vertical signal lines through said horizontal read-out transistor; and capacitor means having a lower electrode which acts as a gate of said amplifying transistor and an upper electrode which acts as said vertical signal lines to cover said lower electrode and for capacitively coupling the control electrode of said amplifying transistor and said vertical signal lines.

20. The solid state imaging device according to claim 16, further comprising:

a power supply for said amplifying transistor and said reset transistor;

a plurality of vertical signal lines arranged in a first direction in which an electric current of said amplifying transistor is read;

a plurality of horizontal read-out transistors connected to an end of said vertical signal lines;

horizontal selection means for sequentially supplying selection pulse signals to gates of said horizontal read-out transistors;

a horizontal signal line for reading a signal electric current from said vertical signal lines through said horizontal read-out transistor; and capacitor means having a lower electrode which acts as a gate of said amplifying transistor and an upper electrode which acts as said vertical signal lines to cover said lower electrode and for capacitively coupling the control electrode of said amplifying transistor and said vertical signal lines.

21. The solid state imaging device according to claim 1, wherein said amplifying transistor and said reset transistor have gate regions of a same impurity concentration and of a different threshold voltage.

22. The solid state imaging device according to claim 16, wherein said amplifying transistor and said reset transistor have gate regions of a same impurity concentration and of a different threshold voltage.

23. A solid state imaging system comprising:

a solid state imaging device comprising:

unit cells formed in a surface region of a semiconductor substrate, each of the unit cells comprising:

a photoelectric converter, a read-out transistor configured to read a signal from the photoelectric converter, the read-out transistor being formed in a first device region in the semiconductor substrate, an amplifying transistor including a gate connected to a drain of said read-out transistor and configured to amplify the signal read by said read-out transistor, a reset transistor including a source connected to the drain of said read-out transistor and configured to reset a potential of a gate of said amplifying transistor, the reset transistor being formed in a second device region in the semiconductor substrate, the second device region being separated from the first device region through an insulator region formed in the surface region of the semiconductor substrate, a wiring formed above the insulator region of the semiconductor substrate and connected between the drain of the read-out transistor and the source of the reset transistor, and an addressing element connected in series to said amplifying transistor and configured to select the unit cell;

an optical system configured to receive an image of an object and guide the image to the photoelectric converter of the solid state imaging device;

a signal processing unit configured to process an output signal from the solid state imaging device and output a camera signal; and a control unit configured to control operations of the solid state imaging device and the signal processing unit.

24. A solid state imaging system according to claim 23, wherein said signal processing unit and control unit are formed on the semiconductor substrate of the solid state imaging device.

25. A solid state imaging system comprising:

a solid state imaging device comprising:

photoelectric conversion cells, each of the cells comprising:

a photodiode configured to generate an electric signal corresponding to a quantity of received light, an amplifying transistor configured to amplify and output an output signal from said photodiode, a read-out transistor including a drain, which acts as a control electrode of said amplifying transistor, and a source which acts as said photodiode, the read-out transistor being formed in a first device region in the semiconductor substrate, a reset transistor including a source connected to the drain of said read-out transistor and configured to reset a potential of a gate of said amplifying transistor, the reset transistor being formed in a second device region in the semiconductor substrate, the second device region being separated from the first device region through an insulating region formed in the surface region of the semiconductor substrate, a wiring formed above the insulator region of the semiconductor substrate and connected between the drain of the read-out transistor and the source of the reset transistor, and an addressing element connected to the gate of the amplifying transistor and configured to select the unit cell;

an optical system configured to receive an image of an object and guide the image to the photoelectric converter of the solid state imaging device;

a signal processing unit configured to process an output signal from the solid state imaging device and output a camera signal; and a control unit configured to control operations of the solid state imaging device and the signal processing unit.

26. A solid state imaging system according to claim 25, wherein said signal processing unit and control unit are formed on the semiconductor substrate of the solid state imaging device.

27. A one-chip semiconductor device comprising:

a solid state imaging device comprising:
unit cells formed in a surface region of a semiconductor substrate, each of the unit cells comprising:
a photoelectric converter,
a read-out transistor configured to read a signal from the photoelectric converter, the read-out transistor being formed in a first device region in the semiconductor substrate,
an amplifying transistor including a gate connected to a drain of said read-out transistor and configured to amplify the signal read by said read-out transistor,
a reset transistor including a source connected to the drain of said read-out transistor and configured to reset a potential of a gate of said amplifying transistor, the reset transistor being formed in a second device region in the semiconductor substrate, the second device region being separated from the first device region through an insulator region formed in the surface region of the semiconductor substrate,
a wiring formed above the insulator region of the semiconductor substrate and connected between the drain of the read-out transistor and the source of the reset transistor, and
an addressing element connected in series to said amplifying transistor and configured to select the unit cell;
a signal processing unit configured to process an output signal from the solid state imaging device and output a camera signal; and
a control unit configured to control operations of the solid state imaging device and the signal processing unit.

28. A one-chip semiconductor device comprising:

a solid state imaging device comprising:
photoelectric conversion cells, each of the cells comprising:
a photodiode configured to generate an electric signal corresponding to a quantity of received light,
an amplifying transistor configured to amplify and output an output signal from said photodiode,
a read-out transistor including a drain, which acts as a control electrode of said amplifying transistor, and a source which acts as said photodiode, the read-out transistor being formed in a first device region in the semiconductor substrate,
a reset transistor including a source connected to the drain of said read-out transistor and configured to reset a potential of a gate of said amplifying transistor, the reset transistor being formed in a second device region in the semiconductor substrate, the second device region being separated from the first device region through an insulating region formed in the surface region of the semiconductor substrate,
a wiring formed above the insulator region of the semiconductor substrate and connected between the drain of the read-out transistor and the source of the reset transistor, and
an addressing element connected to the gate of the amplifying transistor and configured to select the unit cell;
a signal processing unit configured to process an output signal from the solid state imaging device and output a camera signal; and
a control unit configured to control operations of the solid state imaging device and the signal processing unit.

* * * * *